(12) United States Patent
Osada et al.

(10) Patent No.: US 10,490,986 B2
(45) Date of Patent: Nov. 26, 2019

(54) METHOD OF MANUFACTURING BRANCH PROTECTOR AND METHOD OF MANUFACTURING WIRE HARNESS

(71) Applicant: Yazaki Corporation, Tokyo (JP)

(72) Inventors: Yasumasa Osada, Shizuoka (JP); Fumihiro Kitamura, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/019,834

(22) Filed: Jun. 27, 2018

(65) Prior Publication Data

US 2019/0013655 A1    Jan. 10, 2019

(30) Foreign Application Priority Data

Jul. 7, 2017 (JP) ................................ 2017-133568

(51) Int. Cl.
*H02G 3/04* (2006.01)
*B60R 16/02* (2006.01)
*H02G 3/06* (2006.01)

(52) U.S. Cl.
CPC ....... *H02G 3/0468* (2013.01); *B60R 16/0215* (2013.01); *H02G 3/0691* (2013.01)

(58) Field of Classification Search
CPC . H02G 3/0468; H02G 3/0691; B60R 16/0215

USPC ........................................................ 704/72 A
See application file for complete search history.

(56) References Cited

U.S. PATENT DOCUMENTS

| 5,338,014 A * | 8/1994 | Kitamura ......... H01B 13/01209 269/254 CS |
| 2005/0037665 A1* | 2/2005 | Konda ................. H01R 13/025 439/607.01 |
| 2012/0261184 A1* | 10/2012 | Kitamura ............ B60R 16/0215 174/72 A |
| 2013/0269970 A1* | 10/2013 | Hara ................... B60R 16/0215 174/101 |
| 2016/0156165 A1* | 6/2016 | Katou .................. H01B 7/0045 174/72 A |

FOREIGN PATENT DOCUMENTS

| JP | 2009077517 | * | 4/2009 |
| JP | 2012253961 A | * | 12/2012 |
| JP | 5217873 B2 | | 6/2013 |
| JP | 2013225981 | * | 10/2013 |
| JP | 2013225981 A | * | 10/2013 |

* cited by examiner

*Primary Examiner* — Timothy J Thompson
*Assistant Examiner* — Charles Pizzuto
(74) *Attorney, Agent, or Firm* — Sughrue Mion, PLLC

(57) ABSTRACT

A method of manufacturing a branch protector includes a component setting step of supporting a protector sheet of a branch protector in a floating state from a jig base on a jig pin erected on the jig base, and an assembling step of assembling a wire branch portion to the protector sheet.

11 Claims, 88 Drawing Sheets

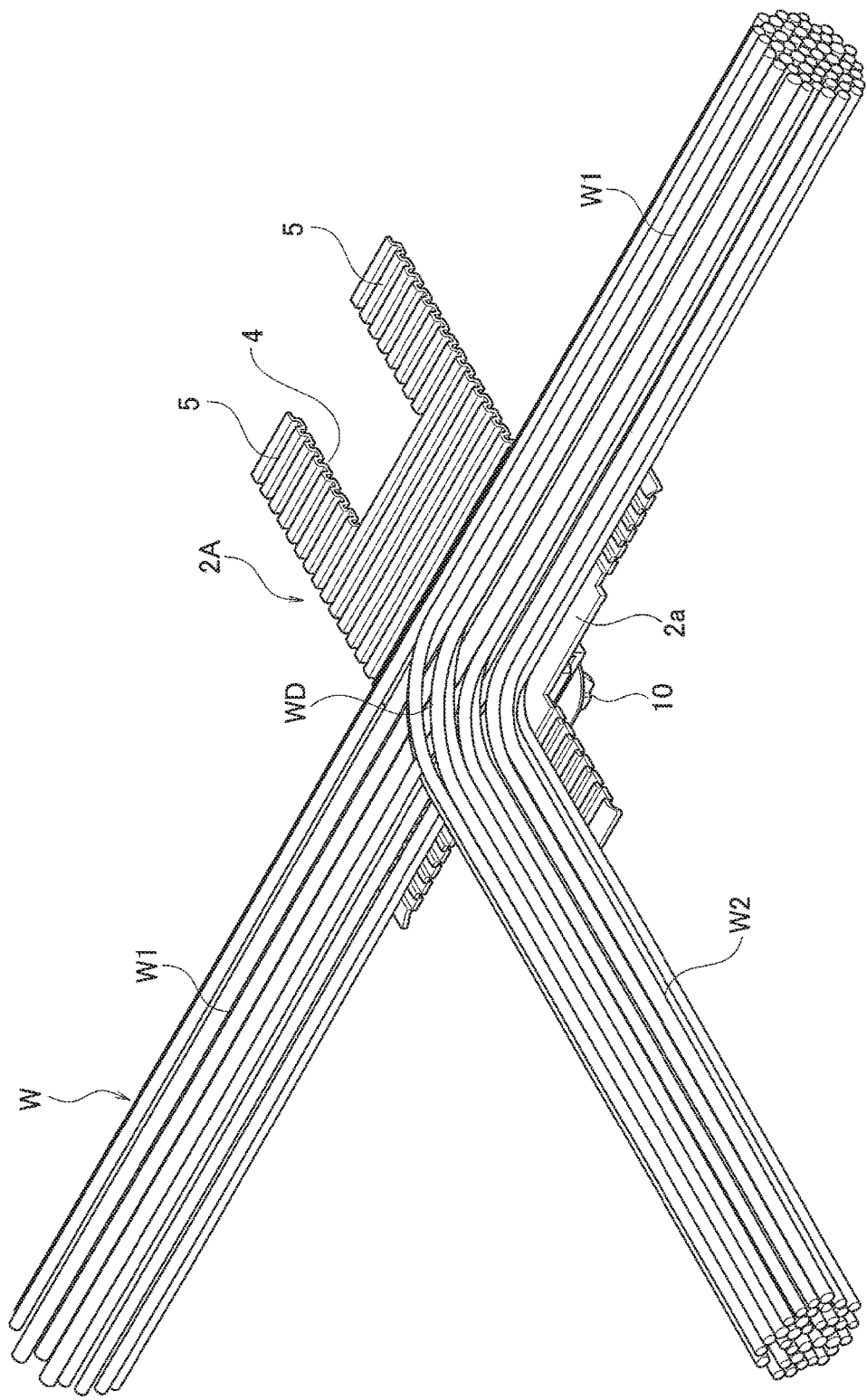

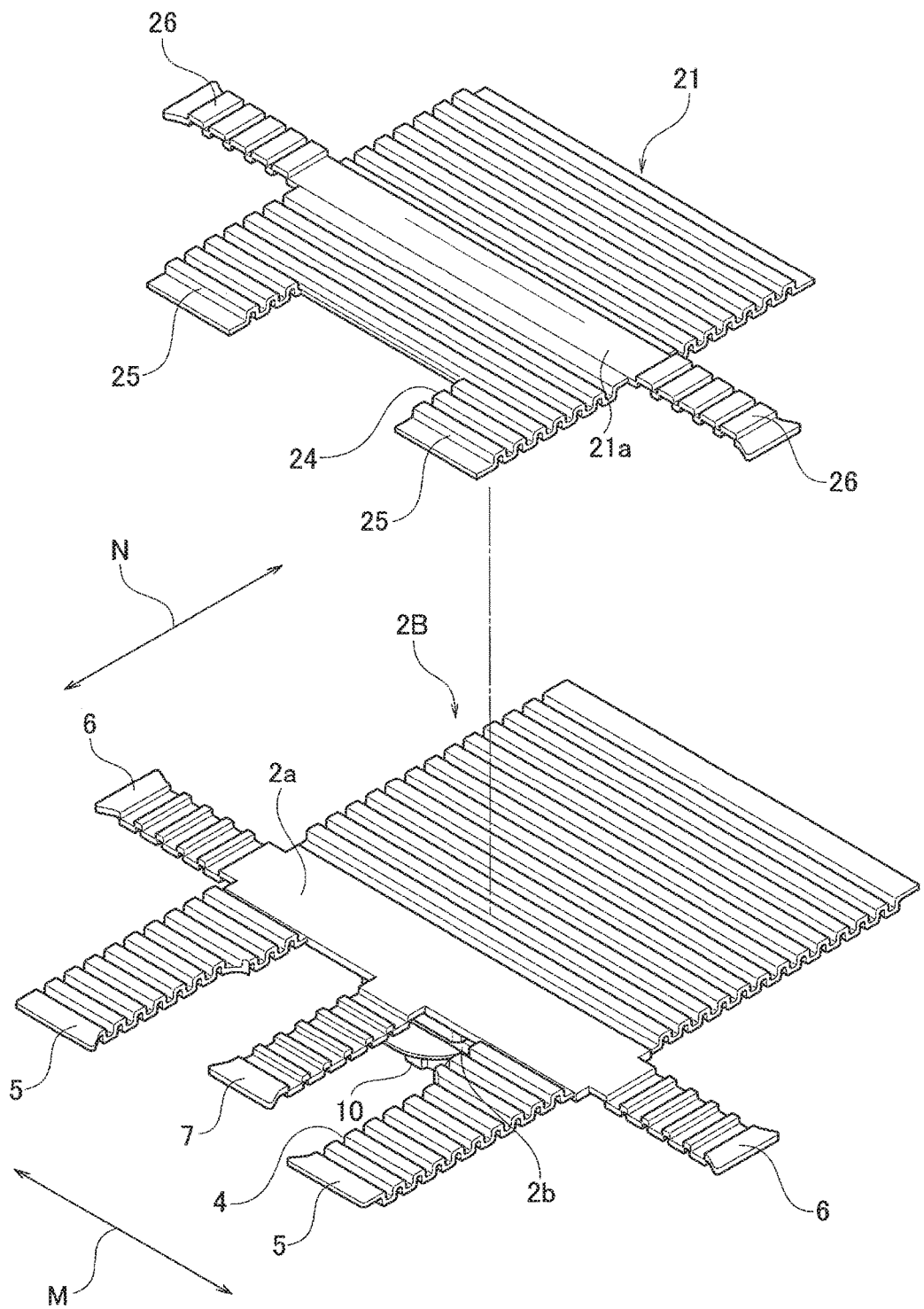

FIG. 35
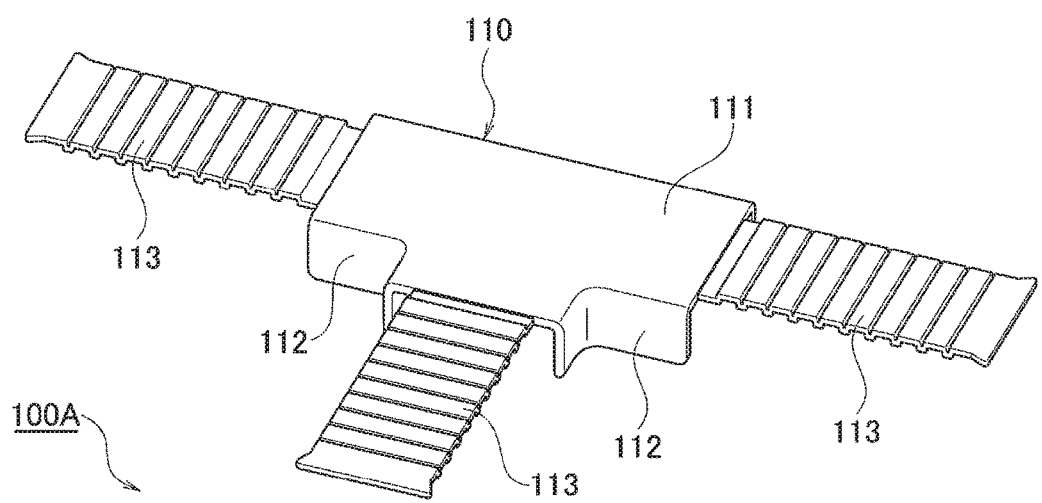
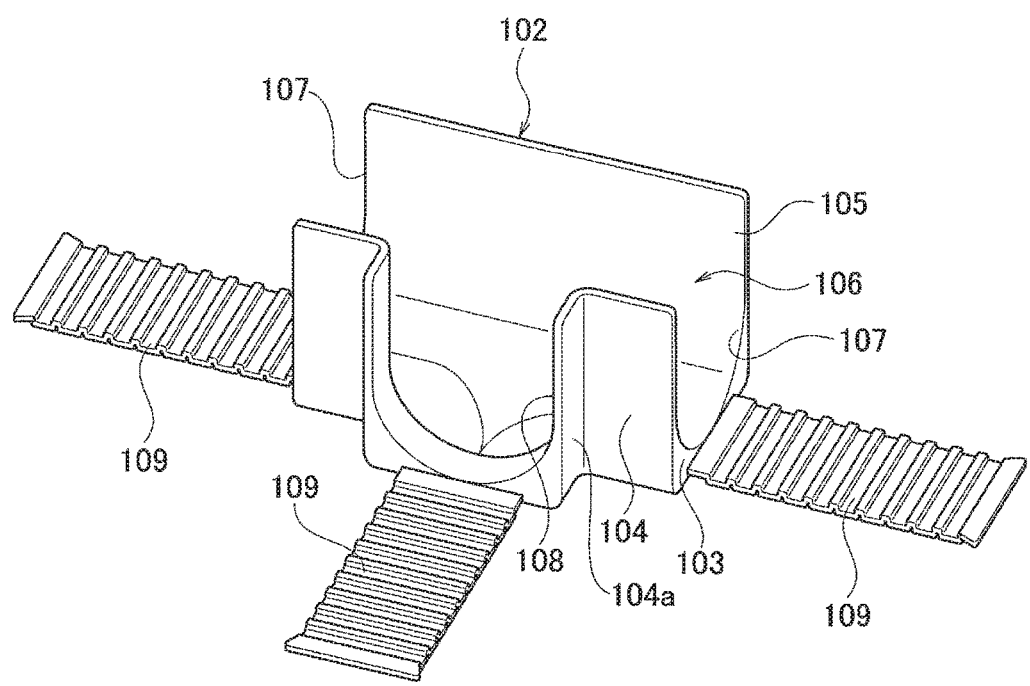

FIG. 43
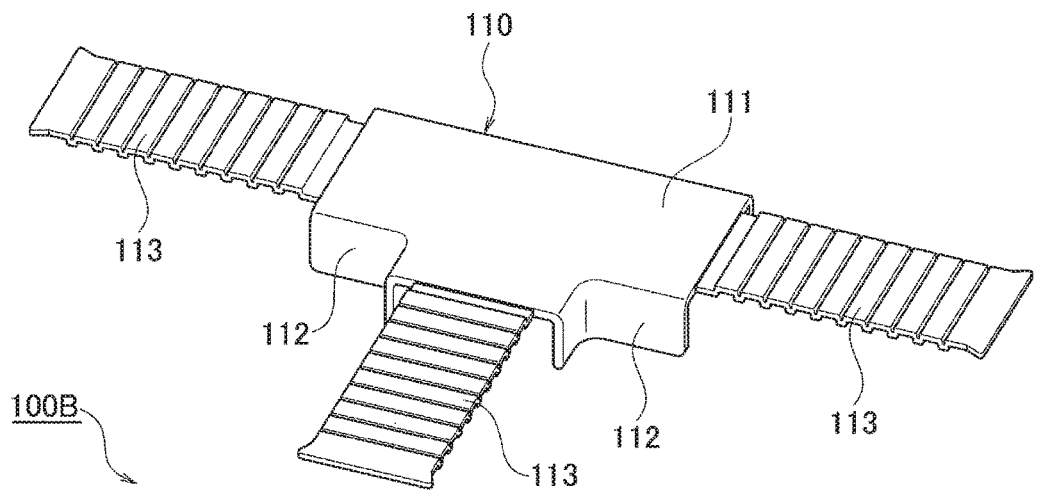
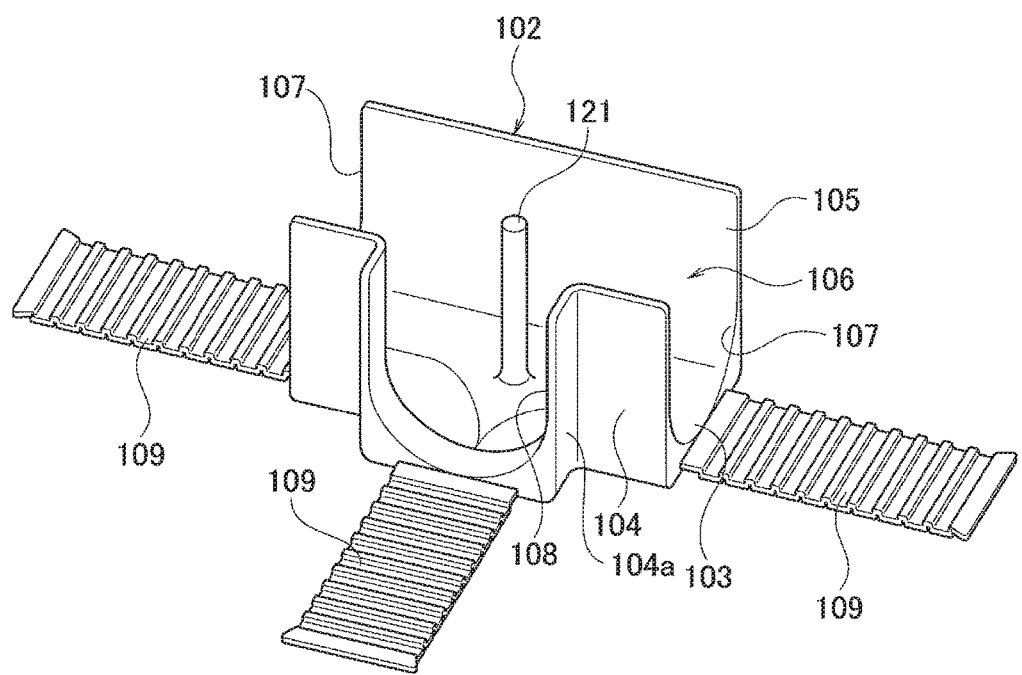

FIG. 45
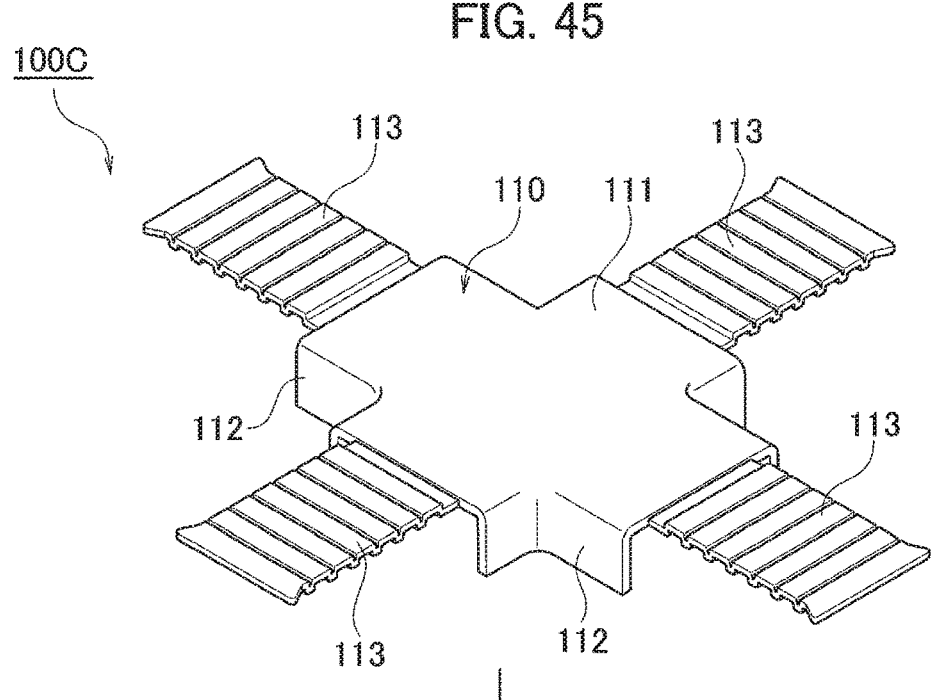
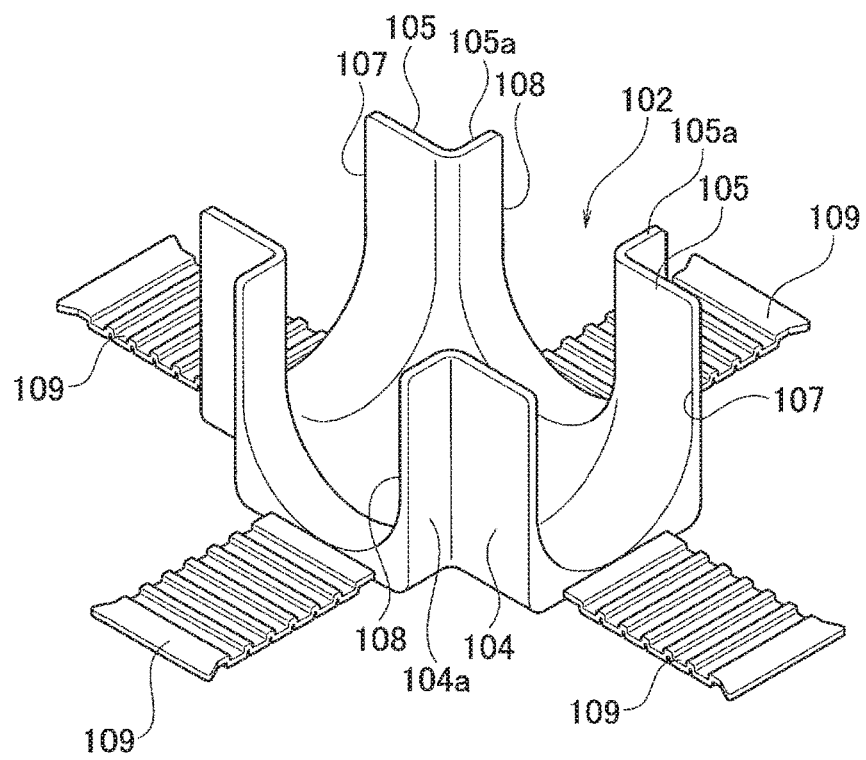

FIG. 48
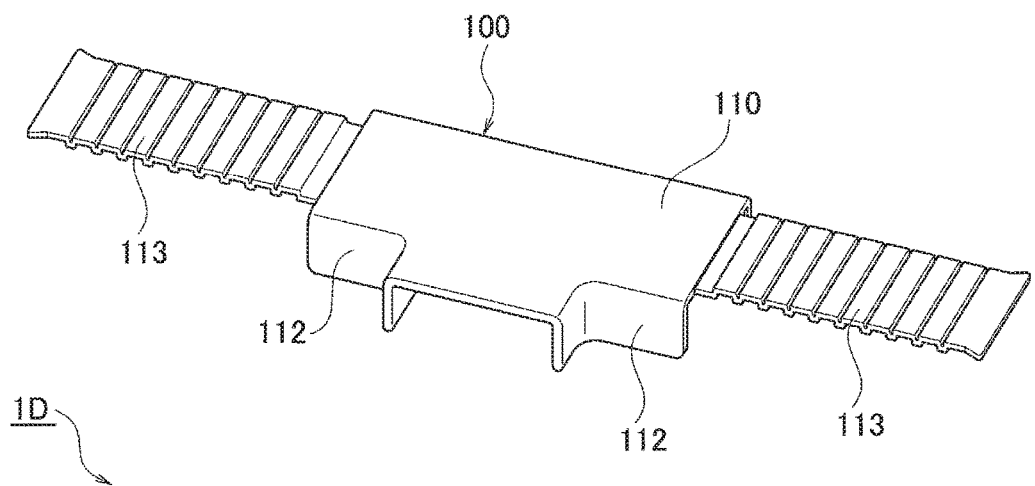
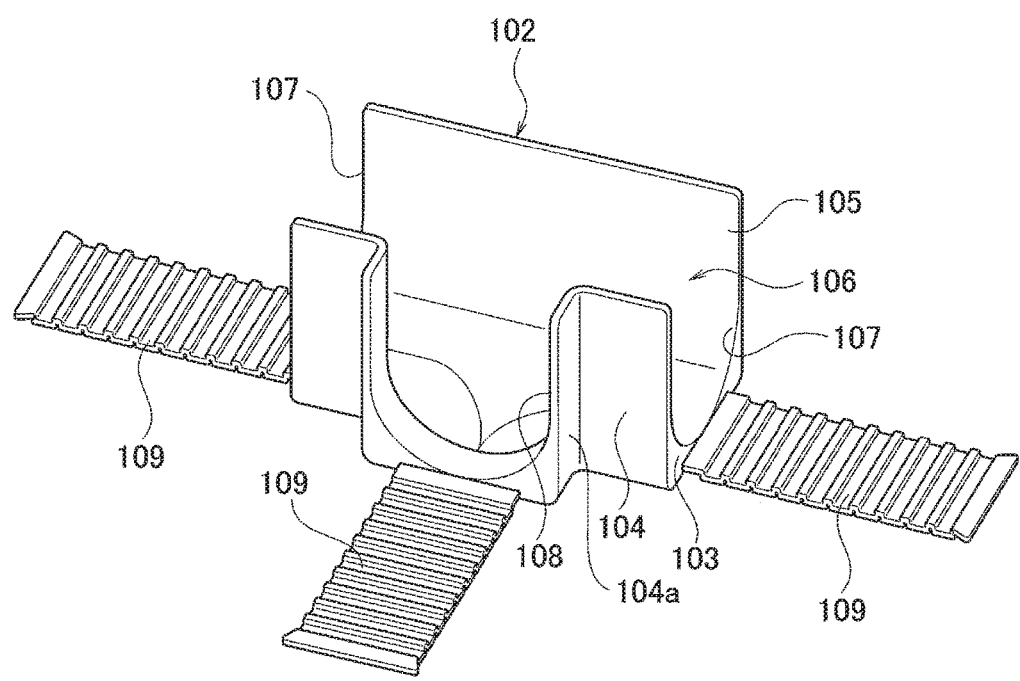

METHOD OF MANUFACTURING BRANCH PROTECTOR AND METHOD OF MANUFACTURING WIRE HARNESS

CROSS REFERENCE TO RELATED APPLICATION

This application is based upon and claims the benefit of priority from the prior Japanese Patent Application No. 2017-133568, filed on Jul. 7, 2017, the entire contents of which are incorporated herein by reference.

BACKGROUND OF THE INVENTION

The present invention relates to a method of manufacturing a branch protector that protects a wire branch portion, and a method of manufacturing a wire harness.

A branch protector disclosed in Japanese Patent Publication No. 5217873 is proposed as a related branch protector. As illustrated in FIGS. 1 and 2, this branch protector 200 has a branch protector main body 201 having a wire accommodating chamber 201a and a cover 210 attached to the branch protector main body 201.

The wire accommodating chamber 201a is surrounded by a bottom wall 202 and a pair of side walls 203, and the wire accommodating chamber 201a whose upper surface is opened is formed. Two wire draw-out openings 204 are provided at both ends of the pair of side walls 203. A tape winding tongue piece 206 is provided to extend at both ends of the pair of side walls 203. One wire draw-out opening 205 is provided at a center position of one of the side walls 203 (a position between both ends of the side wall 203). A branch line fixing plate 207 is provided to extend at a position where the wire draw-out opening 205 of the one side wall 203 is provided.

A wire branch portion (not illustrated) of a wire W is accommodated in the wire accommodating chamber 201a. One branch line W2 is branched from a trunk line W1 at the wire branch portion. As a result, the two trunk lines W1 and the one branch line W2 extend in different directions from the wire branch portion. The two trunk lines W1 are drawn out to the outside through the wire draw-out opening 204 at both the ends, respectively. The one branch line W2 is drawn out to the outside through the wire draw-out opening 205 at the center position.

The cover 210 closes the upper surface of the wire accommodating chamber 201a in the state of being mounted to the branch protector main body 201. In addition, the wire branch portion is accommodated in the wire accommodating chamber 201a covered with the branch protector main body 201 and the cover 210, thereby protecting the wire branch portion.

The related branch protector 200 is manufactured in a state where the branch protector main body 201 is placed on a jig base. Specifically, the branch protector main body 201 is placed on the jig base in a positioned state. Next, the wire branch portion is accommodated in the wire accommodating chamber 201a. Next, the upper surface of the wire accommodating chamber 201a is closed by the cover 210. Next, a tape T is wound collectively around the tape winding tongue piece 206 and the trunk line W1. Further, the branch line W2 is fixed to the branch line fixing plate 207 by a fastening band 208. The manufacture is completed with this process.

The related branch protector is exemplified in Japanese Patent Publication No. 5217873.

SUMMARY OF THE INVENTION

In a method of manufacturing the related branch protector 200, however, it is necessary to lift the branch protector main body 201 above the jig base during winding work of the tape T. Further, it is also necessary to lift a part of the branch protector main body 201 above the jig base during attachment work of the fastening band 208. Therefore, there is a problem that the assembling workability of the branch protector 200 is poor.

The invention has been made to solve the above-described problems, and it is possible to provide a method of manufacturing a branch protector and a method of manufacturing a wire harness with favorable assembling workability according to the invention.

According to a technical aspect of the invention, the method of manufacturing a branch protector includes a component setting step of supporting a main component of the branch protector in a floating state from a jig base on a jig pin erected on the jig base, and an assembling step of assembling a wire branch portion to the main component.

According to the invention, the main component of the branch protector is supported in the floating state on the jig base, and a lower space of the main component of the branch protector can also be used as an assembling work space, and thus, the assembling workability is favorable.

BRIEF DESCRIPTION OF THE DRAWING

FIG. 5 illustrates the first embodiment of the invention and is a perspective view in which a wire branch portion is placed on the protector sheet;

FIG. 24 illustrates a ninth embodiment of the invention and is a perspective view of a protector sheet and a reinforcing protector sheet both in a developed state;

FIG. 35 illustrates a thirteenth embodiment of the invention and is an exploded perspective view of a branch protector;

FIG. 43 illustrates a fourteenth embodiment of the invention and is an exploded perspective view of a branch protector;

FIG. 45 illustrates a fifteenth embodiment of the invention and is an exploded perspective view of a branch protector;

FIG. 48 illustrates a sixteenth embodiment of the invention and is an exploded perspective view of a branch protector;

DESCRIPTION OF THE PREFERRED EMBODIMENTS

Embodiments of the invention will be described below with reference to the drawings.

First Embodiment

FIGS. 3 to 7B illustrate a first embodiment of the invention. A wire harness includes a wire (wire bundle) W that are routed along a predetermined routing path and has a wire branch portion WD and a branch protector 1A that protects the wire branch portion WD. As illustrated in FIG. 5, one branch line W2 is branched from a trunk line W1 at the wire branch portion WD. That is, the wire branch portion WD has three branches in which two trunk lines W1 and one branch line W2 extend in different directions. The branch protector 1A that protects the three-branch wire branch portion WD will be described.

The branch protector 1A (illustrated in FIGS. 7A and 7B) includes a protector sheet 2A mounted on the outer circumference of the wire branch portion WD and a restraint tape T wound around the protector sheet 2A, the trunk line W1, and the branch line W2.

Figure 1:
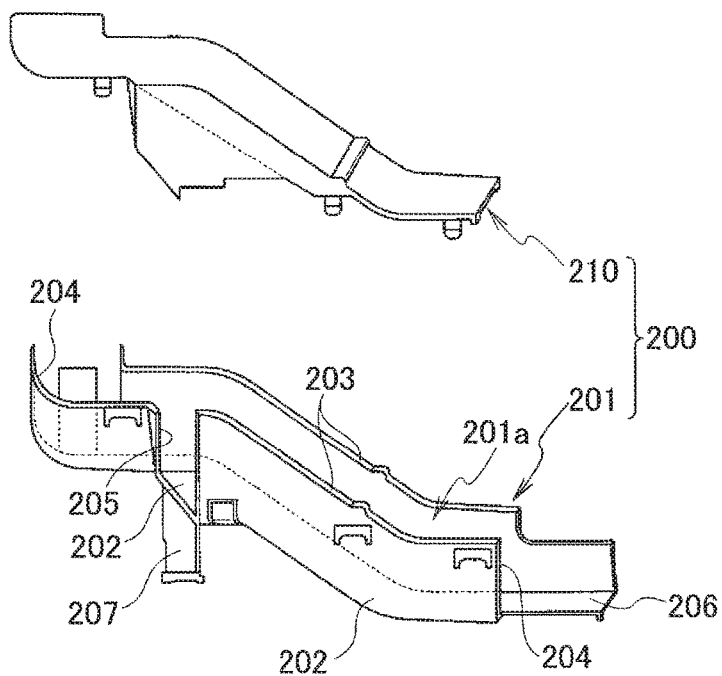
FIG. 1 is an exploded perspective view of a related branch protector.
Figure 2:
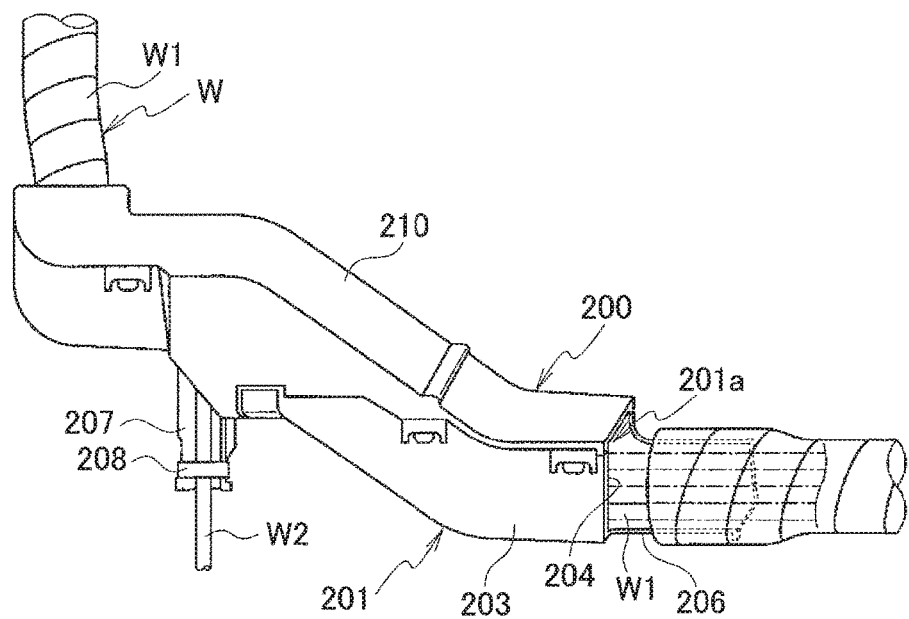
FIG. 2 is a perspective view of an assembled state of the related branch protector.
Figure 3:
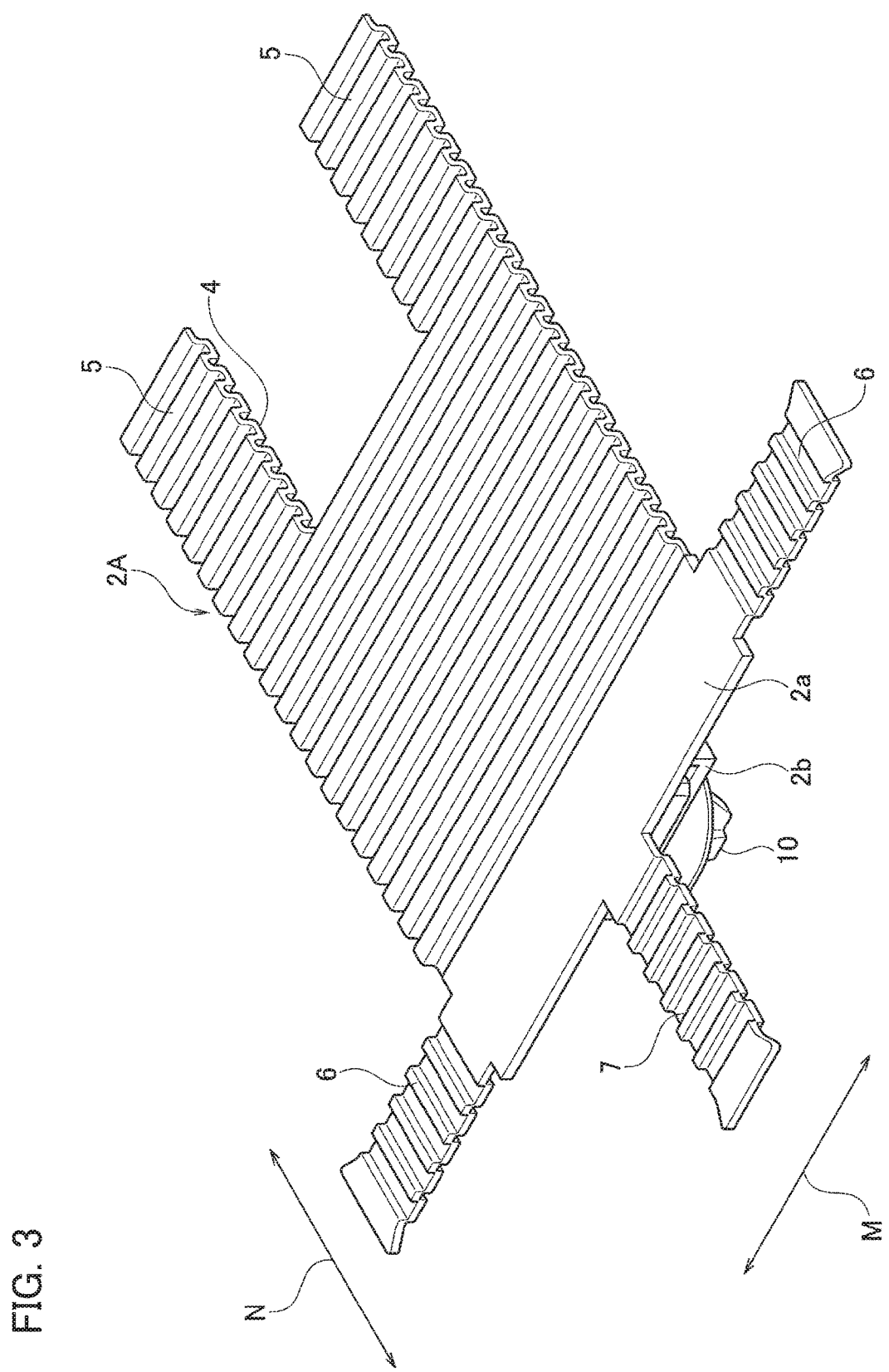
FIG. 3 illustrates a first embodiment of the invention and is a perspective view from a front surface of a protector sheet in a developed state.
Figure 4:
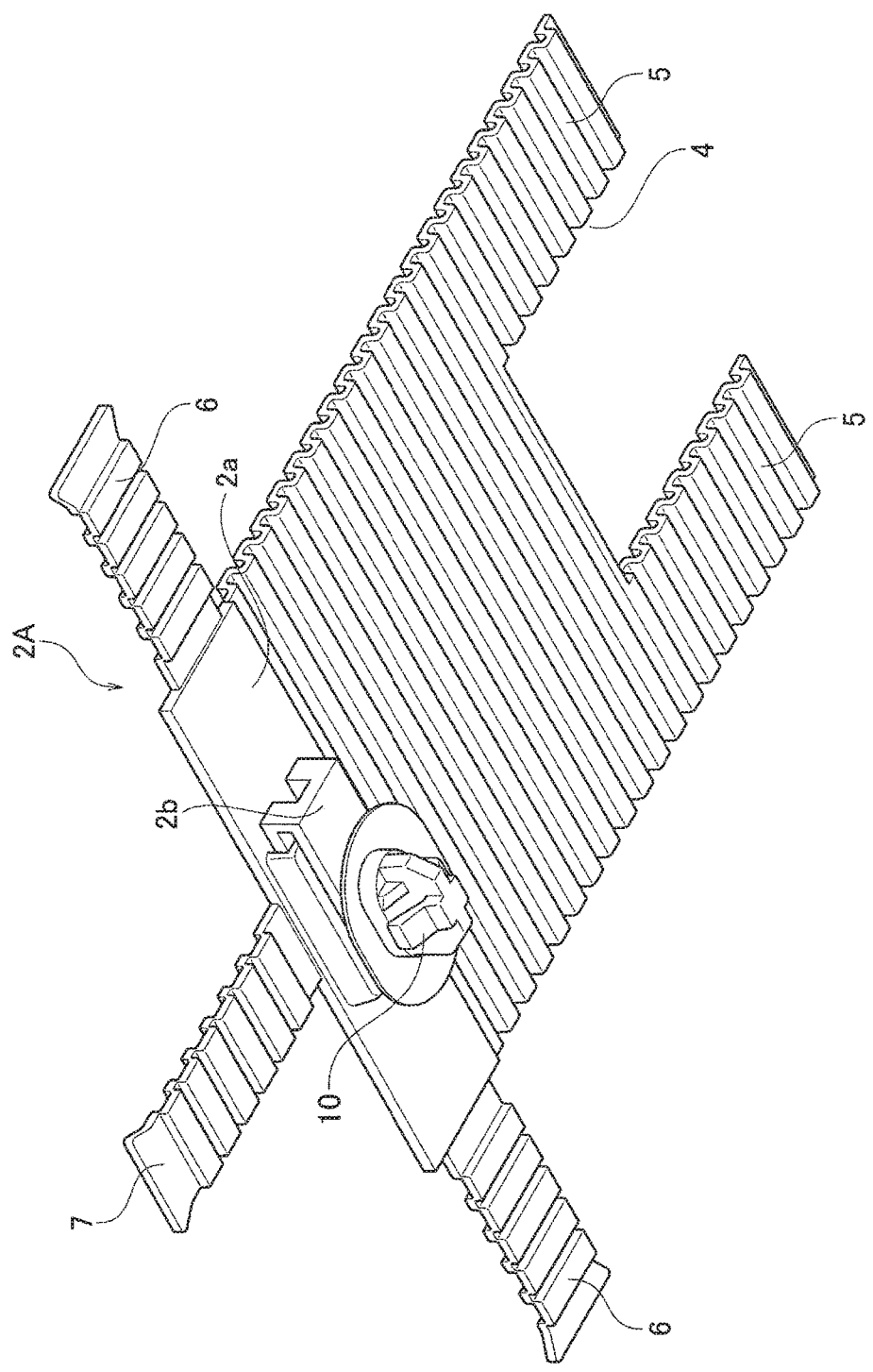
FIG. 4 illustrates the first embodiment of the invention and is a perspective view from a rear surface of the protector sheet in the developed state.

As illustrated in FIG. 3, the protector sheet 2A is a flexible sheet having a flat shape before being mounted to the wire branch portion WD.

The protector sheet 2A includes a pair of strip-shaped sheet portions 5 arranged with an interval by a cut-out portion 4, a tape winding protruding portion 6 for the two trunk lines W1, and a tape winding protruding portion 7 for one branch line.

The protector sheet 2A has a component placement portion 2a extending along a trunk line routing direction M. The component placement portion 2a is formed in a flat shape. The protector sheet 2A other than the component placement portion 2a is formed in a bellows-shape in which a recess and a protrusion are alternately repeated toward an orthogonal direction N (a winding distal end direction) of the trunk line routing direction M.

The protector sheet 2A is wound around an outer circumference of the wire branch portion WD except for a part where the branch line W2 is drawn out. The pair of strip-shaped sheet portions 5 is wound around parts of the trunk lines W1 on both outer sides of the part where the branch line W2 is drawn out. Winding distal ends of the respective strip-shaped sheet portions 5 are wound at the outer side of the protector sheet 2A to overlap each other. Trunk line draw-out openings 8 are formed at both ends of the protector sheet 2A in the trunk line routing direction M in accordance with a winding shape of the protector sheet 2A. The trunk lines W1 of the wire branch portion WD are drawn out from the respective trunk line draw-out openings 8.

A branch line draw-out opening 9 is formed by the cut-out portion 4 in the protector sheet 2A. The branch line W2 of the wire branch portion WD is drawn out from the branch line draw-out opening 9.

A clip mounting portion 2b is provided on a rear surface of the component placement portion 2a of the protector sheet 2A. A clip 10, which is a fixing portion for a vehicle body, is attached to the clip mounting portion 2b.

The respective tape winding protruding portions 6 for the trunk line W1 are provided to extend from both the ends of the protector sheet 2A in the trunk line routing direction M. The respective tape winding protruding portions 6 for the trunk line W1 protrude in directions of routing the trunk lines W1 drawn out from the trunk line draw-out openings 8, respectively, in the state of mounting the branch protector 1A.

The tape winding protruding portion 7 for the branch line W2 is provided to extend from a side end of the component placement portion 2a of the protector sheet 2A in the orthogonal direction N of the trunk line routing direction M. The tape winding protruding portion 7 for the branch line W2 is positioned on a side opposite to the cut-out portion 4. The tape winding protruding portion 7 for the branch line W2 protrudes in a direction of routing the branch line W2 drawn out from the branch line draw-out opening 9 in the state of mounting the branch protector 1A.

Each of the tape winding protruding portions 6 and 7 has a sheet shape continuous to the protector sheet 2A. Each of the tape winding protruding portions 6 and 7 is formed in a bellows-shape in which a recess and a protrusion are alternately repeated along a protruding direction.

Assembling work of the branch protector 1A will be described. As illustrated in FIG. 3, the protector sheet 2A in a developed state is arranged at an assembling work position (for example, a position held by a jig pin erected on a jig base). Next, the wire branch portion WD is placed on the protector sheet 2A as illustrated in FIG. 5.

Specifically, the trunk lines W1 of the wire branch portion WD are placed on the component placement portion 2a and the two tape winding protruding portions 6 for the trunk lines W1, and the branch line W2 of the wire branch portion WD is placed on the tape winding protruding portion 7 for the branch line W2.

Figure 6A:
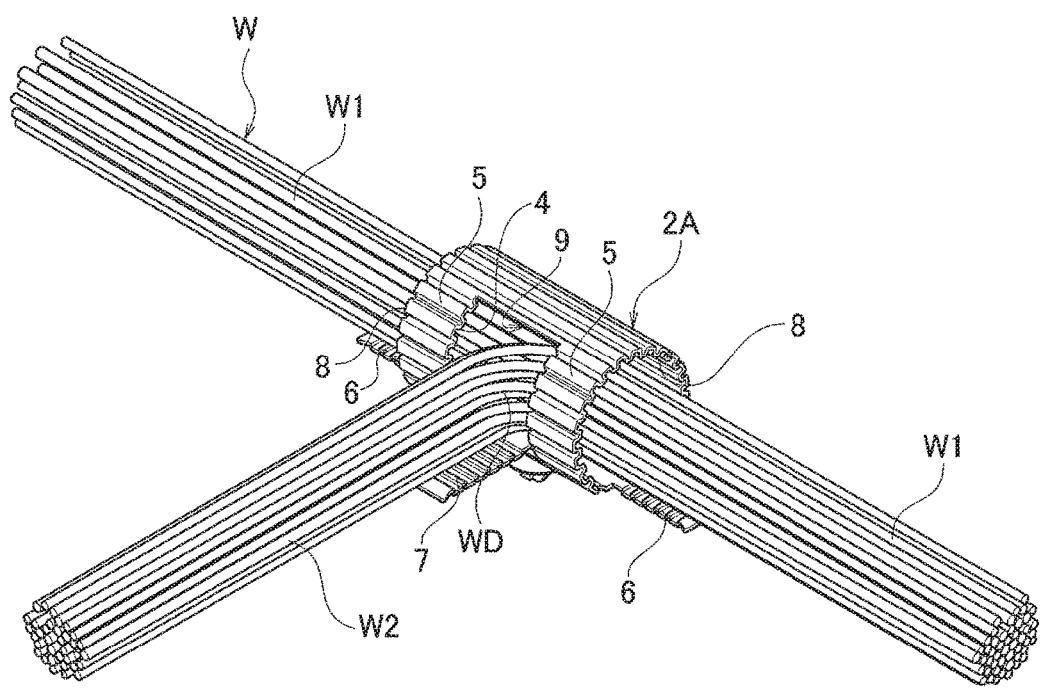
FIG. 6A is a perspective view of a state where the protector sheet is wound around the wire branch portion in the first embodiment of the invention.
Figure 6B:
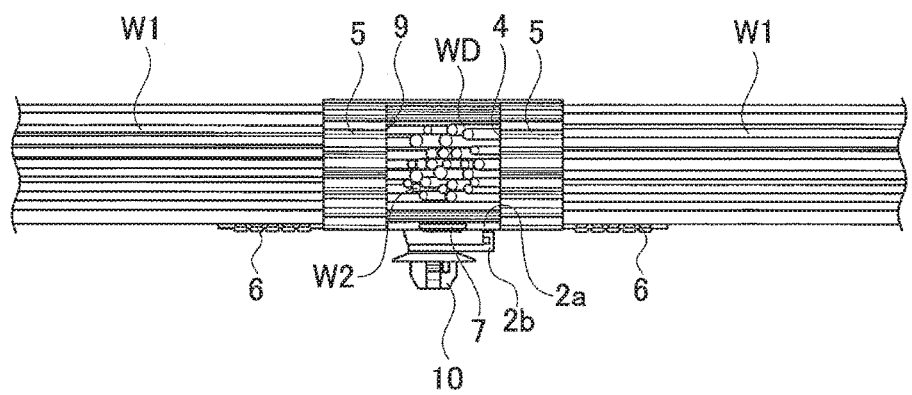
FIG. 6B is a front view of the state where the protector sheet is wound around the wire branch portion in the first embodiment of the invention.

Next, the protector sheet 2A is wound around the outer circumference of the wire branch portion WD with no gap as illustrated in FIG. 6. The winding distal ends of the pair of strip-shaped sheet portions 5 of the protector sheet 2A are wound at the outer side of the protector sheet 2A to overlap each other.

Figure 7A:
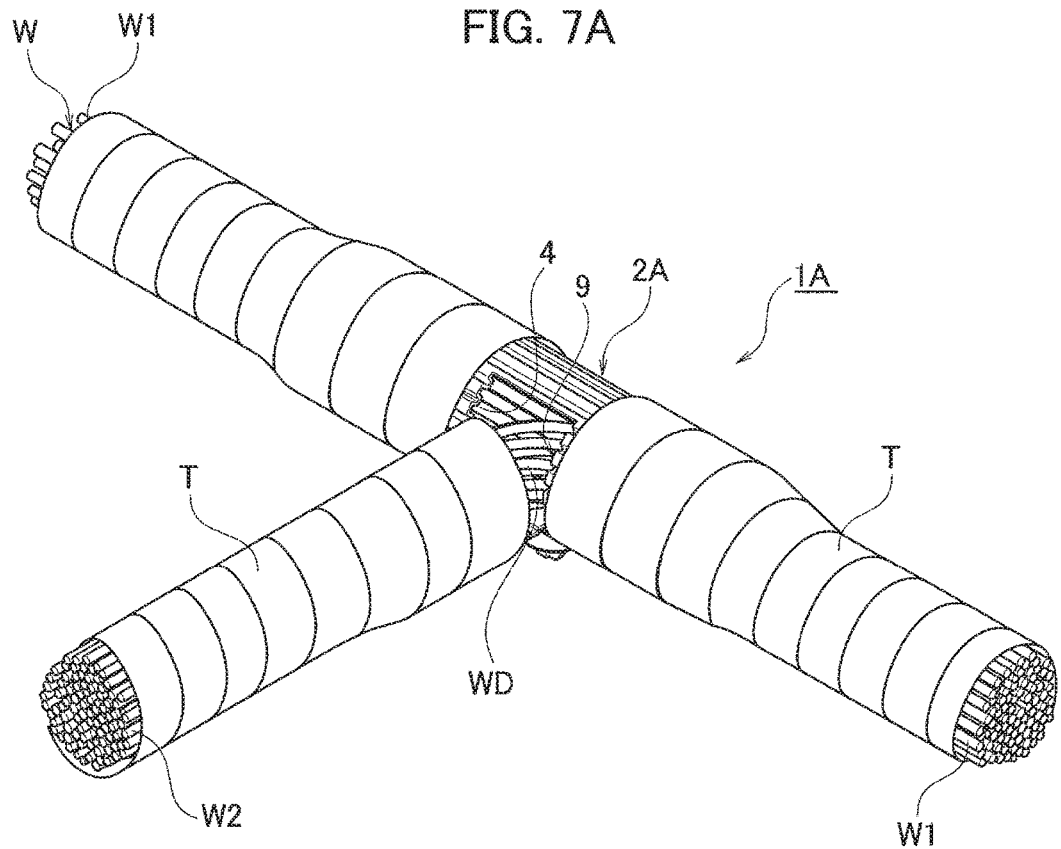
FIG. 7A is a perspective view of a state where a restraint tape is wound around the protector sheet and a trunk line and the protector sheet and a branch line in the first embodiment of the invention.
Figure 7B:
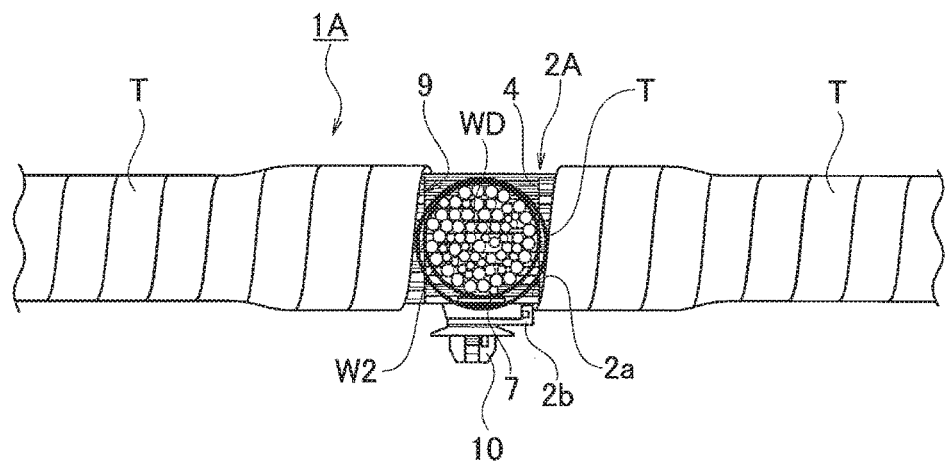
FIG. 7B is a front view of the state where the restraint tape is wound around the protector sheet and the trunk line and the protector sheet and the branch line in the first embodiment of the invention.

Next, the restraint tape T is wound around the protector sheet 2A and the respective trunk lines W1 and the protector sheet 2A and the branch line W2 with no gap as illustrated in FIGS. 7A and 7B.

Specifically, regarding each of the trunk lines W1, the restraint tape T is wound around the outer circumference of the protector sheet 2A (each part of the strip-shaped sheet portions 5) in a range where each of the tape winding protruding portions 6 is not present, wound collectively around the outer circumferences of the tape winding protruding portion 6 and the trunk line W1 in a range where the tape winding protruding portion 6 is present, and wound around the outer circumference of the trunk line W1 with no gap at a part on a side closer to the distal end than the tape winding protruding portion 6, using both end positions of the cut-out portion 4 of the protector sheet 2A as winding start points. As a result, the respective trunk line draw-out openings 8 are completely shielded by the restraint tape T.

Regarding the branch line W2, the restraint tape T is wound collectively around the outer circumferences of the tape winding protruding portion 7 and the branch line W2 in a range where the tape winding protruding portion 7 is present and wound around the outer circumference of the branch line W2 with no gap at a part in front of a distal end of the tape winding protruding portion 7, using a root position of the tape winding protruding portion 7 as a winding start point. The assembling work of the branch protector 1A is completed in this manner.

The wire harness is assembled as components other than the branch protector 1A are mounted to the trunk line W1 and the branch line W2 before, after, or concurrently with the assembling work of the branch protector 1A.

As described above, the branch protector 1A has the cut-out portion 4 from which the branch line W2 of the wire branch portion WD is drawn out, and further, has the flexible protector sheet 2A wound around the trunk line W1 of the wire branch portion WD and from which the trunk lines W1 of the wire branch portion WD are drawn out and the tape winding protruding portions 6 provided to extend from both the ends of the protector sheet 2A, respectively, and protrude in the routing directions of the drawn-out trunk lines W1.

Therefore, the wire branch portion WD can be protected regardless of a size of the wire branch portion WD since the wire branch portion WD is protected by winding the protector sheet 2A around the wire branch portion WD. Moreover, a useless space is not formed inside the protector sheet 2A since the protector sheet 2A covers an outer surface of the wire branch portion WD. As described above, it is possible to protect the wire branch portion WD regardless of the size of the wire branch portion WD, and moreover, it is possible to make the size compact as much as possible.

In addition, the protector sheet 2A has the tape winding protruding portion 6 at a part where the trunk line W1 is drawn out. Therefore, the trunk line W1 and the branch protector 1A can be firmly fixed by winding the restraint tape T around the trunk line W1 and the tape winding protruding portion 6 collectively. As a result, it is possible to reliably prevent the branch protector 1A from being detached from the trunk line W1 due to a pulling force acting on the trunk line W1, or from causing a relative positional deviation although the branch protector 1A is not detached.

The branch protector 1A includes the two trunk line draw-out openings 8 formed by the winding shapes of both the ends of the protector sheet 2A and from which the trunk lines W1 are drawn out, respectively, and the branch line draw-out opening 9 formed by the cut-out portion 4 of the protector sheet 2A and from which the branch line W2 is drawn out.

Therefore, it is unnecessary to form a unique shape such as a cut-out for to form the two trunk line draw-out openings 8 on the protector sheet 2A, and the branch protector 1A can be obtained with a simple sheet shape.

The protector sheet 2A has the pair of strip-shaped sheet portions 5 with the cut-out portion 4 therebetween, and is wound around the entire circumference of the trunk lines W1 on both outer sides of the branch line W2 of the wire branch portion WD.

Therefore, it is possible to protect the entire part of the wire branch portion WD by the protector sheet 2A except for the part where the branch line W2 is drawn out.

The winding distal ends of the respective strip-shaped sheet portions 5 are wound around the protector sheet 2A to overlap each other. Therefore, it is possible to protect the entire circumference of the trunk line W1 simply by winding the protector sheet 2A around the outer circumference of the trunk line W1. With the overlapping winding, the strength of the branch protector 1A is increased and a protection function is improved.

The protector sheet 2A has the tape winding protruding portion 7 that protrudes in the routing direction of the drawn-out branch line W2. Therefore, the branch line W2 and the branch protector 1A can be firmly fixed by winding the restraint tape T around the branch line W2 and the tape winding protruding portion 7 collectively. As a result, it is possible to reliably prevent the branch protector 1A from being detached from the branch line W2 due to a pulling force acting on the branch line W2, or from causing a relative positional deviation although the branch protector 1A is not detached.

The protector sheet 2A is formed in the bellows-shape except for the component placement portion 2a. Therefore, the winding workability is favorable since the protector sheet 2A can be easily wound around the trunk line W1.

Each of the tape winding protruding portions 6 and 7 for the trunk line W1 and the branch line W2 is formed like a sheet in the bellows-shape. Therefore, the trunk line W1 and the branch line W2 drawn out from the branch protector 1A can be easily bent and deformed in an up-down direction UD in the routing directions of the trunk line W1 and the branch line W2, and thus, the routing workability is favorable. Further, the degree of freedom in the routing direction is also high.

The protector sheet 2A is provided with the clip 10. Therefore, the branch protector 1A can be easily fixed to the vehicle body using the clip 10.

Second Embodiment

Figure 8:
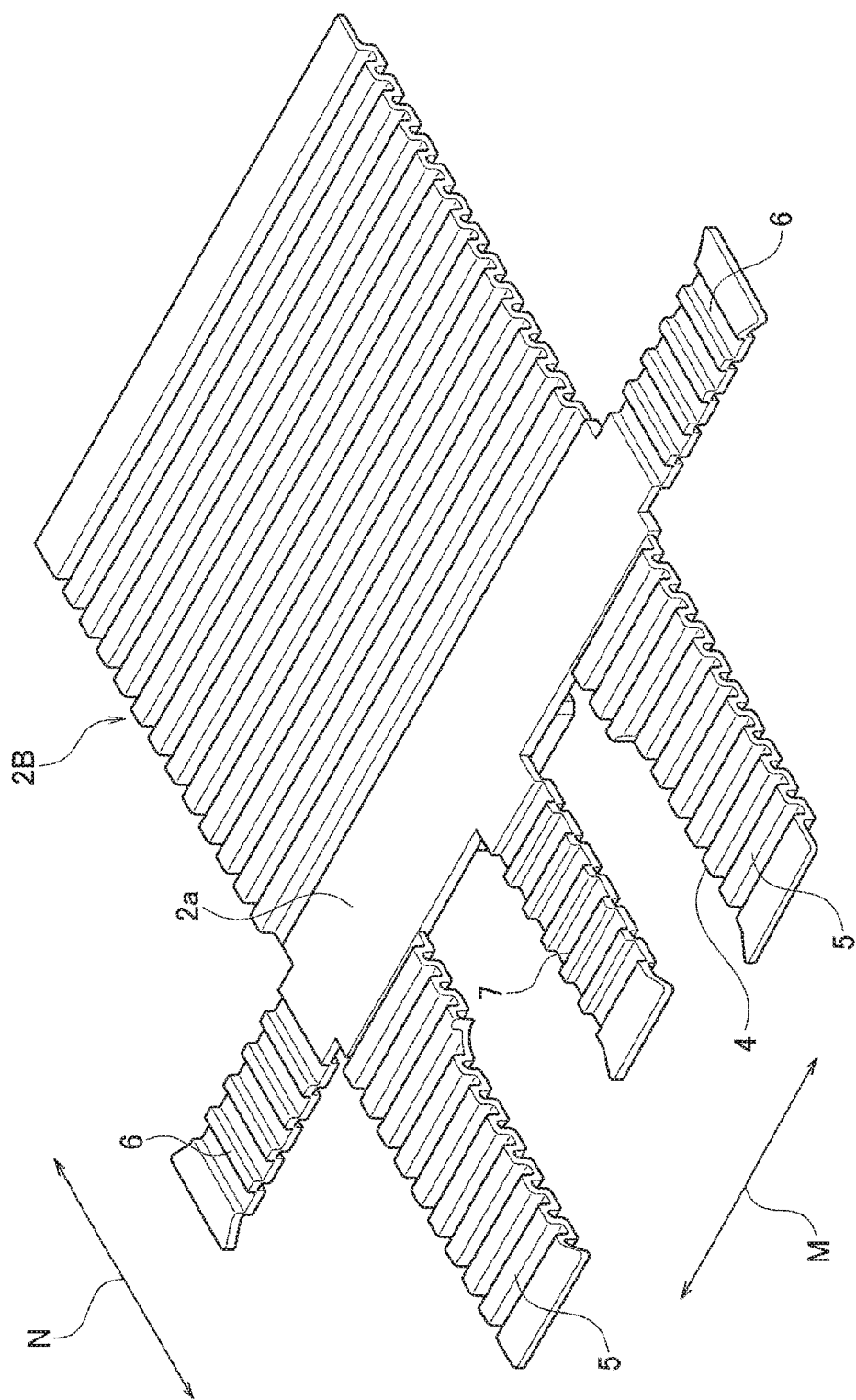
FIG. 8 illustrates a second embodiment of the invention and is a perspective view from a front surface of a protector sheet in a developed state.
Figure 9:
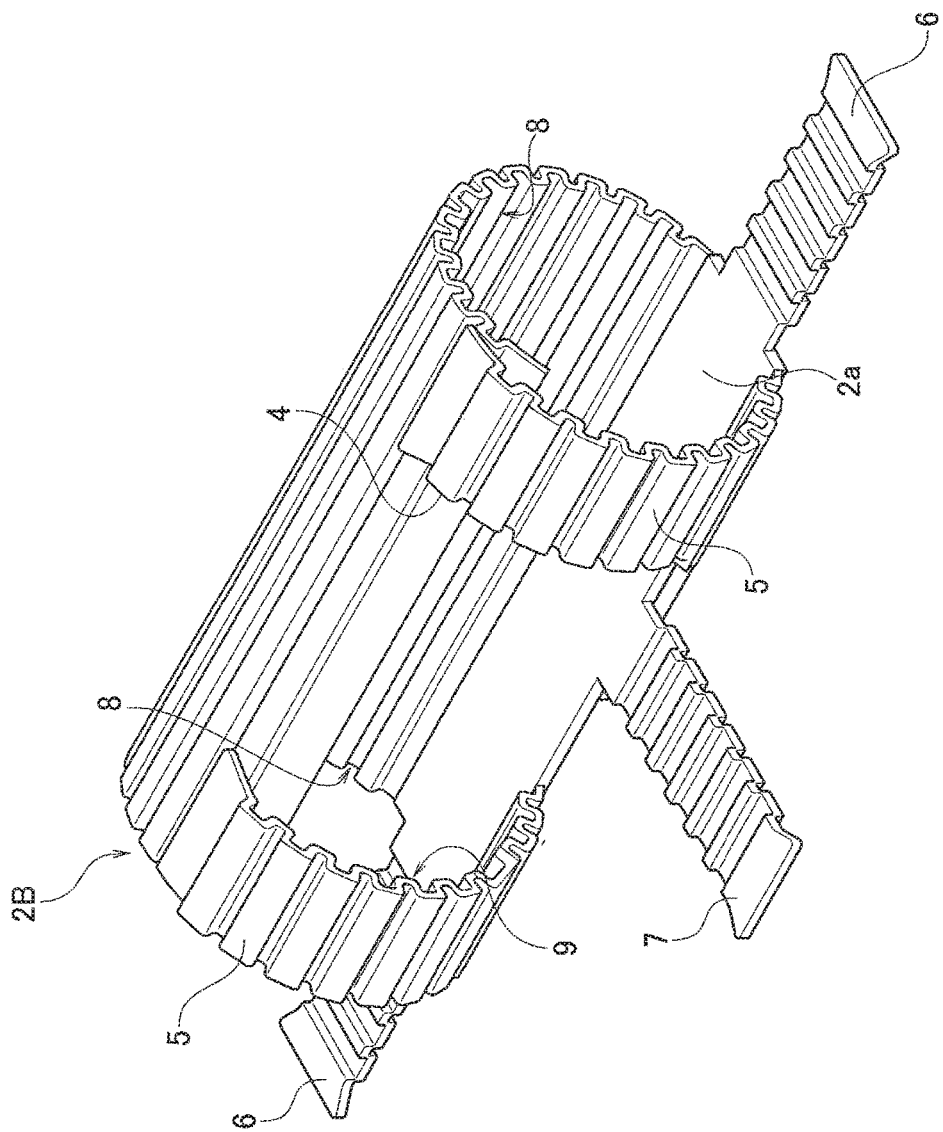
FIG. 9 illustrates the second embodiment of the invention and is a perspective view from a front surface of a protector sheet in a wound state.

FIGS. 8 and 9 illustrate a second embodiment of the invention. As compared with the first embodiment, a position of the cut-out portion 4 of a protector sheet 2B and positions of the pair of strip-shaped sheet portions 5 in a branch protector of the second embodiment are different from those of the first embodiment. That is, the cut-out portion 4 is formed on a side opposite to that of the first embodiment in the component placement portion 2a, and the pair of strip-shaped sheet portions 5 is provided on a side opposite to that of the first embodiment. As a result, the tape winding protruding portion 7 for a branch line is provided to extend from the component placement portion 2a in the same direction similarly to the pair of strip-shaped sheet portions 5, and is arranged using the cut-out portion 4. That is, the tape winding protruding portion 7 for the branch line is positioned between the pair of strip-shaped sheet portions 5.

Since other configurations are the same as those of the first embodiment, the same constituent parts in the drawings will be denoted by the same reference numerals, and the description thereof will be omitted.

Even in the second embodiment, a wire branch portion can be protected regardless of a size of the wire branch portion (not illustrated), and moreover, it is possible to make the size compact as much as possible, which is similar to the first embodiment.

In addition, the tape winding protruding portion 6 is provided at a part where a trunk line (not illustrated) is drawn out to the protector sheet 2B, and thus, the trunk line and the branch protector can be firmly fixed by winding the restraint tape T around the trunk line and the tape winding protruding portion 6 collectively.

The tape winding protruding portion 7 for the branch line is provided to extend from the component placement portion 2a in the same direction similarly to the pair of strip-shaped sheet portions 5, and is arranged using the cut-out portion 4. Therefore, a size in the orthogonal direction N (a width direction) of the trunk line routing direction M of the protector sheet 2B in a developed state is shortened as compared with the first embodiment.

Third Embodiment

Figure 10:
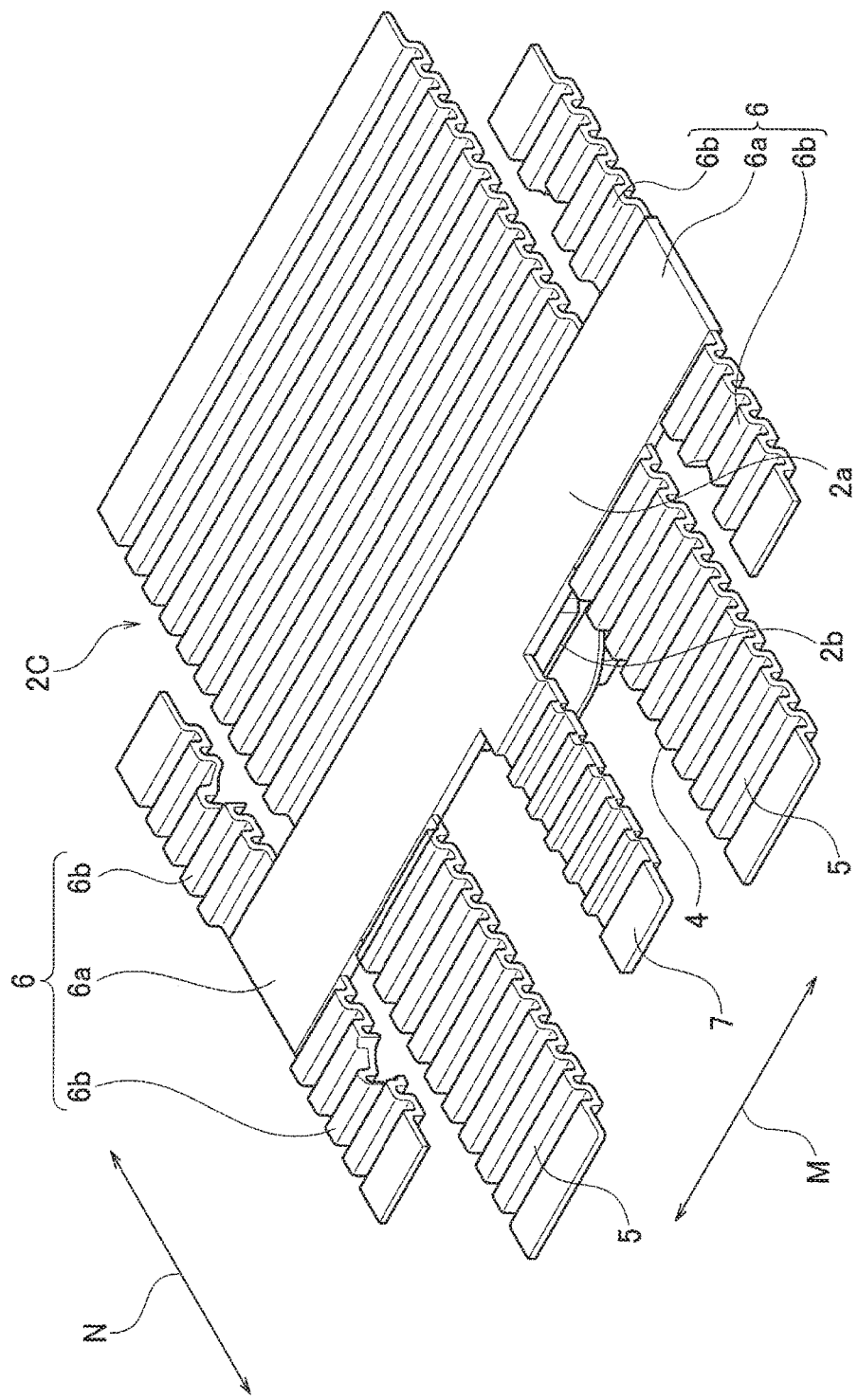
FIG. 10 illustrates a third embodiment of the invention and is a perspective view from a front surface of a protector sheet in a developed state.
Figure 11:
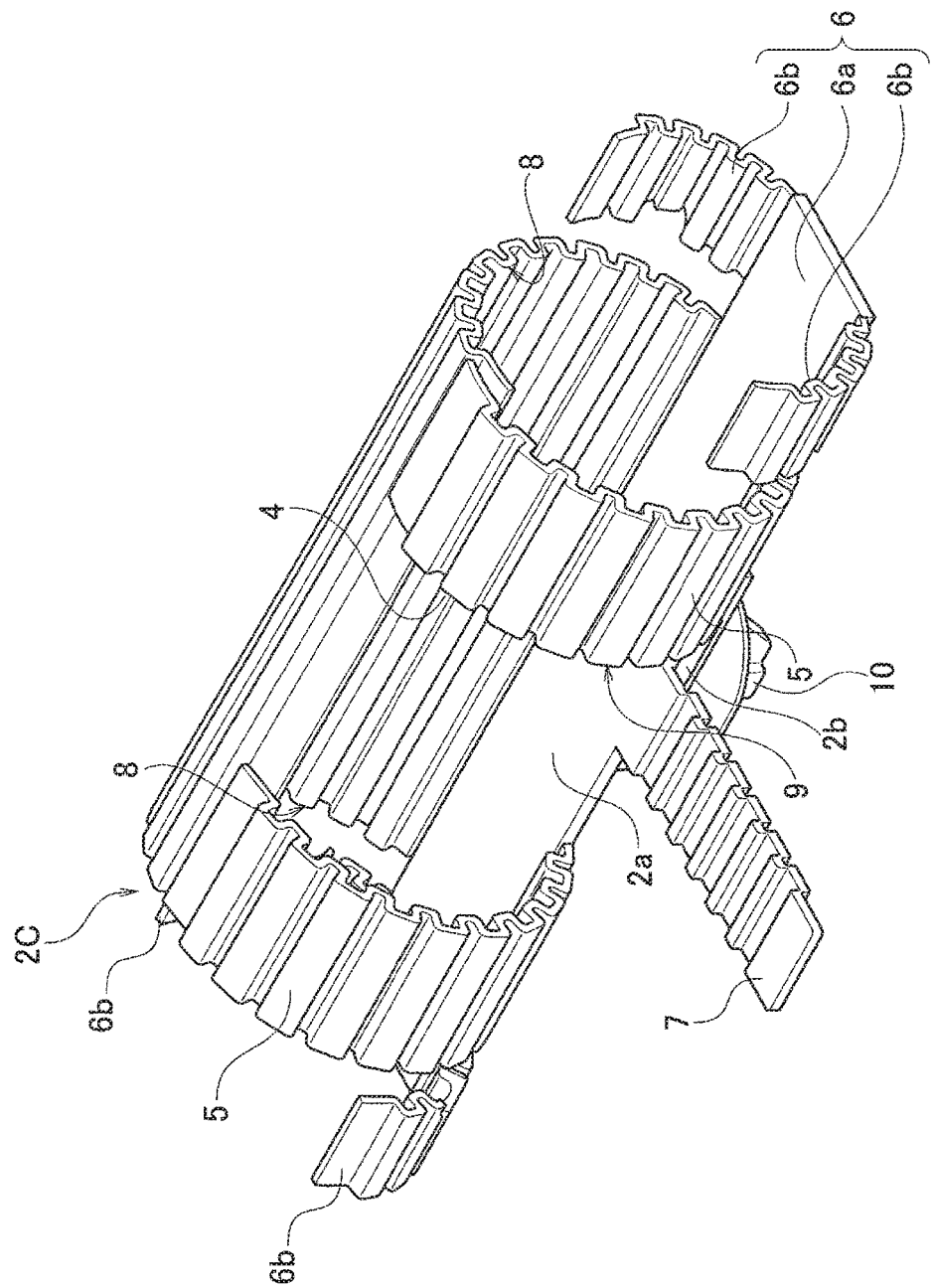
FIG. 11 illustrates the third embodiment of the invention and is a perspective view from a front surface of a protector sheet in a wound state.

FIGS. 10 and 11 illustrate a third embodiment of the invention. As compared with the second embodiment, a branch protector of the third embodiment has a different configuration of the tape winding protruding portion 6 for a trunk line (not illustrated) of a protector sheet 2C. That is, the tape winding protruding portion 6 for the trunk line has a linear protrusion 6a extending along a routing direction of the drawn-out trunk line and a pair of winding protrusions 6b extending in an orthogonal direction from a distal end of the linear protrusion 6a. The linear protrusion 6a is formed at a flat portion to be continuous to the component placement portion 2a. The pair of winding protrusions 6b is formed in a bellows-shape in which a recess and a protrusion are alternately repeated along the orthogonal direction N (a winding distal end direction) of the trunk line routing direction M.

Since other configurations are the same as those of the first embodiment, the same constituent parts in the drawings will be denoted by the same reference numerals, and the description thereof will be omitted.

Even in the third embodiment, a wire branch portion can be protected regardless of a size of the wire branch portion (not illustrated), and moreover, it is possible to make the size compact as much as possible, which is similar to the first embodiment.

In addition, the tape winding protruding portion 6 is provided at a part where the trunk line is drawn out to the protector sheet 2C, and thus, the trunk line and the branch protector can be firmly fixed by winding a restraint tape (not illustrated) around the trunk line and the tape winding protruding portion 6 collectively.

In particular, the tape winding protruding portion 6 for the trunk line has the linear protrusion 6a that abuts on a part of an outer circumference of the trunk line and the pair of winding protrusions 6b that is wound around the outer circumference of the trunk line. Therefore, the fixing of trunk line and branch protector, obtained by winding the restraint tape around the trunk line and the tape winding protruding portion 6 collectively, is further strengthened.

Fourth Embodiment

Figure 12:
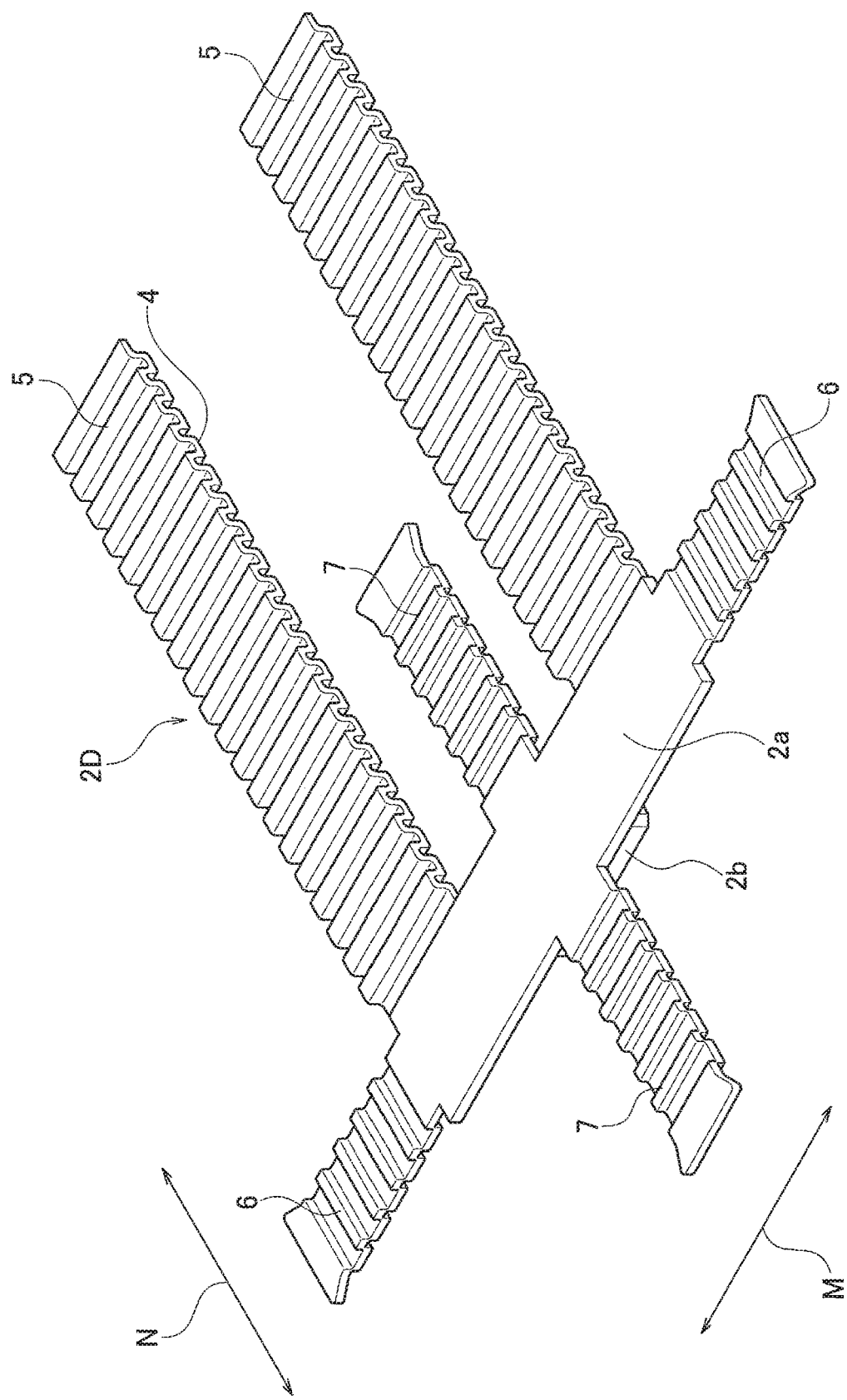
FIG. 12 illustrates a fourth embodiment of the invention and is a perspective view from a front surface of a protector sheet in a developed state.
Figure 13:
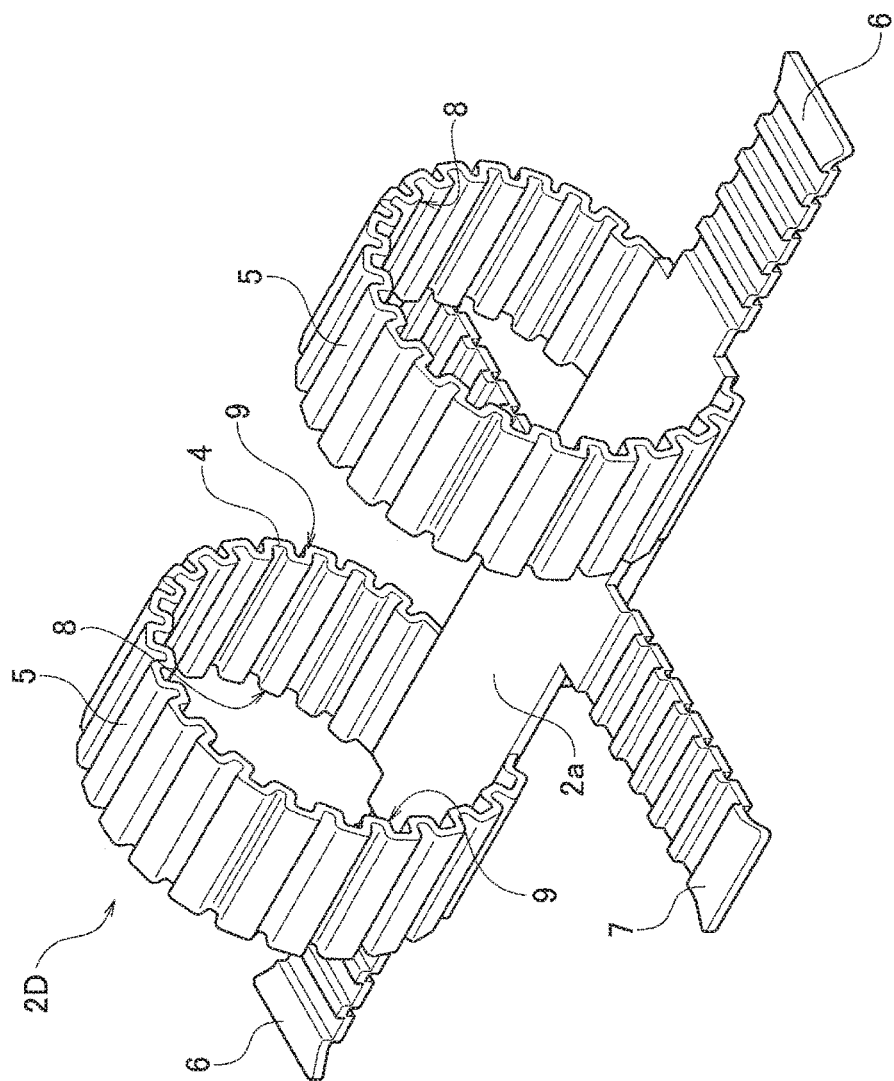
FIG. 13 illustrates the fourth embodiment of the invention and is a perspective view from a front surface of a protector sheet in a wound state.

FIGS. 12 and 13 illustrate a fourth embodiment of the invention. A branch protector of the fourth embodiment protects a four-branch wire branch portion. That is, the wire branch portion in which two branch lines are branched from a trunk line in directions different from each other by 180 degrees is protected.

As illustrated in FIG. 12, the branch protector before being mounted to the wire branch portion is a single flexible sheet that includes a protector sheet 2D and four tape winding protruding portions 6 and 7 extending from the protector sheet 2D.

The protector sheet 2D has the pair of strip-shaped sheet portions 5 divided into two by the cut-out portion 4. The protector sheet 2D has the component placement portion 2a which is a flat portion. The tape winding protruding portions 6 for a trunk line (not illustrated) are provided to extend, respectively, from both ends of the component placement portion 2a of the protector sheet 2D in the trunk line routing direction M. The tape winding protruding portions 7 for a branch line (not illustrated) are provided to extend, respectively, from both side ends of the component placement portion 2a in the orthogonal direction N of the trunk line routing direction M of the component placement portion.

Configurations of the respective tape winding protruding portions 6 and 7 are the same as those of the first embodiment.

Even in the fourth embodiment, a wire branch portion can be protected regardless of a size of the wire branch portion (not illustrated), and moreover, it is possible to make the size compact as much as possible, which is similar to the first embodiment.

In addition, the tape winding protruding portion 6 is provided at a part where the trunk line is drawn out to the protector sheet 2D, and thus, the trunk line and the branch protector can be firmly fixed by winding a restraint tape (not illustrated) around the trunk line and the tape winding protruding portion 6 collectively.

Fifth Embodiment

Figure 14:
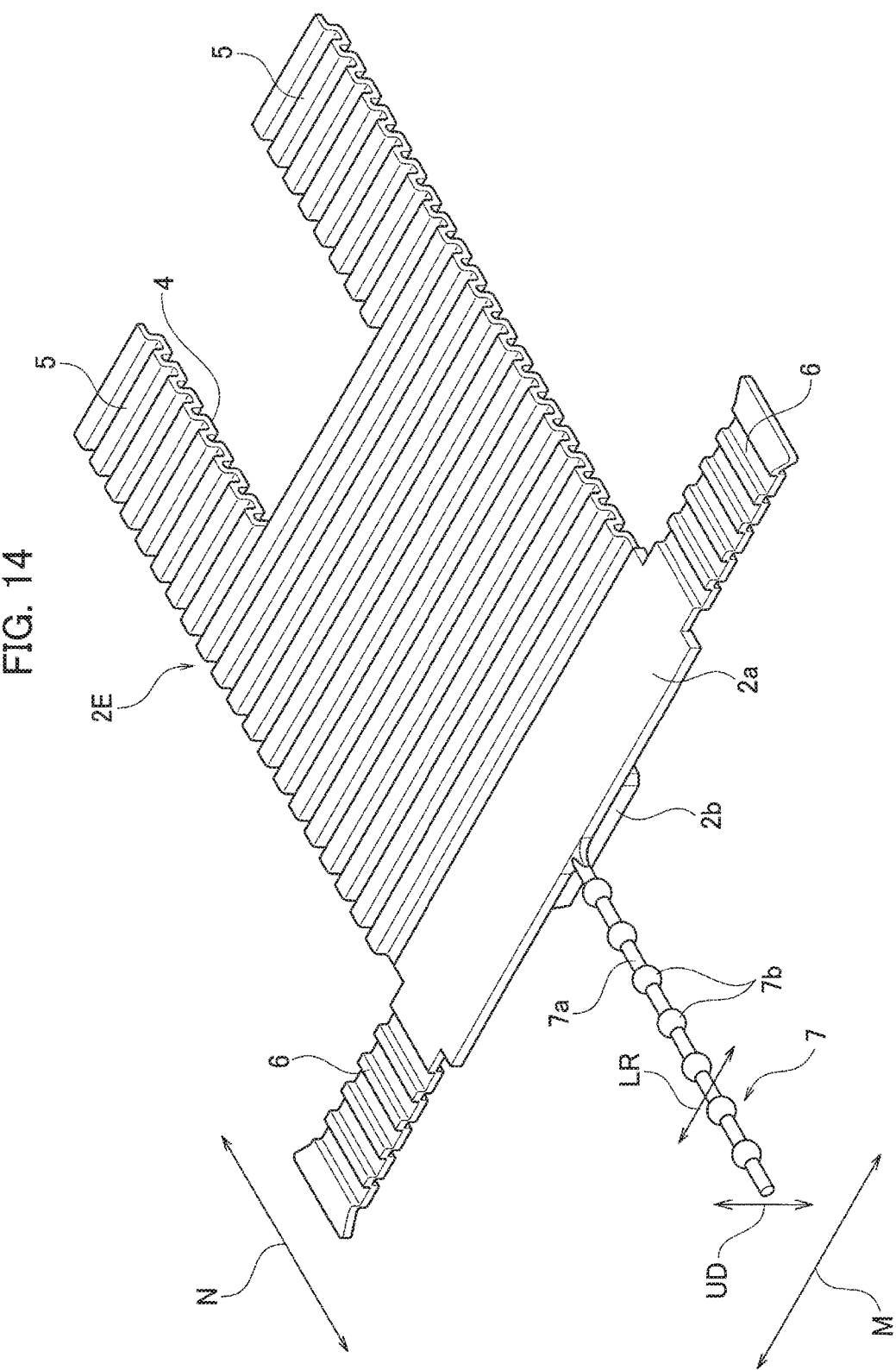
FIG. 14 illustrates a fifth embodiment of the invention and is a perspective view from a front surface of a protector sheet in a developed state.
Figure 15:
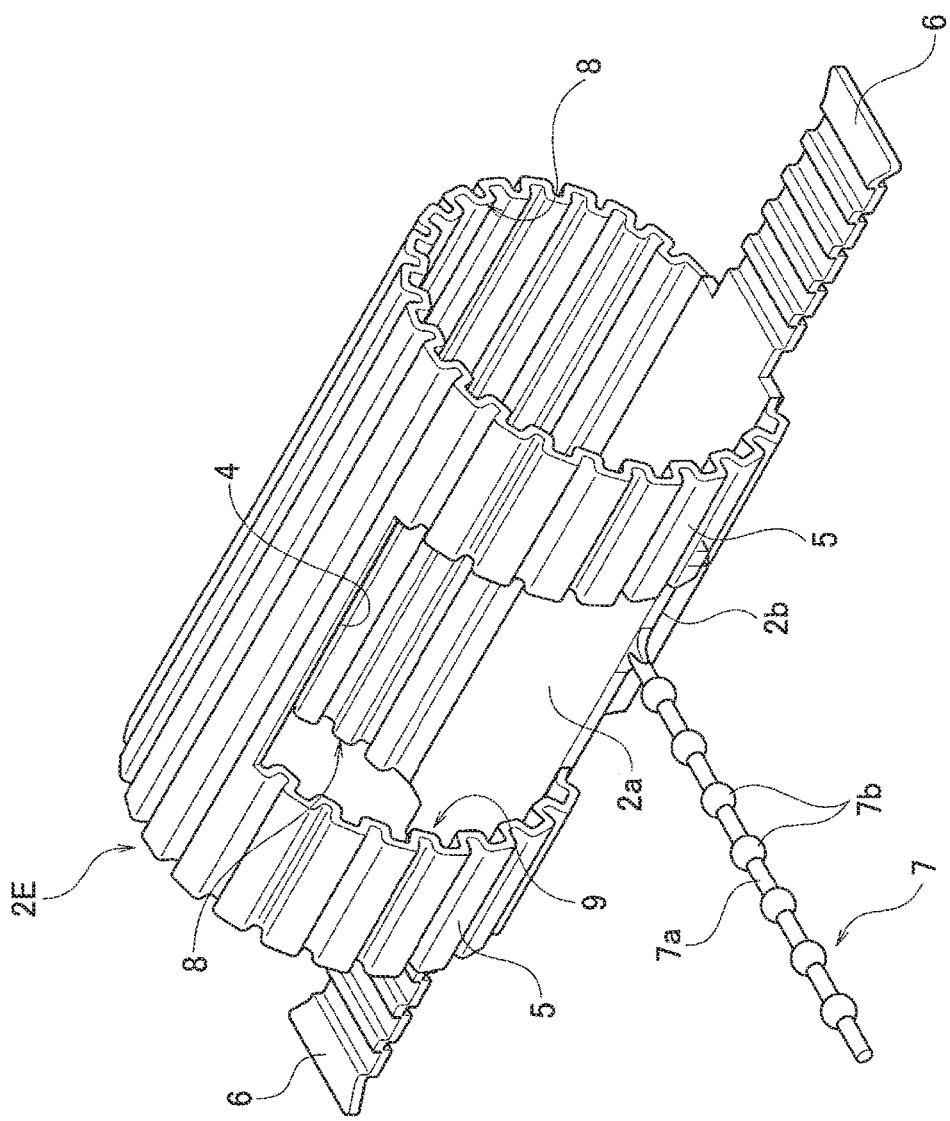
FIG. 15 illustrates the fifth embodiment of the invention and is a perspective view from a front surface of a protector sheet in a wound state.

FIGS. 14 and 15 illustrate a fifth embodiment of the invention. As compared with the first embodiment, a branch protector of the fifth embodiment has a different configuration of the tape winding protruding portion 7 for a branch line of a protector sheet 2E. That is, the tape winding protruding portion 7 for the branch line is a flexible rod 7a. Spherical protrusions 7b are provided to protrude from the flexible rod 7a with intervals Since other configurations are the same as those of the first embodiment, the same constituent parts in the drawings will be denoted by the same reference numerals, and the description thereof will be omitted.

Even in the fifth embodiment, a wire branch portion can be protected regardless of a size of the wire branch portion (not illustrated), and moreover, it is possible to make the size compact as much as possible, which is similar to the first embodiment.

In addition, the protector sheet 2E is provided with the tape winding protruding portion 6 at a part where a trunk line (not illustrated) is drawn out, and thus, the trunk line and the branch protector can be firmly fixed by winding a restraint tape (not illustrated) around the trunk line and the tape winding protruding portion 6 collectively.

The tape winding protruding portion 7 for the branch line is the flexible rod 7a, and thus, can be easily bent and deformed not only in the up-down direction UD but also in a left-right direction LR. Therefore, it is possible to three-dimensionally change a direction of routing the branch line drawn out from the branch line draw-out opening 9, and further, the assembling workability is more favorable and the degree of freedom in routing is also higher as compared with the first to fourth embodiments.

The tape winding protruding portion 7 for the branch line has the spherical protrusions 7b at intervals. Therefore, the restraint tape (not illustrated) is wound so as to eat into the spherical protrusion 7b, and thus, the branch line and the branch protector can be firmly fixed.

Sixth Embodiment

Figure 16:
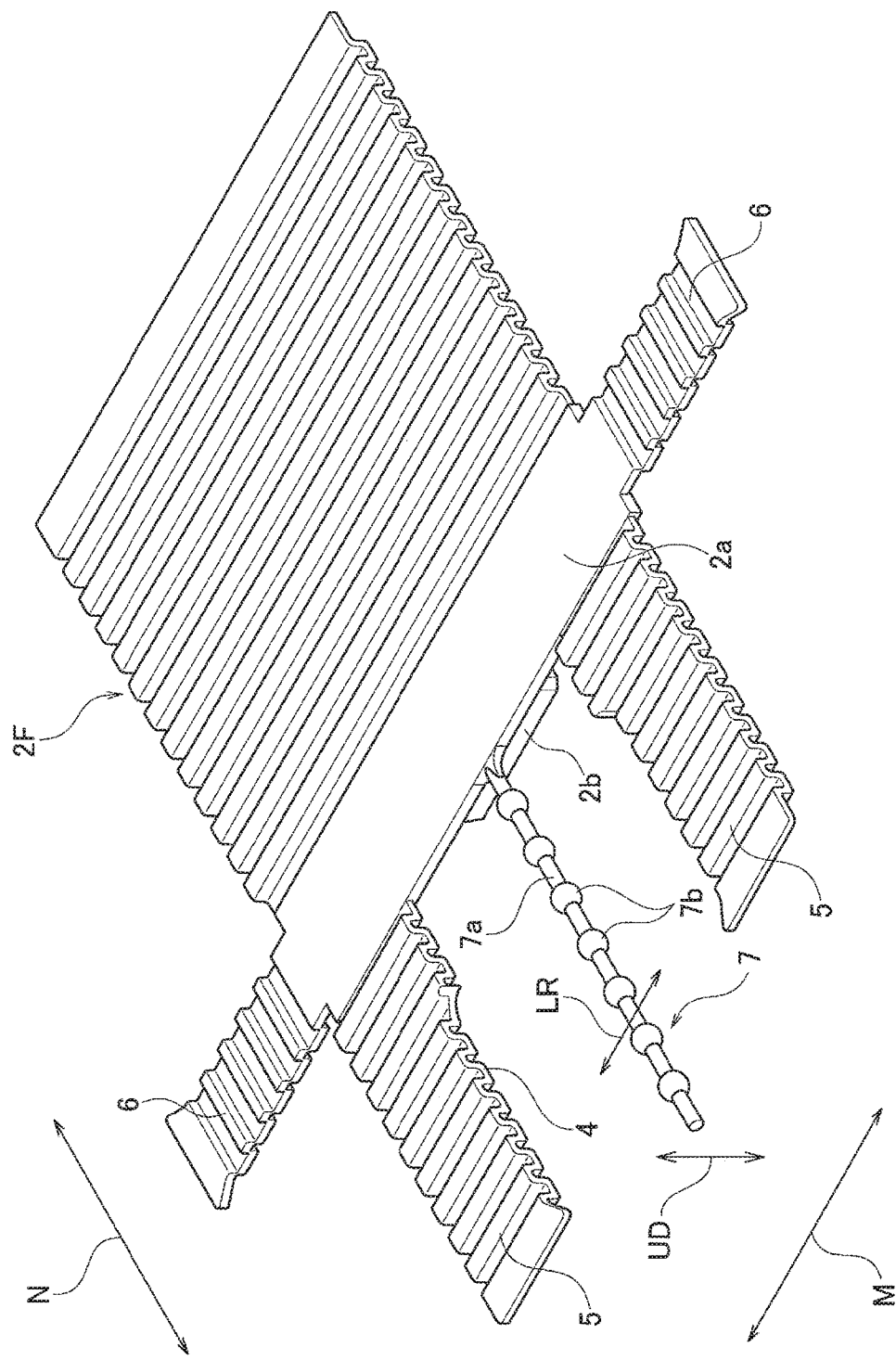
FIG. 16 illustrates a sixth embodiment of the invention and is a perspective view from a front surface of a protector sheet in a developed state.
Figure 17:
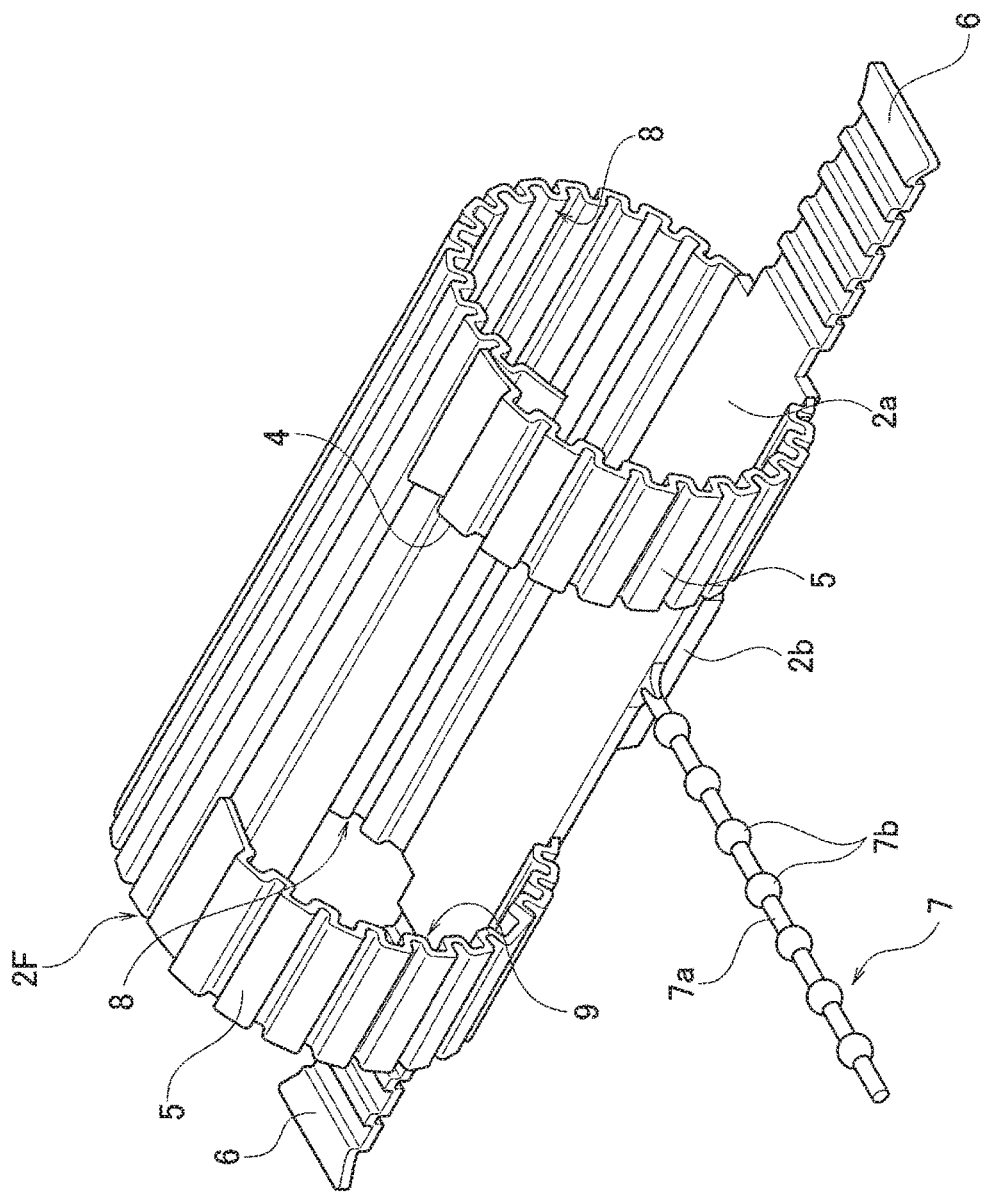
FIG. 17 illustrates the sixth embodiment of the invention and is a perspective view from a front surface of a protector sheet in a wound state.

FIGS. 16 and 17 illustrate a sixth embodiment of the invention. As compared with the second embodiment, a branch protector of the sixth embodiment has a different configuration of the tape winding protruding portion 7 for a branch line (not illustrated) of a protector sheet 2F. That is, the tape winding protruding portion 7 for the branch line is the flexible rod 7a, which is similar to the fifth embodiment. Spherical protrusions 7b are provided to protrude from the flexible rod 7a with intervals Since other configurations are the same as those of the second embodiment, the same constituent parts in the drawings will be denoted by the same reference numerals, and the description thereof will be omitted.

Even in the sixth embodiment, it is possible to obtain the same operational effects as those of the fifth embodiment.

Seventh Embodiment

Figure 18:
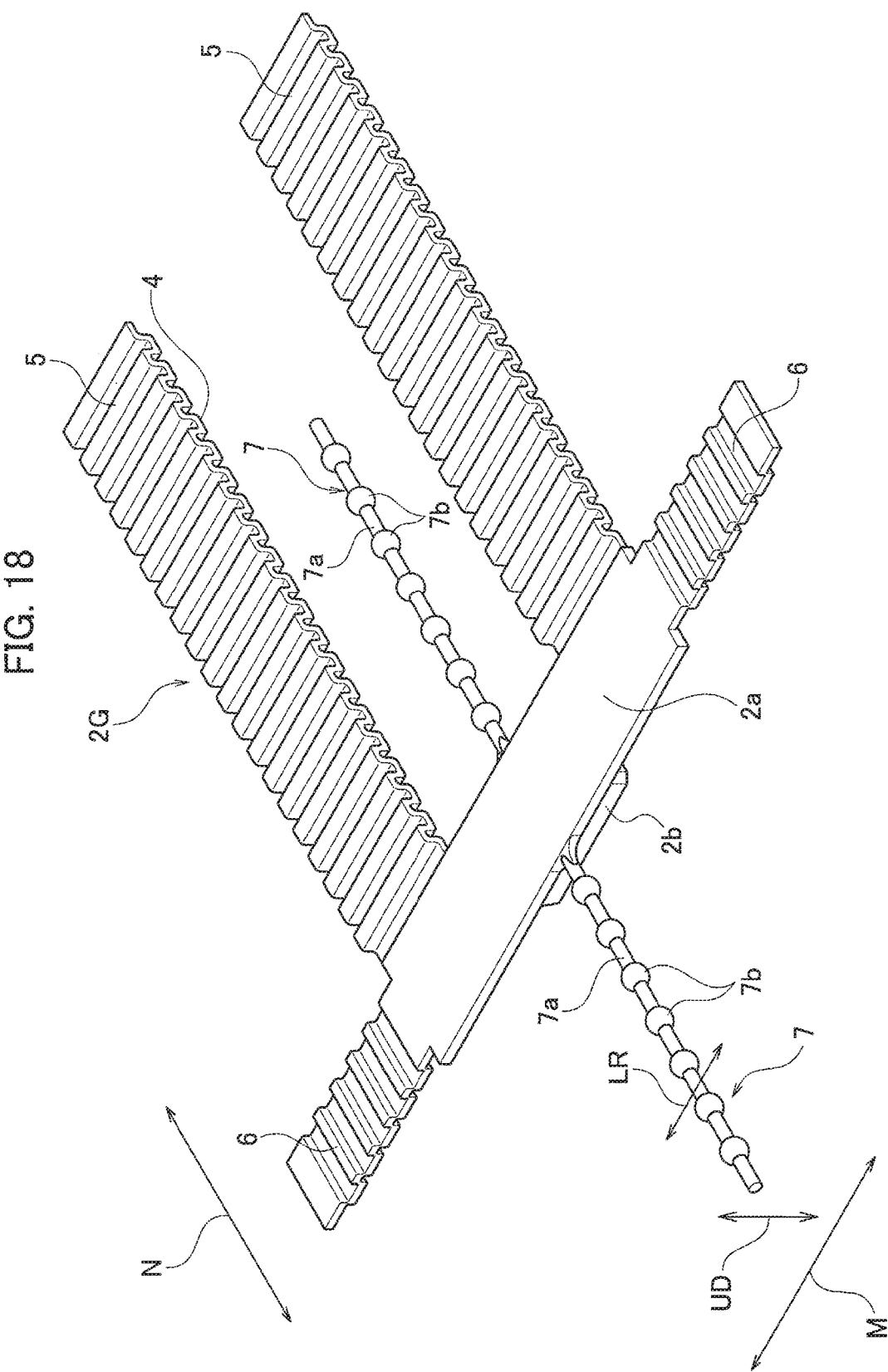
FIG. 18 illustrates a seventh embodiment of the invention and is a perspective view from a front surface of a protector sheet in a developed state.
Figure 19:
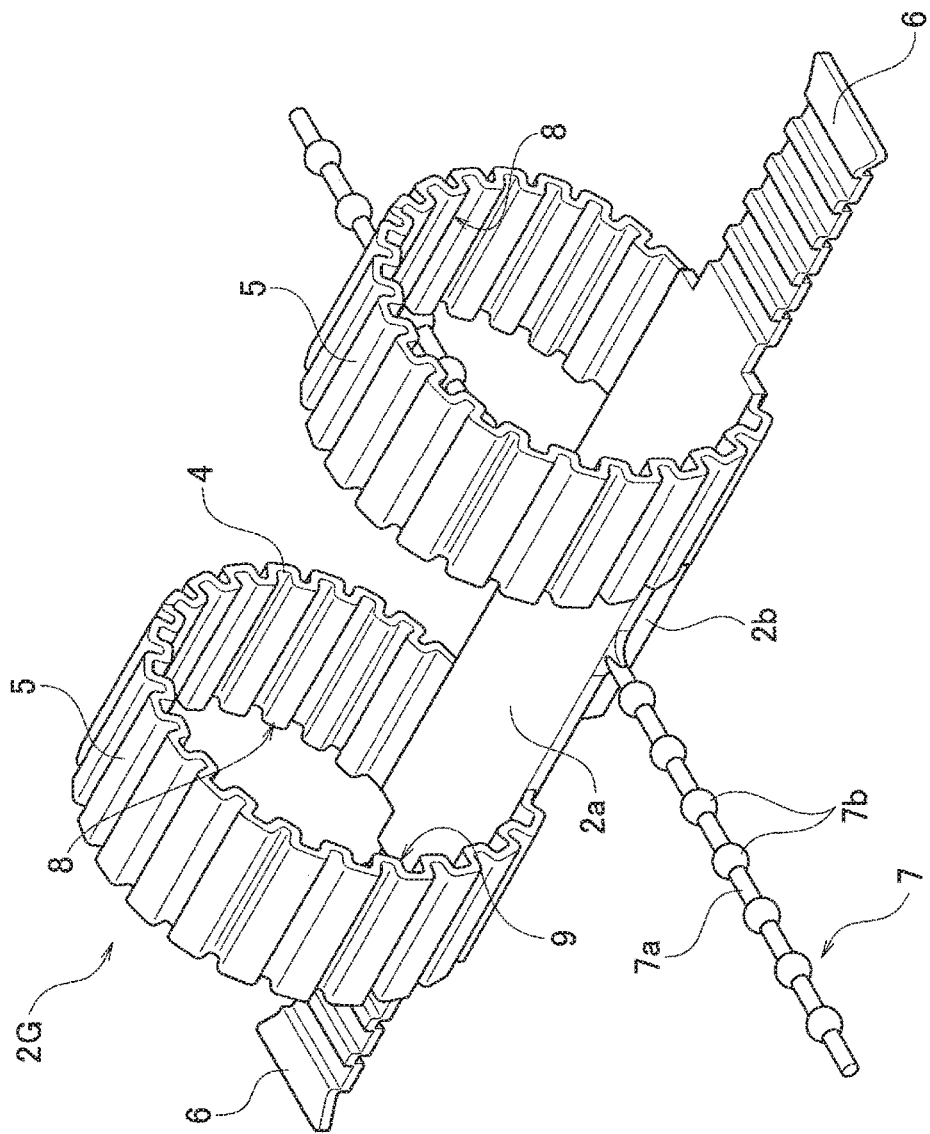
FIG. 19 illustrates the seventh embodiment of the invention and is a perspective view from a front surface of a protector sheet in a wound state.

FIGS. 18 and 19 illustrate a seventh embodiment of the invention. A branch protector of the seventh embodiment protects a four-branch wire branch portion, which is similar to the fourth embodiment. As compared with the fourth embodiment, the branch protector has a different configuration of the tape winding protruding portion 7 for a branch line (not illustrated) of a protector sheet 2G. That is, the tape winding protruding portion 7 for the branch line is the flexible rod 7a, which is similar to the fifth embodiment. Spherical protrusions 7b are provided to protrude from the flexible rod 7a with intervals Since other configurations are the same as those of the fourth embodiment, the same constituent parts in the drawings will be denoted by the same reference numerals, and the description thereof will be omitted.

Even in the seventh embodiment, it is possible to obtain the same operational effects as those of the fifth embodiment.

Embodiment with Two Branch Protector Members

An eighth embodiment to a twelfth embodiment of the invention will be described. A branch protector in the eighth to twelfth embodiments has two branch protector members, which is different from the first to seventh embodiments. At least one of the two branch protector members is a flexible protector sheet. Each embodiment will be described hereinafter.

Eighth Embodiment

FIGS. 20 to 23B illustrate the eighth embodiment of the invention. A branch protector 1H of the eighth embodiment has two branch protector members, that is, the protector sheet 2A and a reinforcing protector sheet 21.

That is, the branch protector 1H includes the protector sheet 2A, the reinforcing protector sheet 21, and the restraint tape T that is wound around the protector sheet 2A, the reinforcing protector sheet 21, and the trunk line W1, and the protector sheet 2A, the reinforcing protector sheet 21, and the branch line W2.

Since the protector sheet 2A has the same configuration as that of the first embodiment, the same constituent parts in the drawings will be denoted by the same reference numerals, and the description thereof will be omitted.

Figure 20:
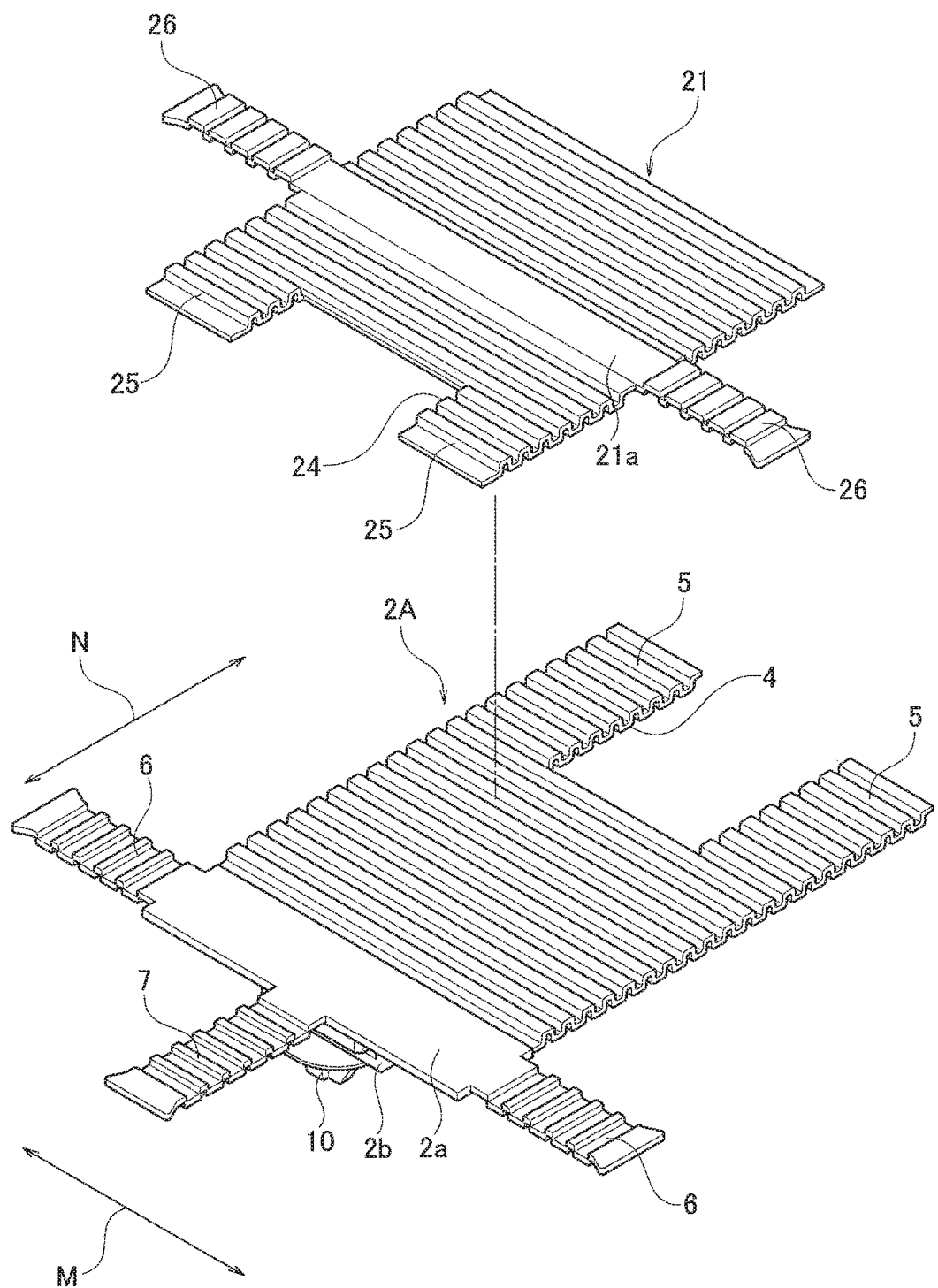
FIG. 20 illustrates an eighth embodiment of the invention and is a perspective view of a protector sheet and a reinforcing protector sheet both in a developed state.

As illustrated in FIG. 20, the reinforcing protector sheet 21 is a flexible sheet having a flat shape before being mounted to the wire branch portion WD.

The reinforcing protector sheet 21 includes a pair of strip-shaped sheet portions 25 arranged at intervals by a cut-out portion 24 and two tape winding protruding portions 26 for a trunk line.

The reinforcing protector sheet 21 is provided with a rigid sheet portion 21a extending along the trunk line routing direction M. The rigid sheet portion 21a is formed in a flat shape. A part of the reinforcing protector sheet 21 other than the rigid sheet portion 21a and the tape winding protruding portions 26 are formed in a bellows-shape in which a recess and a protrusion are alternately repeated toward the orthogonal direction N (winding distal end direction) of the trunk line routing direction M.

The reinforcing protector sheet 21 is wound from an outer side of the protector sheet 2A around an outer circumference on side of an upper surface of the wire branch portion WD except for a part where the branch line W2 is drawn out.

The respective tape winding protruding portions 26 for the trunk line W1 are provided to extend from both ends of the reinforcing protector sheet 21 in the trunk line routing direction M. The respective tape winding protruding portions 26 for the trunk line W1 protrude in directions of routing the trunk lines W1 drawn out from the trunk line draw-out openings 8, respectively, in the state of mounting the branch protector 1H.

Each of the tape winding protruding portions 26 for the trunk line W1 has a sheet shape similarly to the reinforcing protector sheet 21. Each of the tape winding protruding portions 26 is formed in a bellows-shape in which a recess and a protrusion are alternately repeated along a protruding direction.

Next, assembling work of the branch protector 1H will be described. As illustrated in FIG. 20, the protector sheet 2A in a developed state is arranged at an assembling work position (for example, on the jig pin erected on the jig base). Next, the trunk lines W1 of the wire branch portion WD are placed on the component placement portion 2a of the protector sheet 2A and the two tape winding protruding portions 6 for the trunk lines W1, and the branch line W2 of the wire branch portion WD is placed on the tape winding protruding portion 7 for the branch line W2 as illustrated in FIGS. 21A and 21B.

Figure 21A:
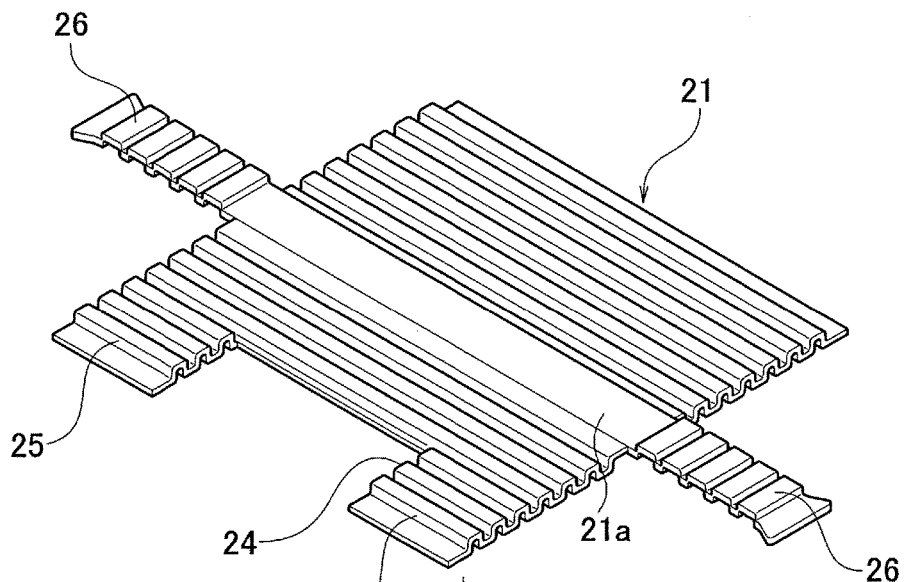
FIG. 21A is a perspective view of a state where the protector sheet is wound around a wire branch portion in the eighth embodiment of the invention.
Figure 21B:
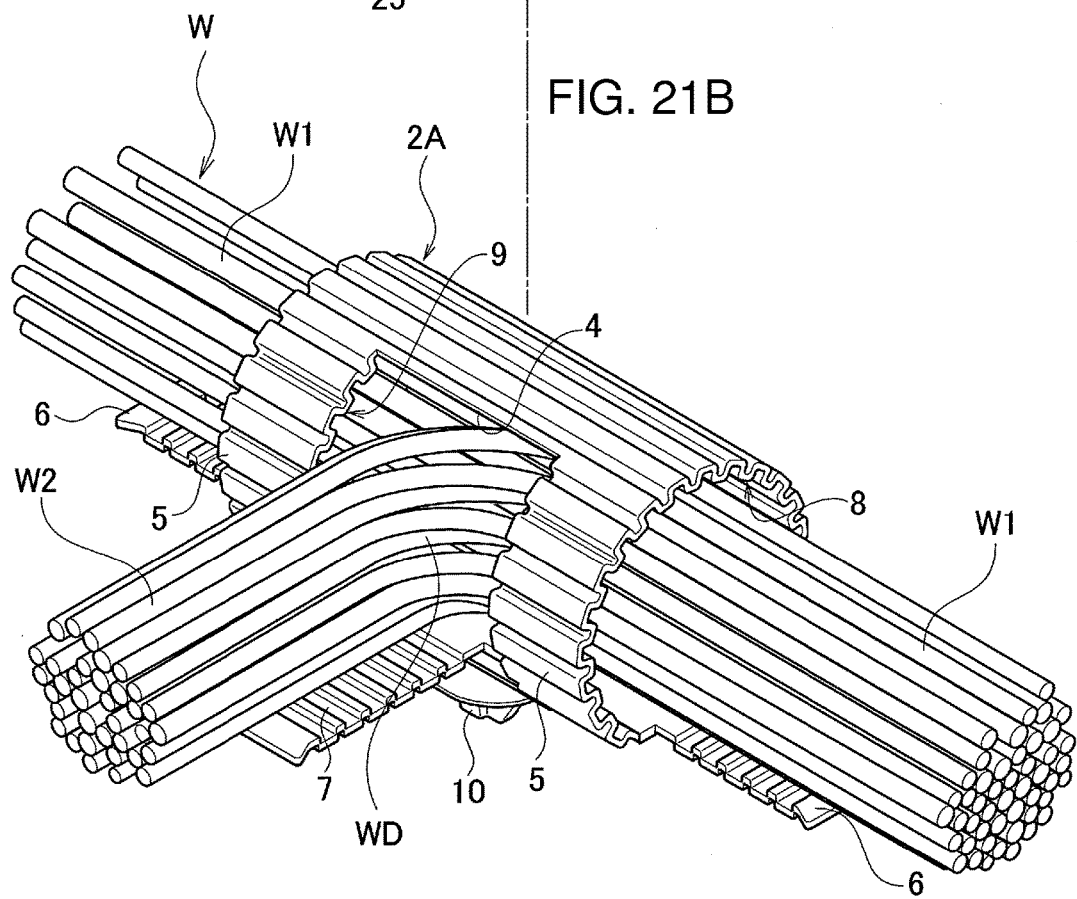
FIG. 21B is a front view of the state where the protector sheet is wound around the wire branch portion in the eighth embodiment of the invention.

Next, the protector sheet 2A is wound around the outer circumference of the wire branch portion WD with no gap as illustrated in FIGS. 21A and 21B. Winding distal ends of the pair of strip-shaped sheet portions 5 of the protector sheet 2A are wound at the outer side of the protector sheet 2A to overlap each other.

Figure 22A:
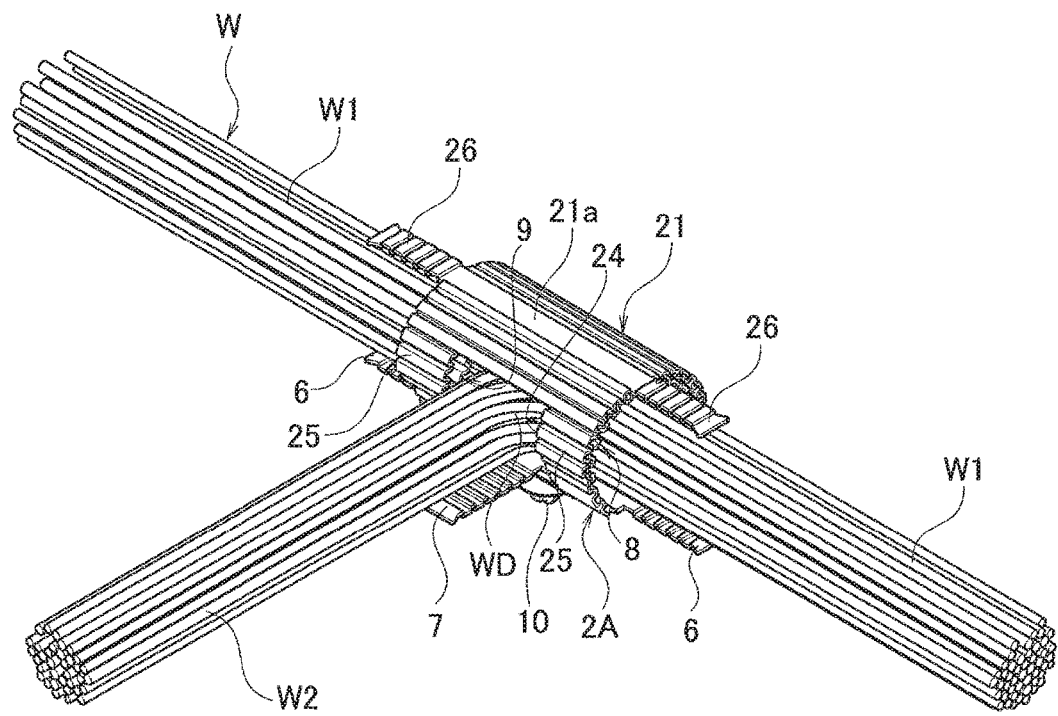
FIG. 22A is a perspective view of a state where the reinforcing protector sheet is wound above the protector sheet in the eighth embodiment of the invention.
Figure 22B:
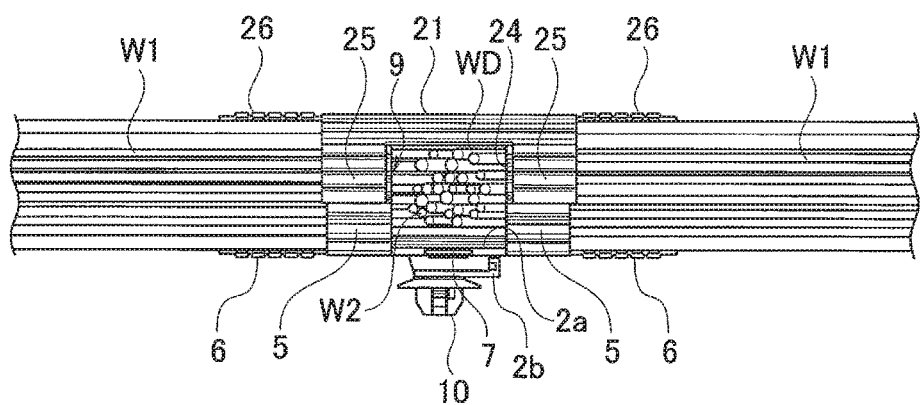
FIG. 22B is a front view of the state where the reinforcing protector sheet is wound above the protector sheet in the eighth embodiment of the invention.

Next, the reinforcing protector sheet 21 is wound on the side of the upper surface of the wire branch portion WD so as to overlap the protector sheet 2A from above as illustrated in FIGS. 22A and 22B.

Figure 23A:
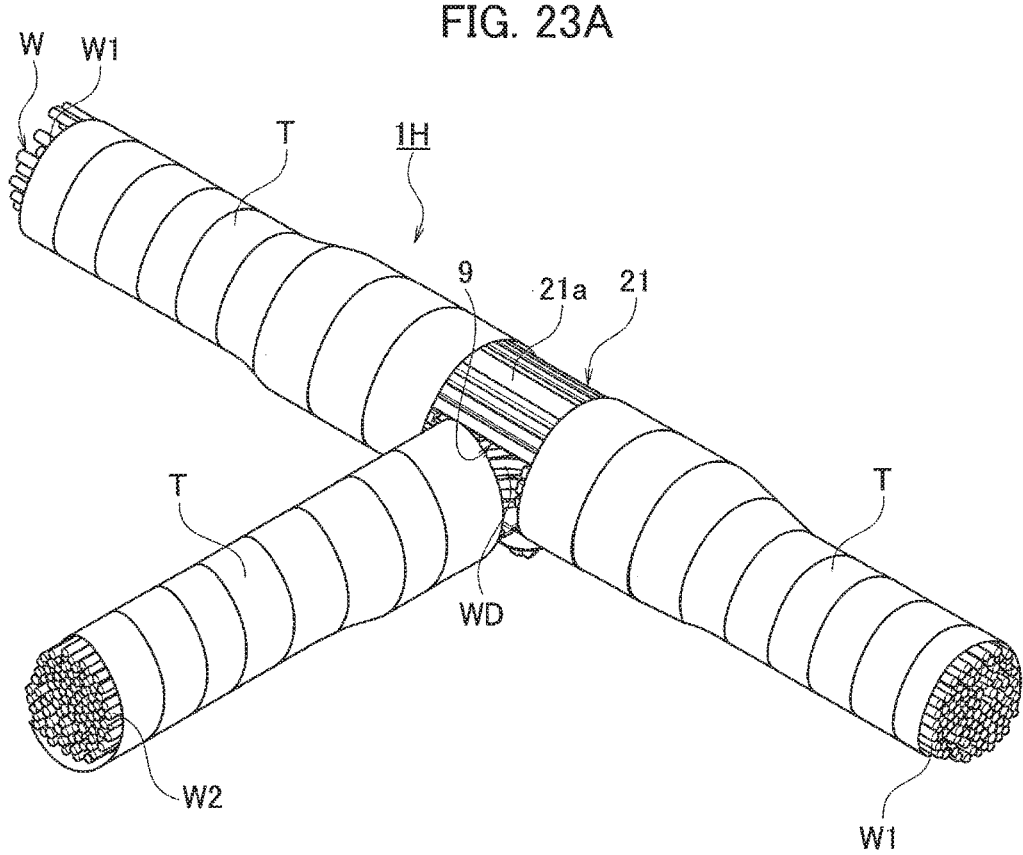
FIG. 23A is a perspective view of a state where a restraint tape is wound around the protector sheet, the reinforcing protector sheet, and a trunk line, and the protector sheet, the reinforcing protector sheet, and a branch line in the eighth embodiment of the invention.
Figure 23B:
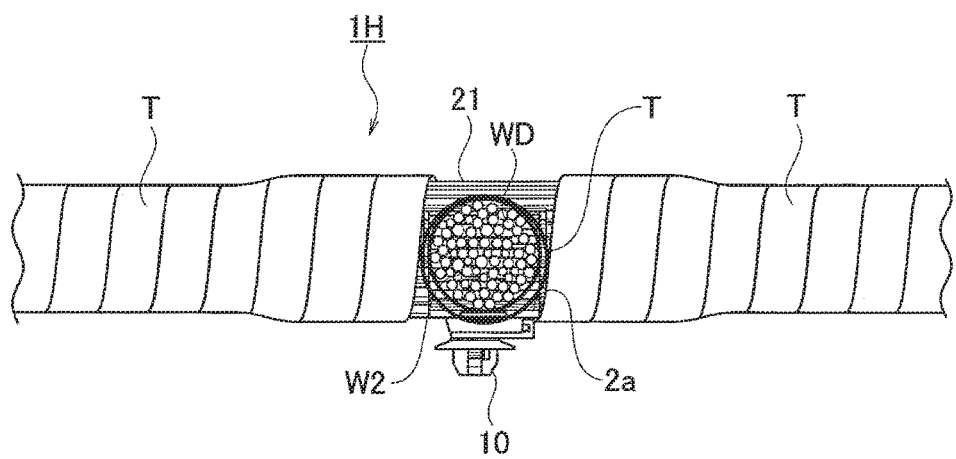
FIG. 23B is a front view of the state where a restraint tape is wound around the protector sheet, the reinforcing protector sheet, and the trunk line, and the protector sheet, the reinforcing protector sheet, and the branch line in the eighth embodiment of the invention.

Next, the restraint tape T is wound around the protector sheet 2A, the reinforcing protector sheet 21, and the respective trunk lines W1, and the protector sheet 2A, the reinforcing protector sheet 21, and the branch line W2 with no gap as illustrated in FIGS. 23A and 23B.

Specifically, regarding each of the trunk lines W1, the restraint tape T is wound around the outer circumference of the protector sheet 2A in a range where each of the tape winding protruding portions 6 and 26 are not present, wound collectively around the tape winding protruding portions 6 and 26 and the trunk line W1 in a range where the tape winding protruding portions 6 and 26 are present, and wound around an outer circumference of the trunk line W1 with no gap at a part on a side closer to the distal end than the tape winding protruding portions 6 and 26, using both end positions of the cut-out portions 4 an 24 of the protector sheet 2A and the reinforcing protector sheet 21 as winding start points. As a result, the respective trunk line draw-out openings 8 are completely shielded by the restraint tape T.

Regarding the branch line W2, the restraint tape T is wound collectively around the outer circumferences of the tape winding protruding portion 7 and the branch line W2 in a range where the tape winding protruding portion 7 is present and wound around the outer circumference of the branch line W2 with no gap at a part on a side closer to a distal end of the tape winding protruding portion 7, using a root position of the tape winding protruding portion 7 as a winding start point. The assembling work of the branch protector 1H is completed in this manner.

A wire harness is assembled by mounting components other than the branch protector 1H to the trunk line W1 and the branch line W2.

As described above, the branch protector 1H has the cut-out portion 4 from which the branch line of the wire branch portion WD is drawn out, and further, has the flexible protector sheet 2A wound around the trunk line W1 of the wire branch portion WD and from which the trunk lines W1 of the wire branch portion WD are drawn out and the tape winding protruding portions 6 provided to extend from both the ends of the protector sheet 2A, respectively, and protrude in the routing directions of the drawn-out trunk lines W1.

Therefore, the wire branch portion WD can be protected regardless of a size of the wire branch portion WD since the wire branch portion WD is protected by winding the protector sheet 2A around the wire branch portion WD. Moreover, a useless space is not formed inside the protector sheet 2A since the protector sheet 2A covers an outer surface of the wire branch portion WD. As described above, it is possible to protect the wire branch portion WD regardless of the size of the wire branch portion WD, and moreover, it is possible to make the size compact as much as possible.

In addition, the protector sheet 2A has the tape winding protruding portion 6 at a part where the trunk line W1 is drawn out. Therefore, the trunk line W1 and the branch protector 1H can be firmly fixed by winding the restraint tape T around the trunk line W1 and the tape winding protruding portion 6 collectively. As a result, it is possible to reliably prevent the branch protector 1H from being detached from the trunk line W1 due to a pulling force acting on the trunk line W1, or from causing a relative positional deviation although the branch protector 1H is not detached. In particular, since the reinforcing protector sheet 21 also has the tape winding protruding portion 26 of the trunk line W1, the trunk line W1 and the branch protector 1H can be more firmly fixed as compared with the first to seventh embodiments.

The branch protector 1H includes the two trunk line draw-out openings 8 formed by the winding shapes of both the ends of the protector sheet 2A and from which the trunk lines W1 are drawn out, respectively, and the branch line draw-out opening 9 formed by the cut-out portion 4 of the protector sheet 2A and from which the branch line W2 is drawn out.

Therefore, it is unnecessary to form a unique shape such as a cut-out for to form the two trunk line draw-out openings 8 and 9 on the protector sheet 2A, and a simple sheet shape is formed. Further, the reinforcing protector sheet 21 also has the same configuration. As described above, it is possible to obtain the branch protector 1H with the two simple sheet shapes.

The protector sheet 2A has the pair of strip-shaped sheet portions 5 with the cut-out portion 4 therebetween, and the protector sheet 2A is wound around the entire circumference of the trunk lines W1 on both outer sides of the branch line of the wire branch portion WD. Therefore, it is possible to protect the entire part of the wire branch portion WD by the protector sheet 2A except for the part where the branch line W2 is drawn out. Further, the reinforcing protector sheet 21 is also wound around the wire branch portion WD from above the protector sheet 2A. That is, since the branch protector 1H protects the wire branch portion WD with the two sheets of the protector sheet 2A and the reinforcing protector sheet 21, the wire branch portion WD can be firmly protected.

The winding distal ends of the respective strip-shaped sheet portions 5 are wound around the protector sheet 2A to overlap each other. Therefore, it is possible to protect the entire circumference of the trunk line W1 simply by winding the protector sheet 2A around the outer circumference of the trunk line W1. With the overlapping winding, the strength of the branch protector 1H is increased and a protection function is improved.

The protector sheet 2A has the tape winding protruding portion 7 that protrudes in the routing direction of the drawn-out branch line W2. Therefore, the branch line W2 and the branch protector 1H can be firmly fixed by winding the restraint tape T around the branch line W2 and the tape winding protruding portion 7 collectively. As a result, it is possible to reliably prevent the branch protector 1H from being detached from the branch line W2 due to a pulling force acting on the branch line W2, or from causing a relative positional deviation although the branch protector 1H is not detached.

The protector sheet 2A is formed in the bellows-shape except for the component placement portion 2a. Therefore, the winding workability is favorable since the protector sheet 2A can be easily wound around the trunk line W1. The reinforcing protector sheet 21 is also formed in the bellows-shape except for the rigid portion. Therefore, the winding workability is favorable since the reinforcing protector sheet 21 can be easily wound around the trunk line W1.

Each of the tape winding protruding portions 6 and 7 of the trunk line W1 and the branch line W2 is formed like a sheet in a bellows-shape in which a recess and a protrusion are alternately repeated along a protruding direction. Therefore, the trunk line W1 and the branch line W2 drawn out from the branch protector 1H can be easily bent and deformed in an up-down direction UD in the routing directions of the trunk line W1 and the branch line W2, and thus, the routing workability is favorable. Further, the degree of freedom in the routing direction is also high.

The protector sheet 2A is provided with the clip 10. Therefore, the branch protector 1H can be easily fixed to the vehicle body using the clip 10.

Ninth Embodiment

Figure 25:
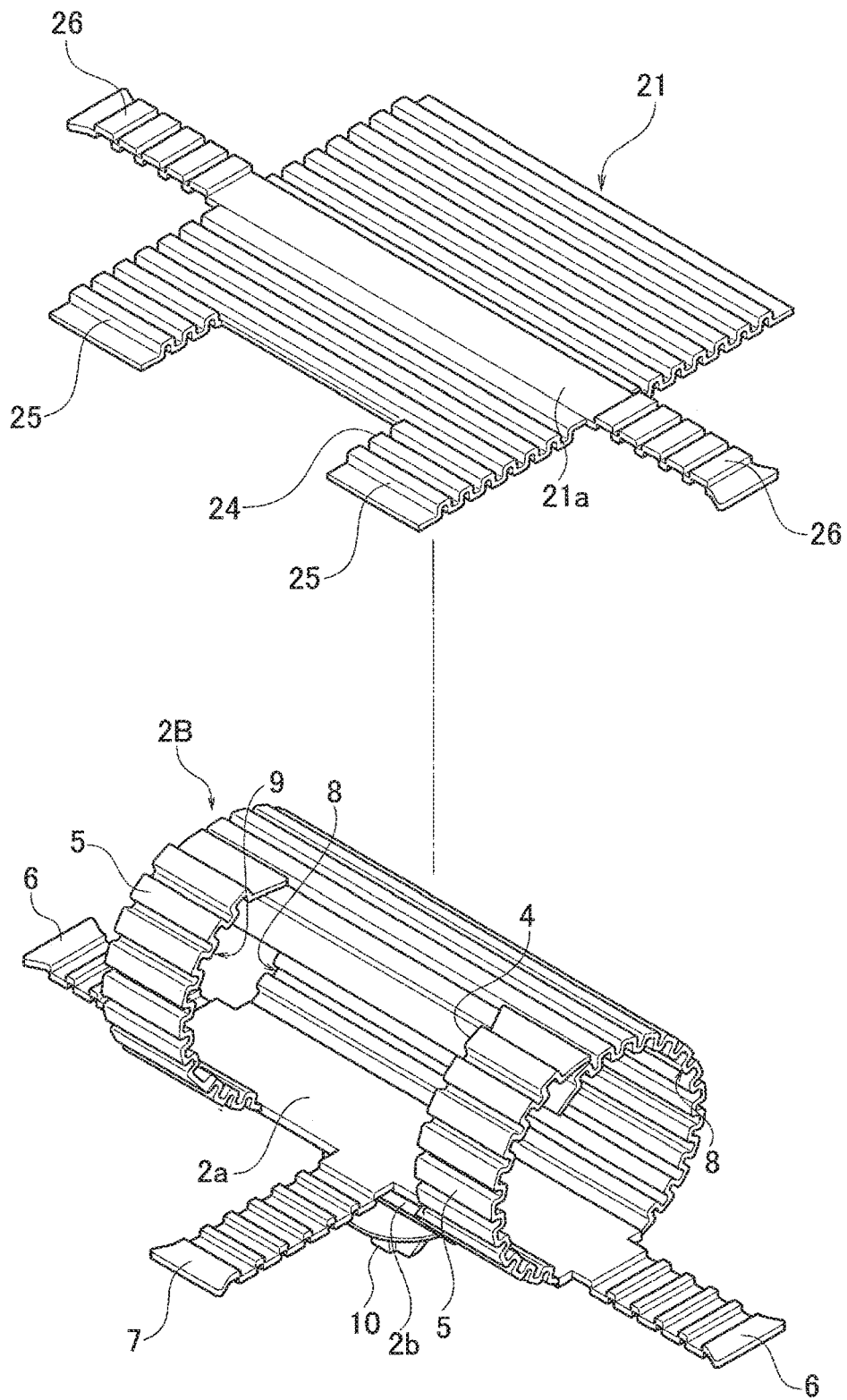
FIG. 25 illustrates the ninth embodiment of the invention and is a perspective view of the protector sheet in a wound state and the reinforcing protector sheet.
Figure 26:
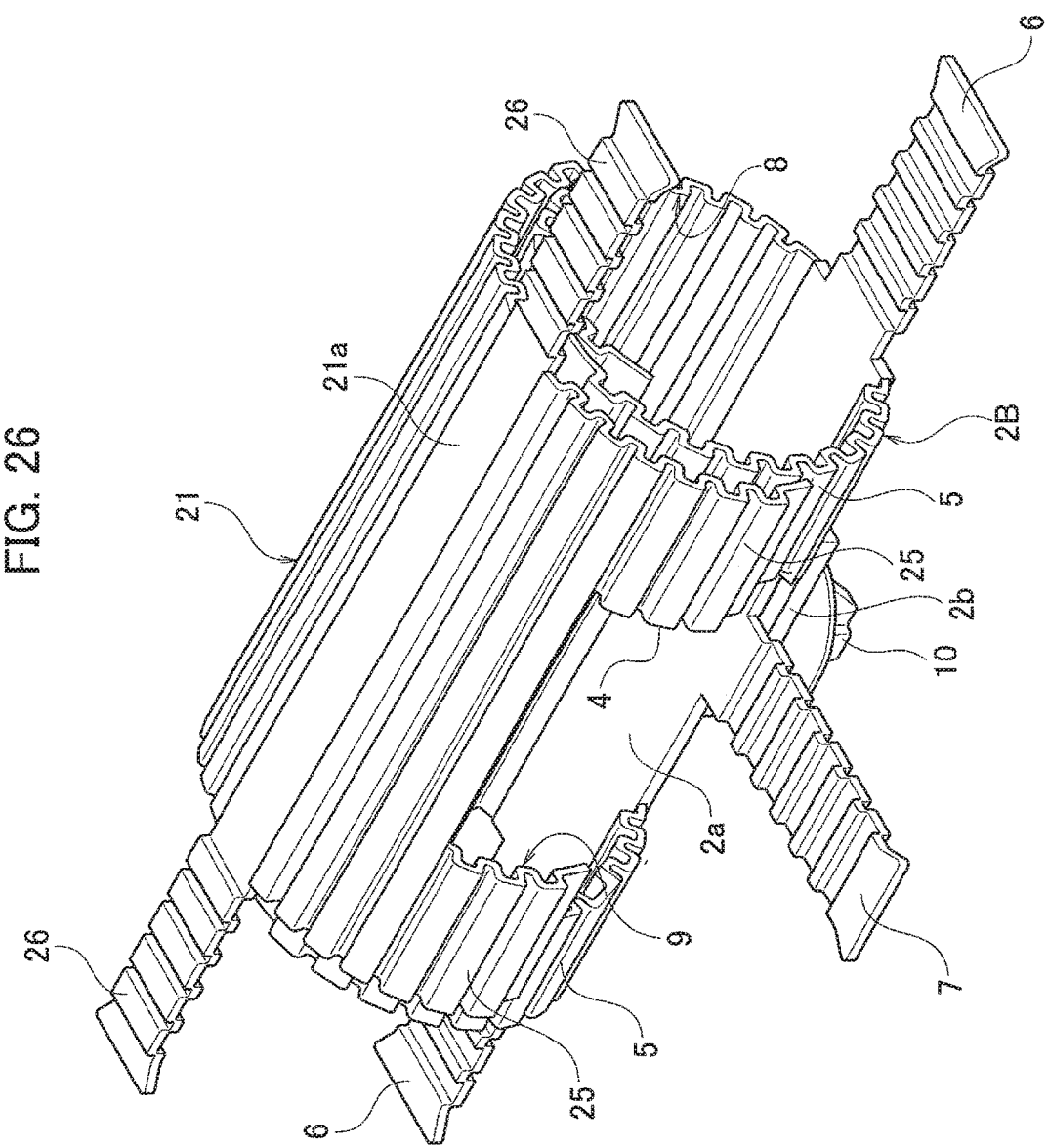
FIG. 26 illustrates the ninth embodiment of the invention and is a perspective view of a state where the reinforcing protector sheet is wound above the protector sheet in the wound state.

FIGS. 24 to 26 illustrate the ninth embodiment of the invention. A branch protector of the ninth embodiment has two branch protector members, that is, a protector sheet 2B and the reinforcing protector sheet 21, which is similar to the eighth embodiment.

That is, the branch protector includes the protector sheet 2B, the reinforcing protector sheet 21, and a restraint tape (not illustrated) that is wound around the protector sheet 2B, the reinforcing protector sheet 21, and a trunk line (not illustrated), and the protector sheet 2B, the reinforcing protector sheet 21, and a branch line (not illustrated).

Since the protector sheet 2B has the same configuration as that of the second embodiment, the same constituent parts in the drawings will be denoted by the same reference numerals, and the description thereof will be omitted.

Since the reinforcing protector sheet 21 has the same configuration as that of the eighth embodiment, the same constituent parts in the drawings will be denoted by the same reference numerals, and the description thereof will be omitted.

Since assembling work of the branch protector is the same as that of the eighth embodiment, the description thereof will be omitted. A wire harness is assembled by performing mounting of components other than the branch protector to the trunk line and branch line in addition to the assembling of the branch protector Even in the ninth embodiment, the wire branch portion WD can be protected regardless of a size of the wire branch portion WD, and moreover, it is possible to make the size compact as much as possible, which is similar to the eighth embodiment.

In addition, since the wire branch portion WD is protected by the two sheets of the protector sheet 2B and the reinforcing protector sheet 21, the wire branch portion WD can be firmly protected, which is similar to the eighth embodiment.

The branch protector of the ninth embodiment has the same effects as those of the eighth embodiment in addition to the above-described effects.

Tenth Embodiment

Figure 27:
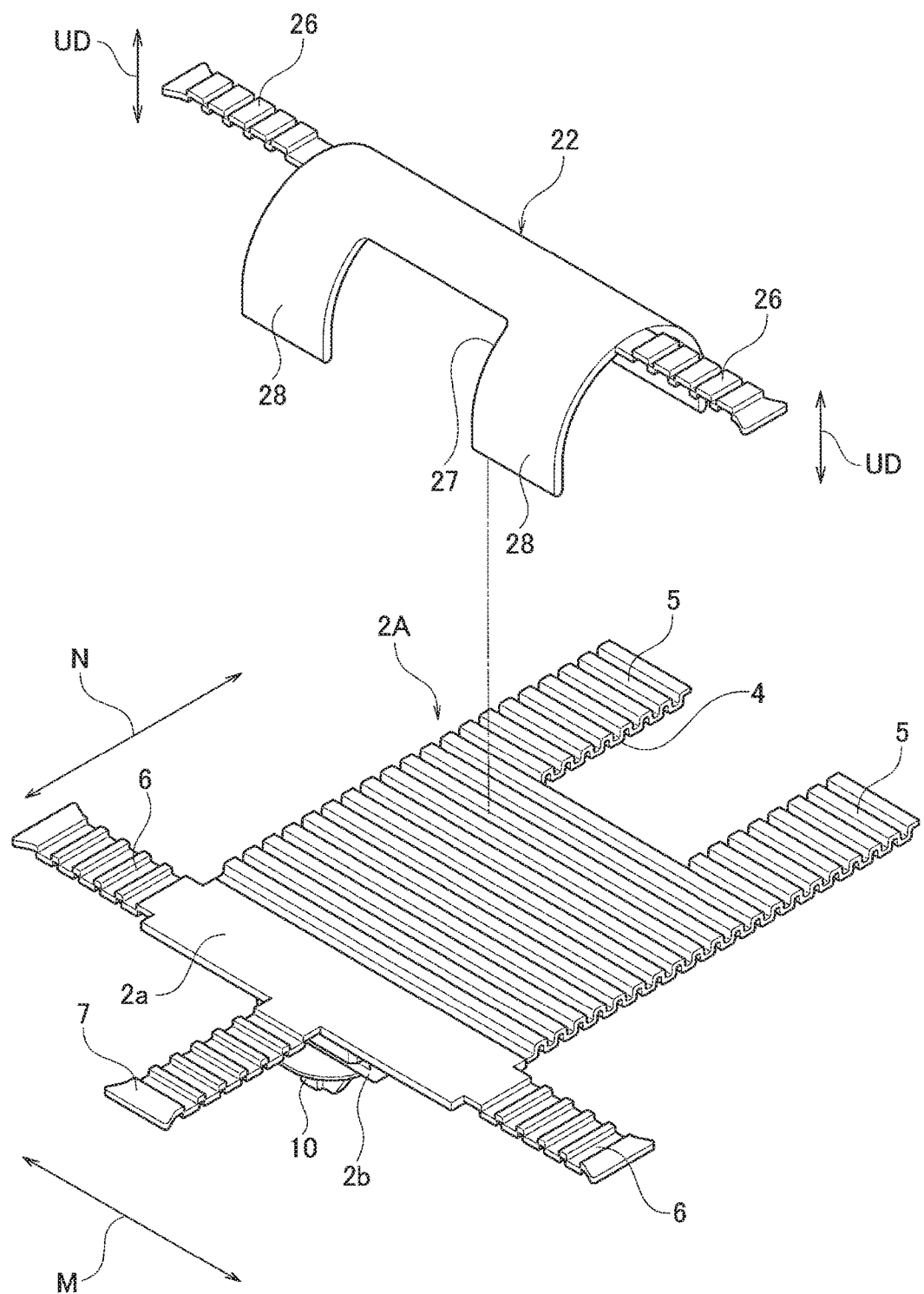
FIG. 27 illustrates a tenth embodiment of the invention and is a perspective view of a protector sheet in a developed state and a reinforcing protector plate.
Figure 28:
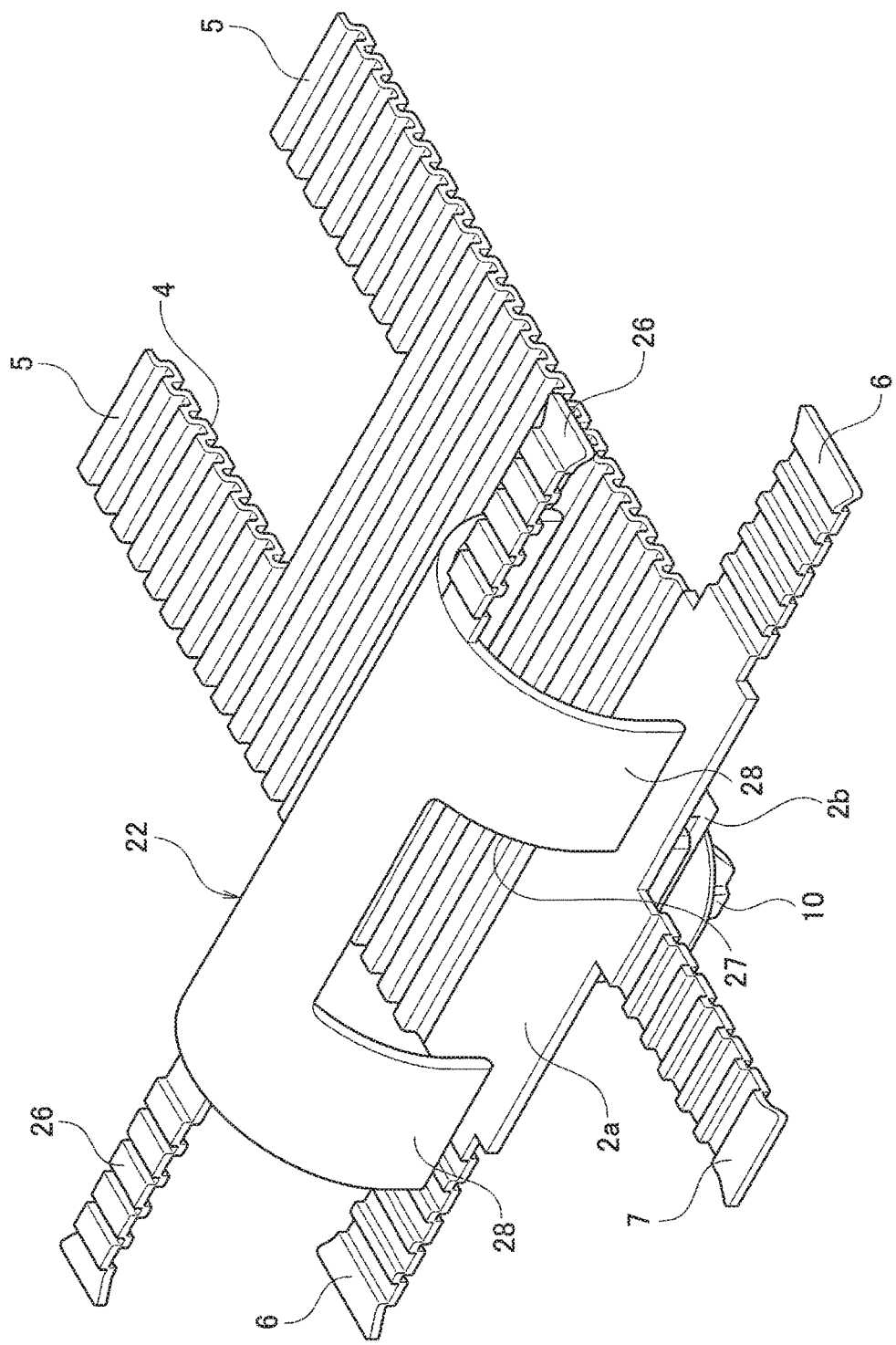
FIG. 28 illustrates the tenth embodiment of the invention and is a perspective view of a state where the reinforcing protector plate is placed on the protector sheet in the developed state.
Figure 29:
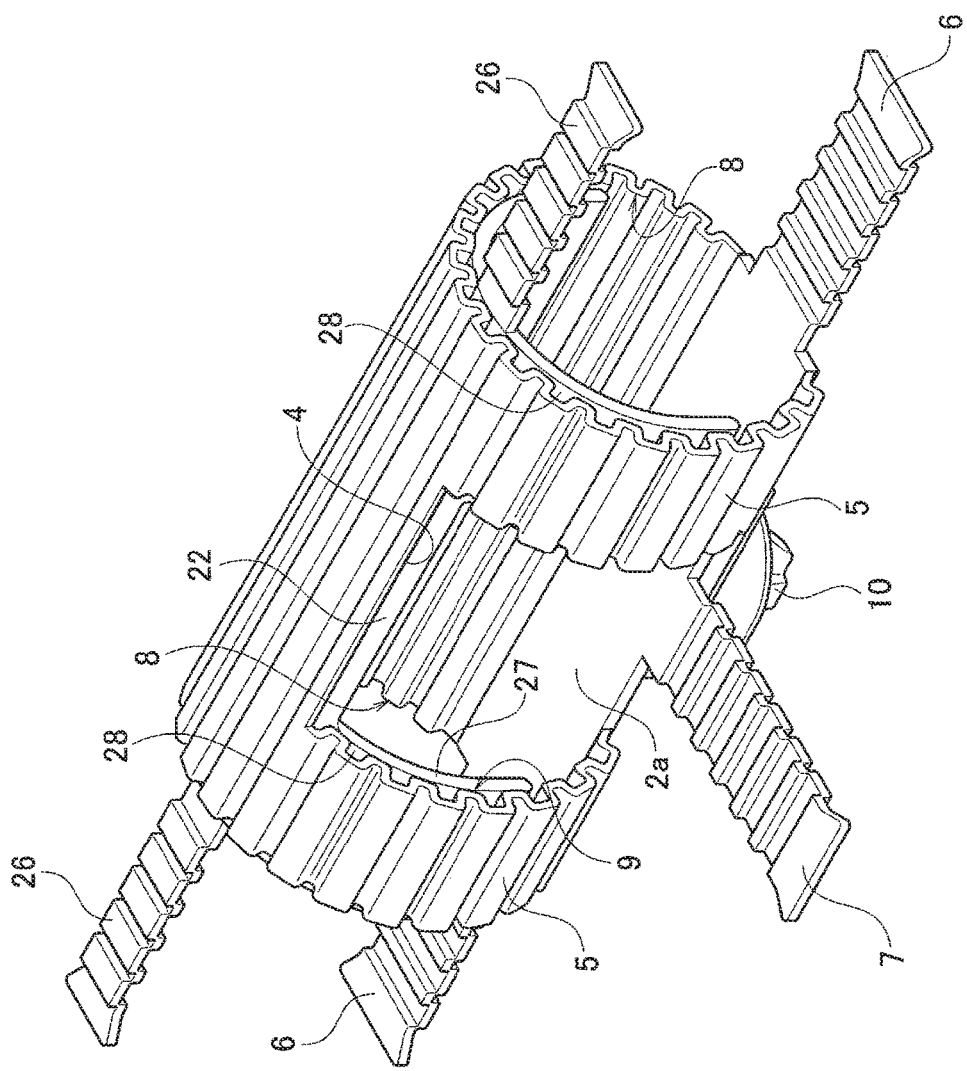
FIG. 29 illustrates the tenth embodiment of the invention and is a perspective view of a state where the protector sheet is wound above the reinforcing protector plate.

FIGS. 27 to 29 illustrate the tenth embodiment of the invention. A branch protector of the tenth embodiment has two branch protector members, that is, the protector sheet 2A and a reinforcing protector plate 22, which is different from the eighth and ninth embodiments.

That is, the branch protector includes the protector sheet 2A, the reinforcing protector plate 22, and a restraint tape (not illustrated) that is wound around the protector sheet 2A, the reinforcing protector plate 22, and a trunk line (not illustrated), and the protector sheet 2A, the reinforcing protector plate 22, and a branch line (not illustrated).

Since the protector sheet 2A has the same configuration as that of the first embodiment, the same constituent parts in the drawings will be denoted by the same reference numerals, and the description thereof will be omitted.

The reinforcing protector plate 22 has an arc shape and has rigidity to maintain the arc shape. The reinforcing protector plate 22 includes a pair of strip-shaped plate portions 28 arranged at intervals by a cut-out portion 27 and two tape winding protruding portions 26 for the trunk line.

Each of the tape winding protruding portions 26 is formed in a bellows-shape in which a recess and a protrusion are alternately repeated along a protruding direction. Therefore, only the respective tape winding protruding portions 26 are easily bent and deformed. Since each of the tape winding protruding portions 26 can be easily bent and deformed in the up-and-down direction UD with respect to a direction of routing the trunk line, the routing workability is favorable. Further, the degree of freedom in the routing direction is also high.

Next, assembling work of the branch protector will be described. As illustrated in FIG. 27, the protector sheet 2A in a developed state is arranged at an assembling work position. Next, the trunk lines (not illustrated) of a wire branch portion (not illustrated) are placed on the component placement portion 2a of the protector sheet 2A and the two tape winding protruding portions 6 for the trunk lines, and the branch line (not illustrated) of the wire branch portion is placed on the tape winding protruding portion 7 for the branch line.

Next, the reinforcing protector plate 22 is placed to cover the wire branch portion as illustrated in FIG. 28.

Next, the protector sheet 2A is wound around the wire branch portion from above the reinforcing protector plate 22 as illustrated in FIG. 29. The winding distal ends of the pair of strip-shaped sheet portions 5 of the protector sheet 2A are wound at the outer side of the protector sheet 2A to overlap each other.

Next, the restraint tape is wound around the protector sheet 2A, the reinforcing protector plate 22, and the respective trunk lines, and the protector sheet 2A, the reinforcing protector plate 22, and the branch line with no gap similarly to the eighth embodiment, and accordingly, the assembling work is completed.

A wire harness is assembled by mounting components other than the branch protector to the trunk line and the branch line.

Even in the tenth embodiment, the wire branch portion can be protected regardless of a size of the wire branch portion, and moreover, it is possible to make the size compact as much as possible, which is similar to the eighth embodiment.

The branch protector of the tenth embodiment has the same effects as those of the eighth embodiment in addition to the above-described effects.

In particular, the wire branch portion can be more firmly protected since the reinforcing protector plate 22 having higher rigidity than the reinforcing protector sheet 21 of the eighth embodiment is used in the tenth embodiment.

In addition, it is enough to place the reinforcing protector plate 22 on the wire branch portion in the tenth embodiment although it is necessary to wind the reinforcing protector sheet 21 around the wire branch portion in the eighth embodiment. Thus, the assembling workability is improved as compared with the eighth embodiment.

Eleventh Embodiment

Figure 30:
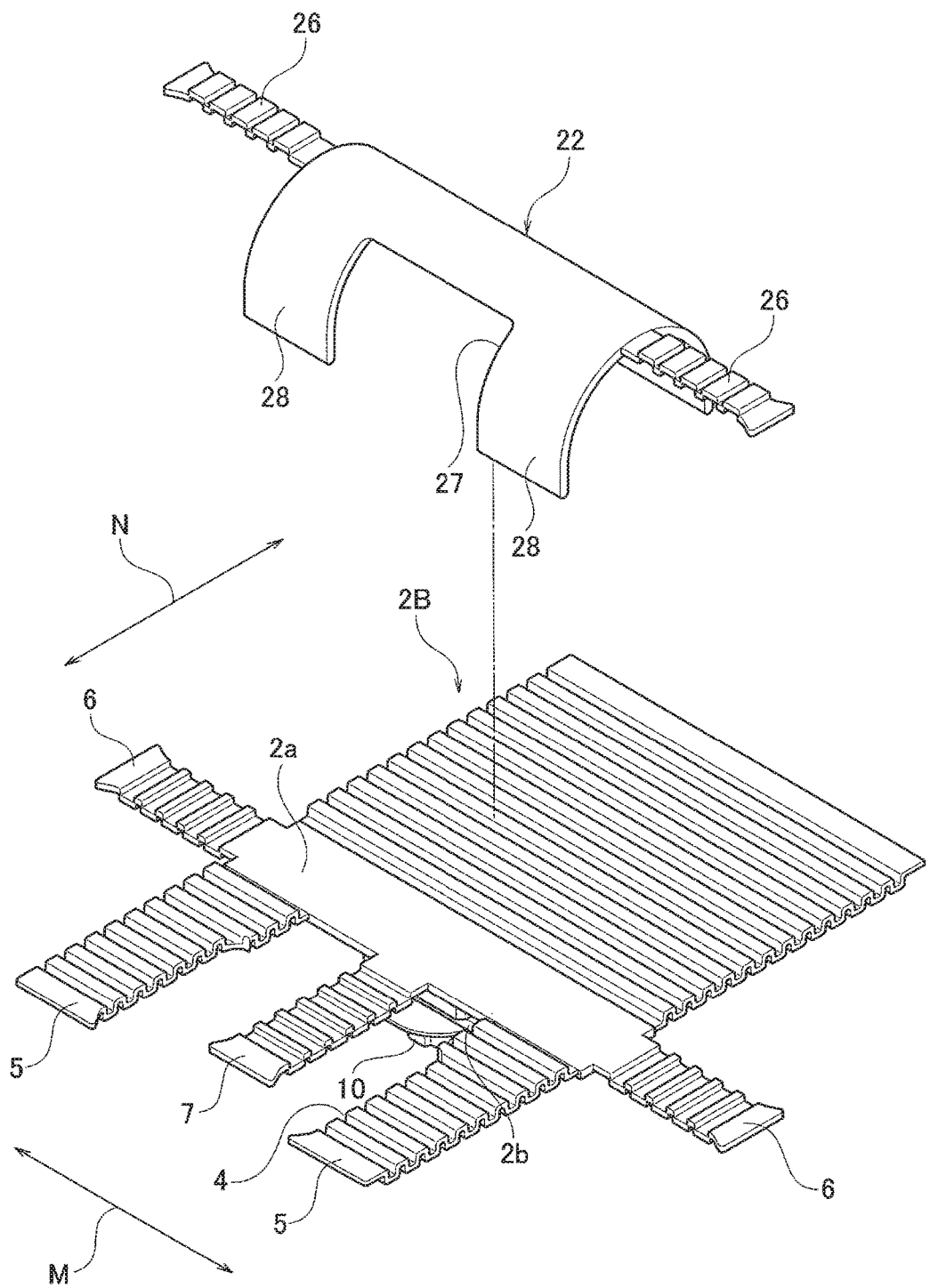
FIG. 30 illustrates an eleventh embodiment of the invention and is a perspective view of a protector sheet in a developed state and a reinforcing protector plate.
Figure 31:
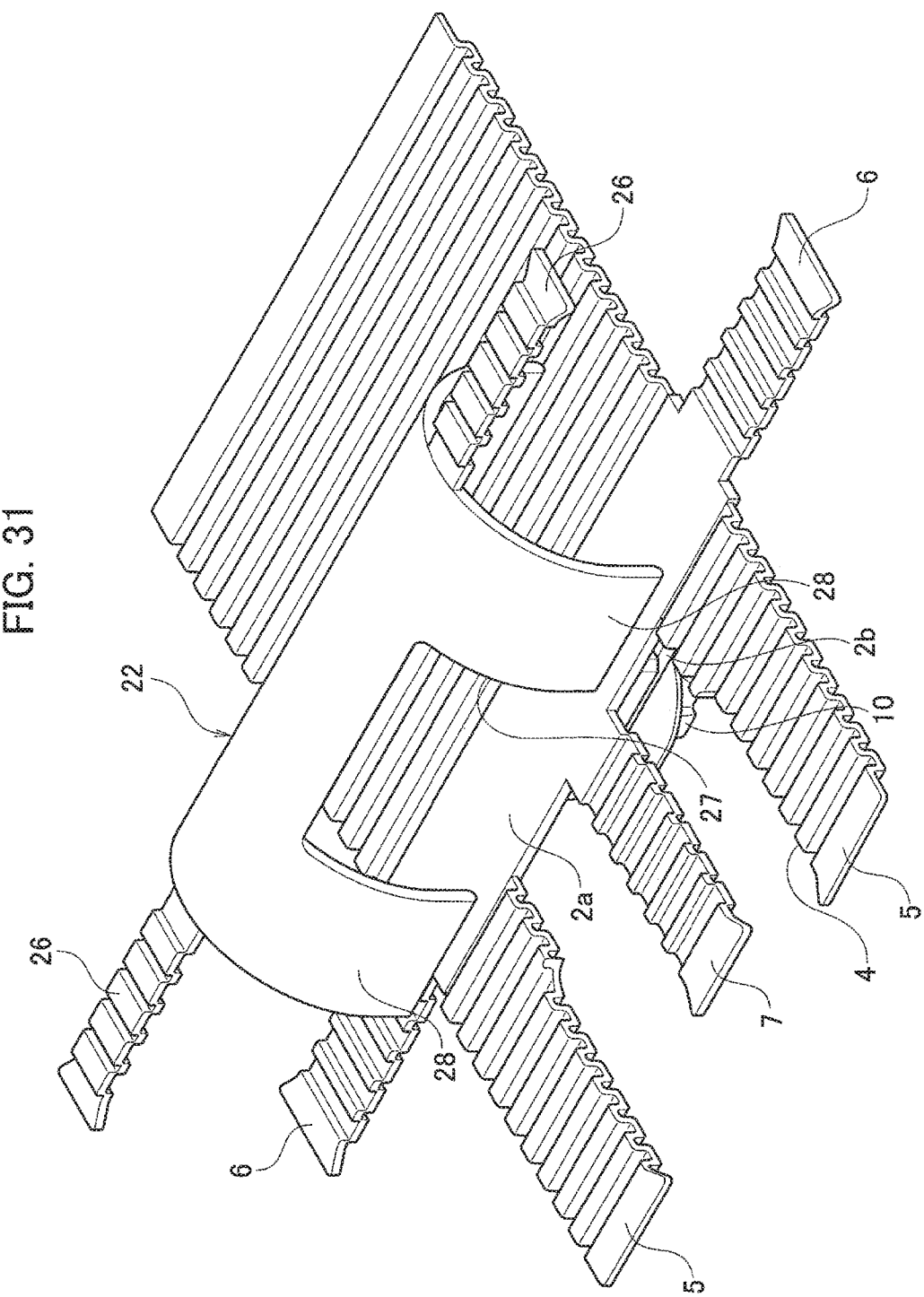
FIG. 31 illustrates the eleventh embodiment of the invention and is a perspective view of a state where the reinforcing protector plate is placed on the protector sheet in the developed state.
Figure 32:
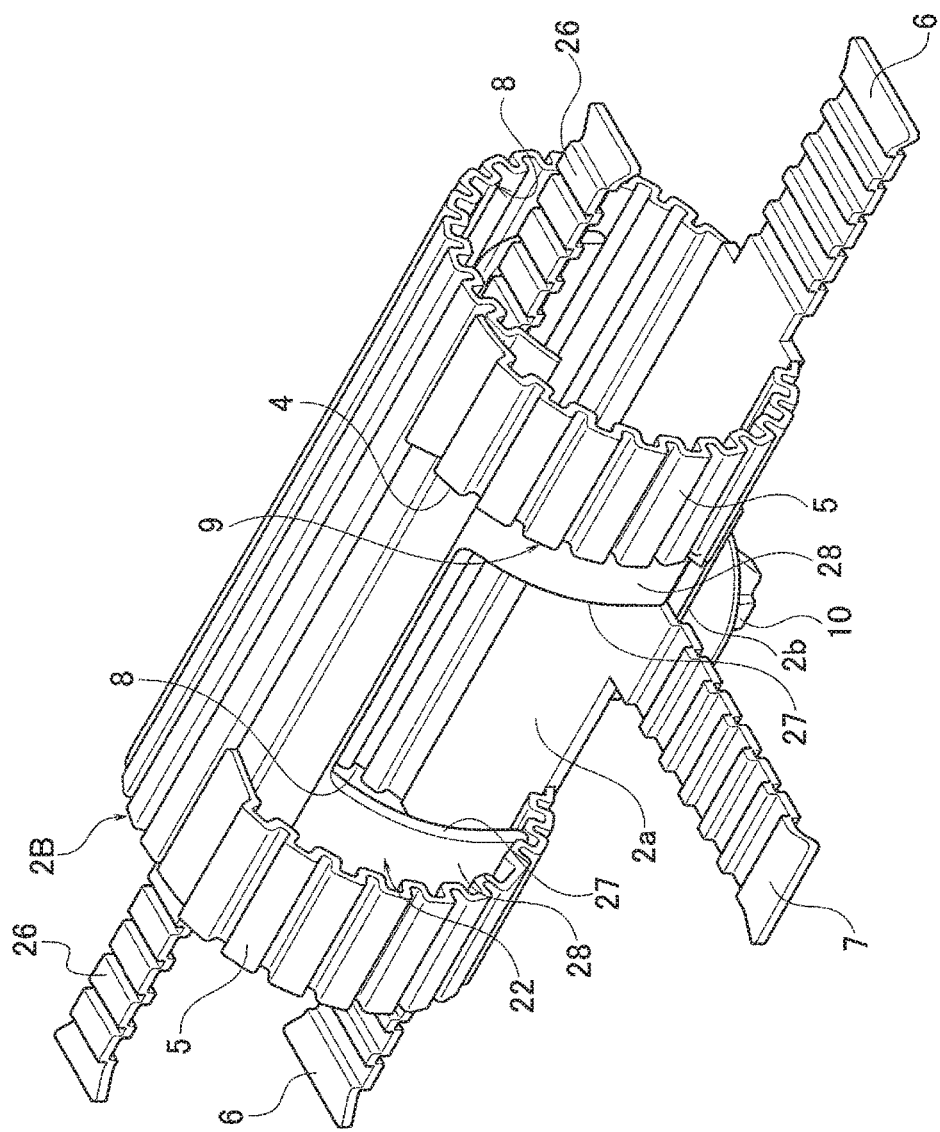
FIG. 32 illustrates the eleventh embodiment of the invention and is a perspective view of a state where the protector sheet is wound above the reinforcing protector plate.

FIGS. 30 to 32 illustrate the eleventh embodiment of the invention. A branch protector of the eleventh embodiment has two branch protector members, that is, the protector sheet 2B and the reinforcing protector plate 22, which is similar to the tenth embodiment.

Since the protector sheet 2B has the same configuration as that of the second embodiment, the same constituent parts in the drawings will be denoted by the same reference numerals, and the description thereof will be omitted.

Since the reinforcing protector plate 22 has the same configuration as that of the tenth embodiment, the same constituent parts in the drawings will be denoted by the same reference numerals, and the description thereof will be omitted.

Since assembling work of the branch protector is the same as that of the tenth embodiment, the description thereof will be omitted. A wire harness is assembled by performing mounting of components other than the branch protector to the trunk line and branch line in addition to the assembling of the branch protector Even in the eleventh embodiment, the wire branch portion can be protected regardless of a size of the wire branch portion, and moreover, it is possible to make the size compact as much as possible, which is similar to the tenth embodiment.

The branch protector of the eleventh embodiment has the same effects as those of the tenth embodiment in addition to the above-described effects.

Twelfth Embodiment

Figure 33:
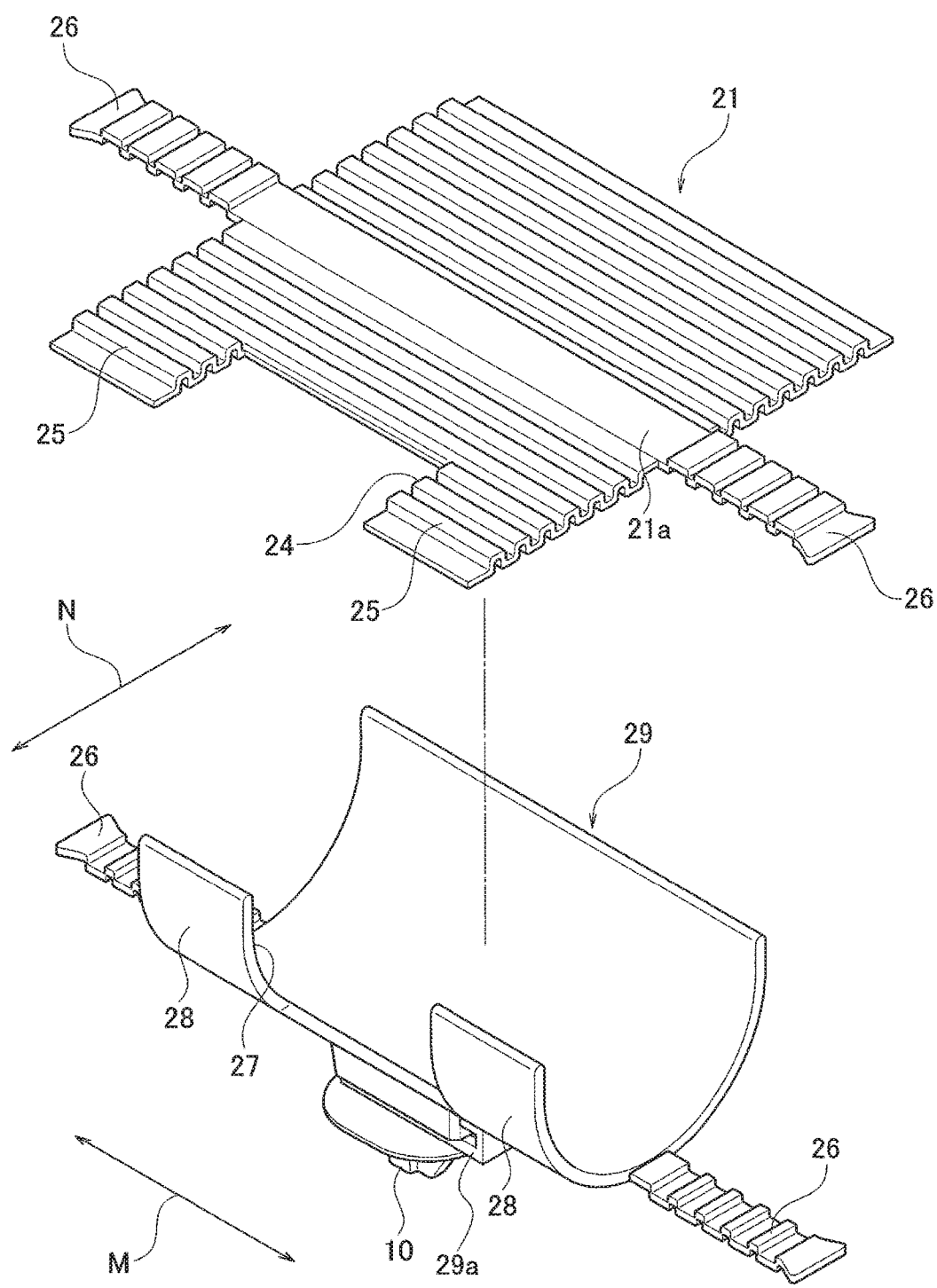
FIG. 33 illustrates a twelfth embodiment of the invention and is a perspective view of a protector plate and a reinforcing protector sheet in a developed state.
Figure 34:
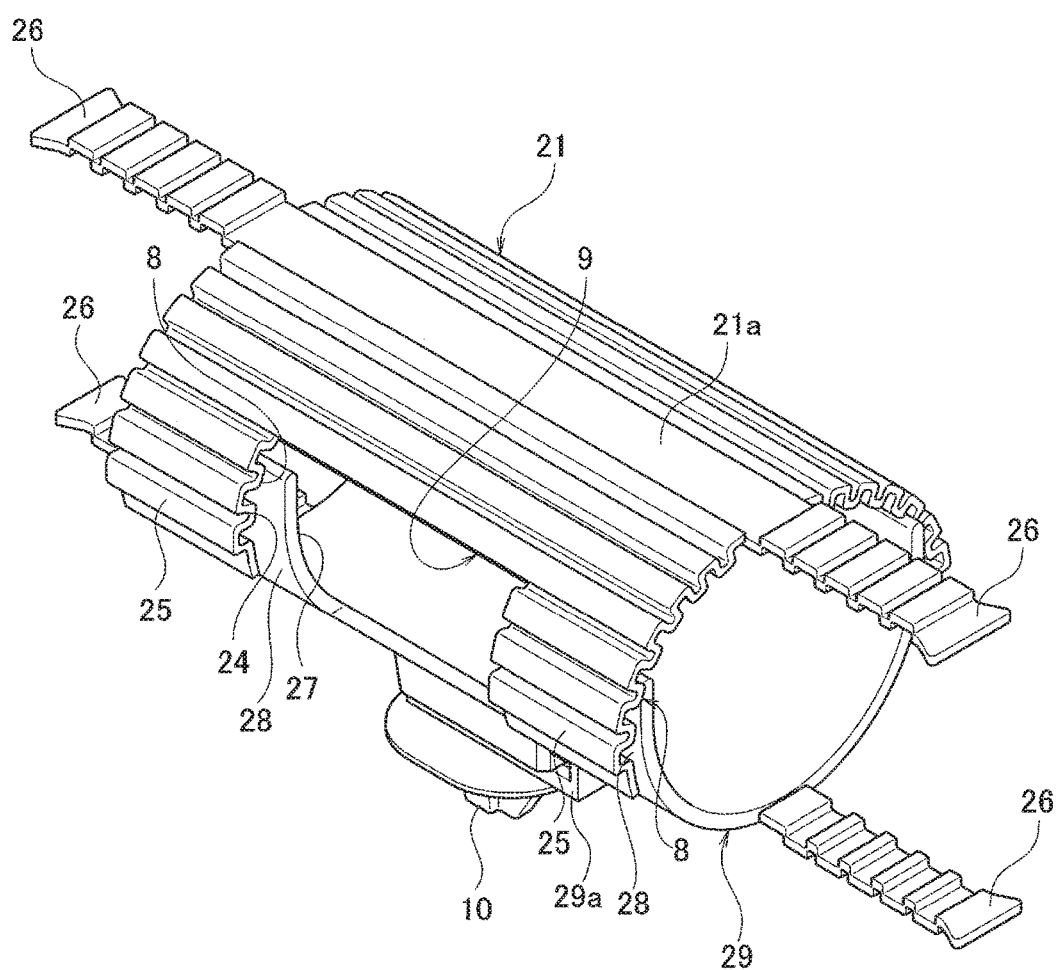
FIG. 34 illustrates the twelfth embodiment of the invention and is a perspective view of a state where the reinforcing protector sheet is wound above the protector plate.

FIGS. 33 and 34 illustrate the twelfth embodiment of the invention. A branch protector of the twelfth embodiment has two branch protector members, that is, a protector plate 29 and the reinforcing protector sheet 21.

That is, the branch protector includes the protector plate 29, the reinforcing protector sheet 21, and a restraint tape (not illustrated) that is wound around the protector plate 29, the reinforcing protector sheet 21, and a trunk line (not illustrated), and the protector plate 29, the reinforcing protector sheet 21, and a branch line (not illustrated).

The protector plate 29 has rigidity at a degree to maintain its own shape even when an external force is applied. The protector plate 29 has a substantially circular arc shape and has basically the same configuration as the configuration of the reinforcing protector plate of the tenth and eleventh embodiments. That is, the protector plate 29 includes the pair of strip-shaped plate portions 28 arranged at intervals by the cut-out portion 27 and the two tape winding protruding portions 26 for the trunk line. A clip mounting portion 29a is provided on a rear surface of the protector plate 29. The clip 10, which is a fixing portion for a vehicle body, is attached to the clip mounting portion 29a.

Since the reinforcing protector sheet 21 has the same configuration as that of the eighth embodiment, the same constituent parts in the drawings will be denoted by the same reference numerals, and the description thereof will be omitted.

Next, assembling work of the branch protector will be described. As illustrated in FIG. 33, the protector plate 29 is arranged at an assembling work position. Next, the trunk lines (not illustrated) of a wire branch portion (not illustrated) is placed on a bottom surface of the protector plate 29 and the two tape winding protruding portions 6 of the trunk lines, and the branch line (not illustrated) of the wire branch portion (not illustrated) is placed to pass through the cut-out portion 27 of the protector plate 29.

Next, as illustrated in FIG. 34, the reinforcing protector sheet 21 is wrapped directly around the wire branch portion exposed from an upper opening of the protector plate 29 and is wound around a part where the wire branch portion (not illustrated) is covered by the protector plate 29 with no gap from the outer side of the protector plate 29.

Next, the restraint tape (not illustrated) is wound around the protector plate 29, the reinforcing protector sheet 21, and the respective trunk lines (not illustrated) with no gap, and accordingly, the assembling work is completed.

A wire harness is assembled by mounting components other than the branch protector to the trunk line and the branch line.

Even in the twelfth embodiment, the wire branch portion can be protected regardless of a size of the wire branch portion, and moreover, it is possible to make the size compact as much as possible, which is similar to the tenth and eleventh embodiments.

The branch protector of the twelfth embodiment has the same effects as those of the tenth and eleventh embodiments in addition to the above-described effects.

Tape winding protruding portions for the branch line (not illustrated) are not provided in both the protector plate 29 and the reinforcing protector sheet 21 in the twelfth embodiment, but may be provided in both or any one of the protector plate 29 and the reinforcing protector sheet 21.

Thirteenth Embodiment

FIGS. 35 to 42 illustrate a thirteenth embodiment of the invention.

Figure 36:
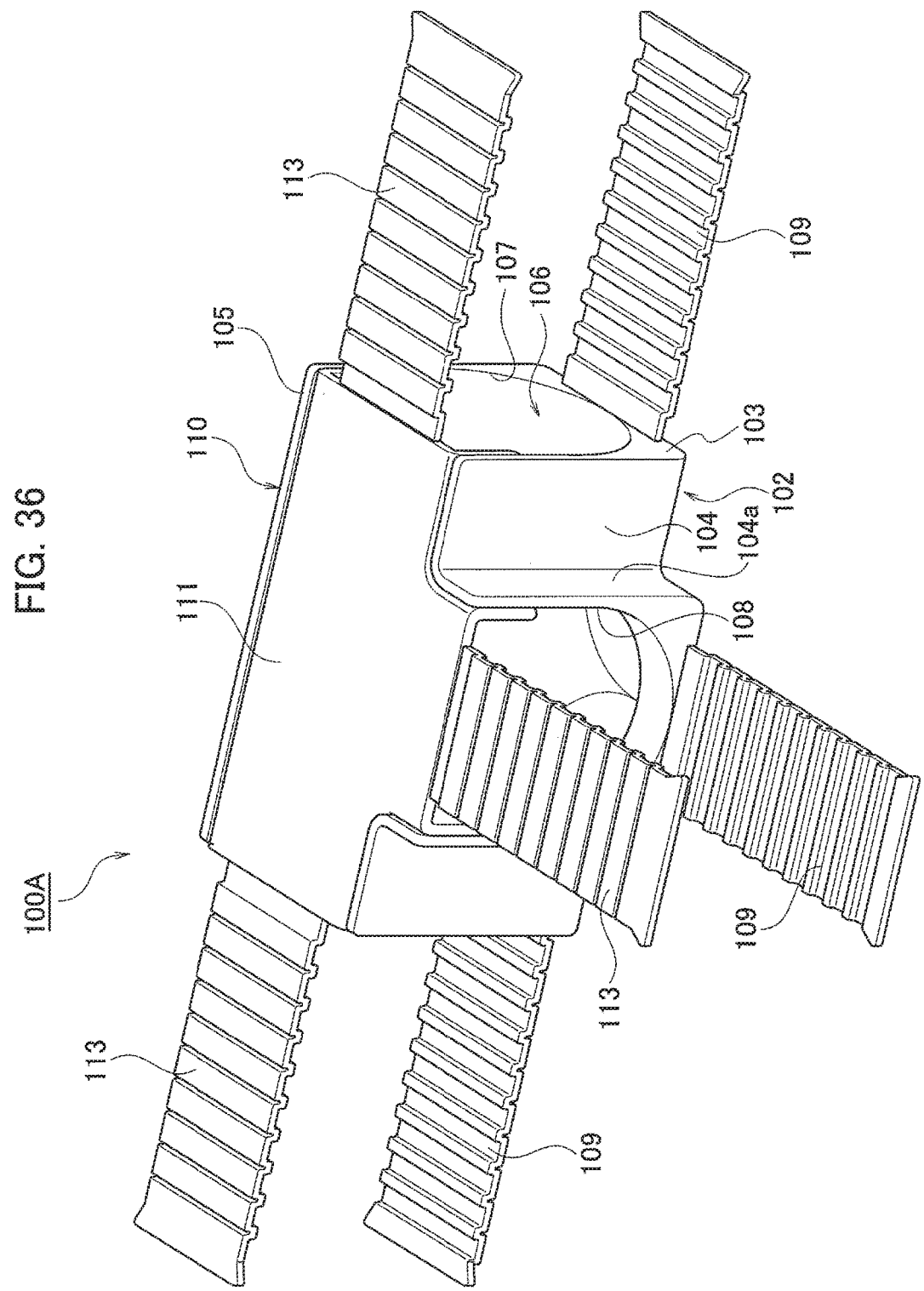
FIG. 36 illustrates the thirteenth embodiment of the invention and is a perspective view illustrating a state where a cover is arranged inside a branch protector main body.
Figure 37:
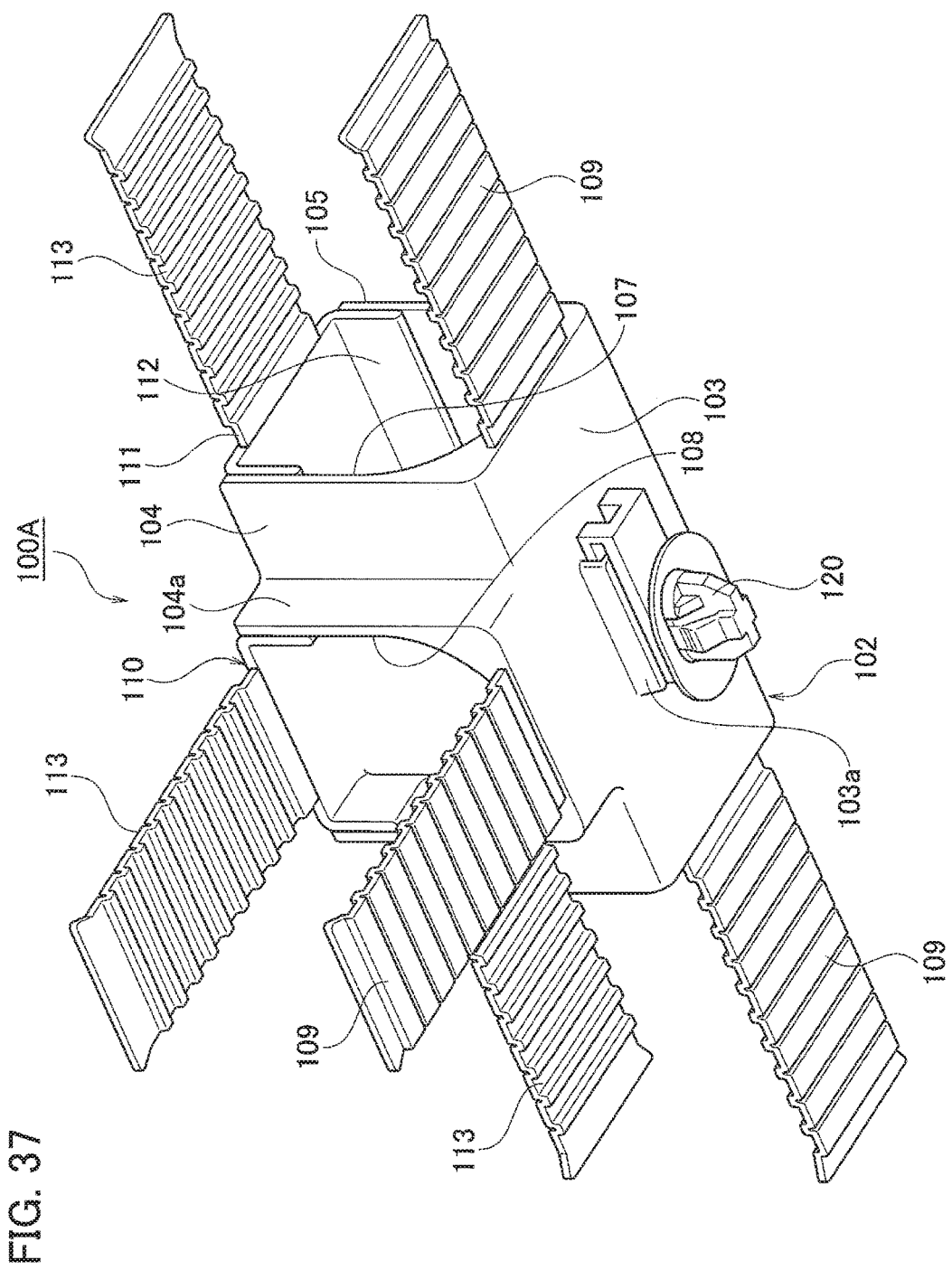
FIG. 37 illustrates the thirteenth embodiment of the invention and is a perspective view of the state where the cover is arranged inside the branch protector main body as seen from a bottom surface.

As illustrated in FIGS. 35 to 37, a branch protector 100A protects a three-branch wire branch portion WD. The branch protector 100A includes a branch protector main body 102, which is a main component, and a cover 110.

The branch protector main body 102 has a bottom wall 103 and a pair of side walls 104 and 105 erected from both side ends of the bottom wall 103. A wire accommodating chamber 106, which is surrounded by the bottom wall 103 and the pair of side walls 104 and 105 and has an opened upper surface, is formed in the branch protector main body 102. Wire draw-out openings 107 are formed at both ends of the pair of side walls 104 and 105, respectively. The one side wall 104 has a pair of side wall protrusions 104a at a central part (a position between both the ends of the side wall 104), and a wire draw-out opening 108 is formed at distal ends of the pair of side wall protrusions 104a. That is, the three wire draw-out openings 107 and 108 are formed in the side walls 104 and 105 of the branch protector main body 102 in the thirteenth embodiment.

Figure 38:
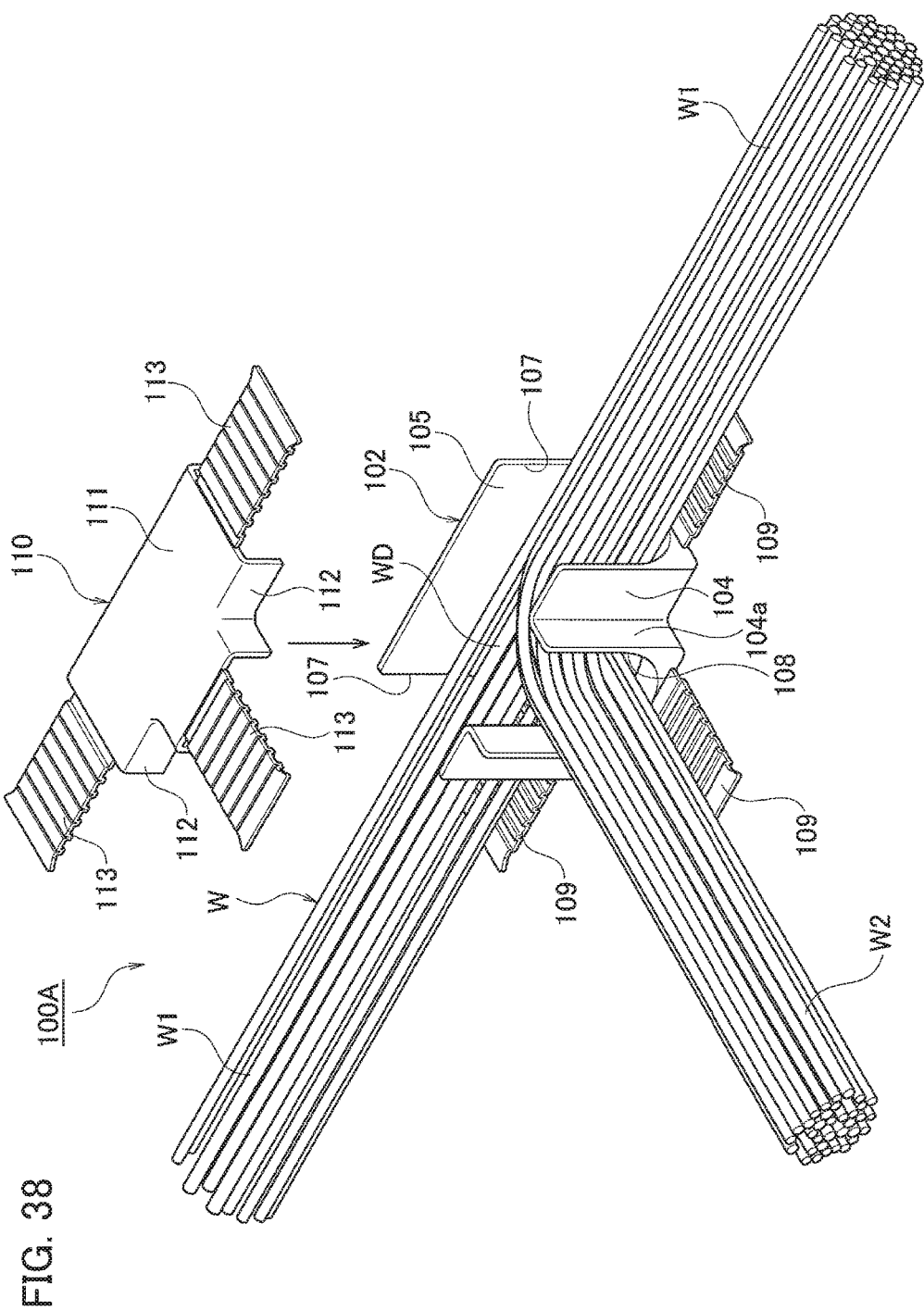
FIG. 38 illustrates the thirteenth embodiment of the invention and is a perspective view in which a branch portion of a wire is accommodated inside the branch protector main body.

As illustrated in FIG. 38, the wire branch portion WD of the wire (wire bundle) W is accommodated in the wire accommodating chamber 106. Both sides of the trunk line W1 are drawn to the outside from the two wire draw-out openings 107 at both the ends of the pair of side walls 104 and 105. The single branch line W2 is drawn to the outside from the wire draw-out opening 108 at the central part of the one side wall 104.

The bottom wall 103 is provided with wire fixing protruding portions 109 each of which protrudes from each of the wire draw-out openings 107 and 108 in each direction of routing the trunk lines W1 and the branch line W2. Each of the wire fixing protruding portions 109 is formed in a bellows-shape in which a recess and a protrusion are alternately repeated along a protruding direction.

A clip mounting portion 103a is provided on an outer surface of the bottom wall 103. A clip 120, which is a fixing portion for a vehicle body, is attached to the clip mounting portion 103a.

The cover 110 is inserted into the wire accommodating chamber 106 through the opening on the upper surface of the wire accommodating chamber 106. The cover 110 is placed on an upper surface of the wire branch portion WD accommodated in the wire accommodating chamber 106.

The cover 110 has a flat-shaped cover main body 111 and a posture holding wall 112 provided at a circumferential edge of the cover main body 111. The cover main body 111 is formed in substantially the same shape as the opening shape on the upper surface including the wire accommodating chamber 106 and the three wire draw-out openings 107 and 108 which are continuous to the wire accommodating chamber 106.

The posture holding wall 112 extends downward from the cover main body 111 in the vertical direction. The posture holding wall 112 is at a position contacting or adjacent to inner surfaces of the wire accommodating chamber 106 and the side walls 104 and 105 of the respective wire draw-out openings 107 and 108 in the state of being positioned inside the wire accommodating chamber 106 (at a position in FIGS. 36 and 39).

The cover main body 111 is provided with wire fixing protruding portions 113 each of which protrudes from each of the wire draw-out openings 107 and 108 in each of the directions of routing the trunk lines W1 and the branch line W2. Each of the wire fixing protruding portions 113 is formed in a bellows-shape in which a recess and a protrusion are alternately repeated along a protruding direction.

Next, assembling work of the branch protector 100A will be described. As illustrated in FIG. 38, the wire branch portion WD is accommodated in the wire accommodating chamber 106 of the branch protector main body 102 from the opening on the upper surface thereof. The trunk lines W1 of the wire W are drawn out from the wire draw-out openings 107 at both the ends of the pair of side walls 104 and 105, respectively. The branch line W2 of the wire W is drawn out from the wire draw-out opening 108 at the central portion of the one side wall 104.

Figure 39:
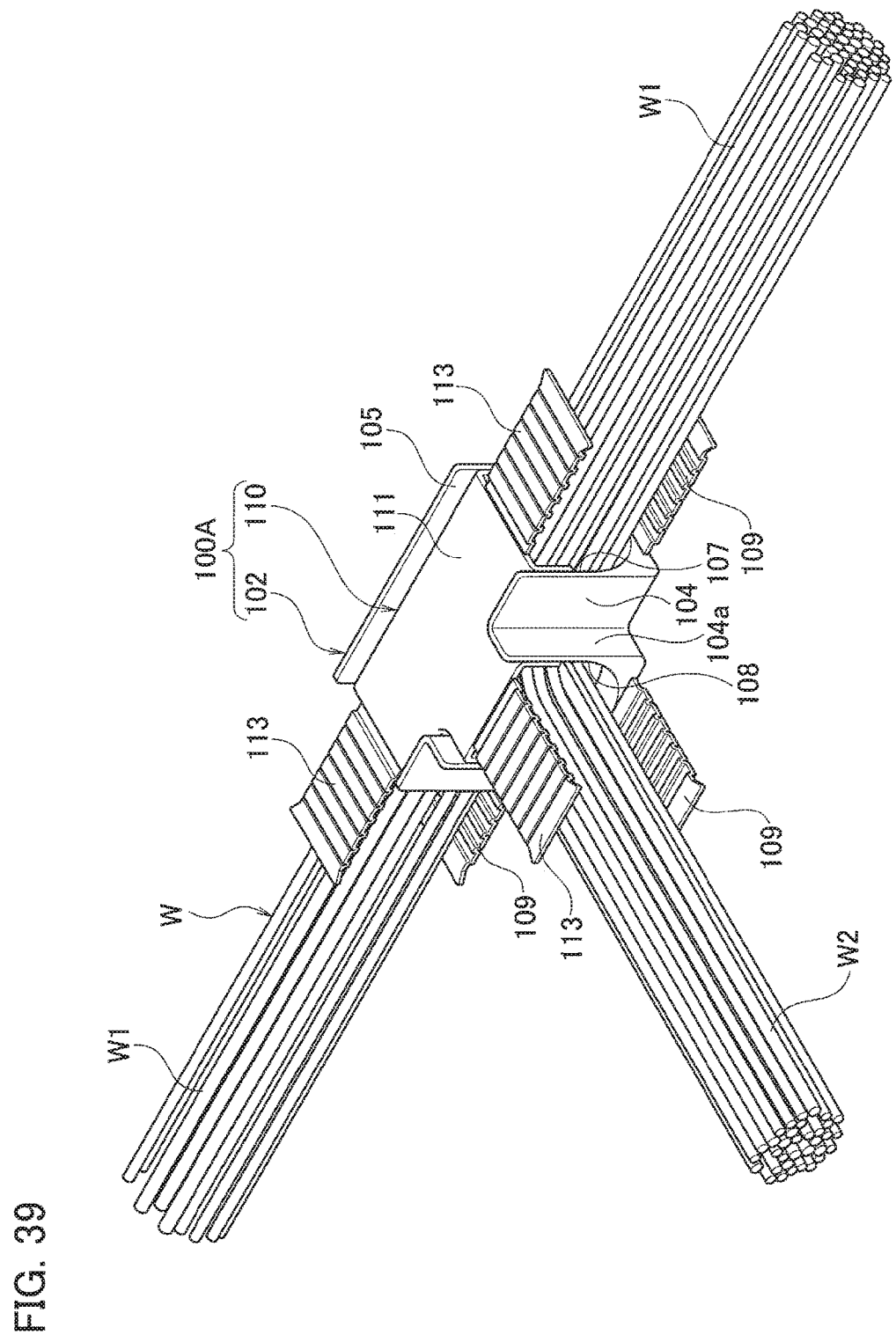
FIG. 39 illustrates the thirteenth embodiment of the invention and is a perspective view illustrating a state where the cover is dropped onto the branch portion of the wire accommodated in the branch protector main body.

Next, as illustrated in FIG. 39, the cover 110 is arranged above the wire accommodating chamber 106 and is dropped to be inserted into the wire accommodating chamber 106. When the cover 110 does not fall into the wire accommodating chamber 106 due to a dimensional error or the like, a pressing force is applied from above to insert the cover 110.

The cover 110 is arranged in the wire accommodating chamber 106 in the state of being placed on the wire branch portion WD. The wire fixing protruding portions 109 of the branch protector main body 102 are arranged on a lower side of the trunk lines W1 and the branch line W2 drawn out from the respective wire draw-out openings 107 and 108, and the respective wire fixing protruding portions 113 of the cover 110 are arranged on an upper side thereof.

Figure 40:
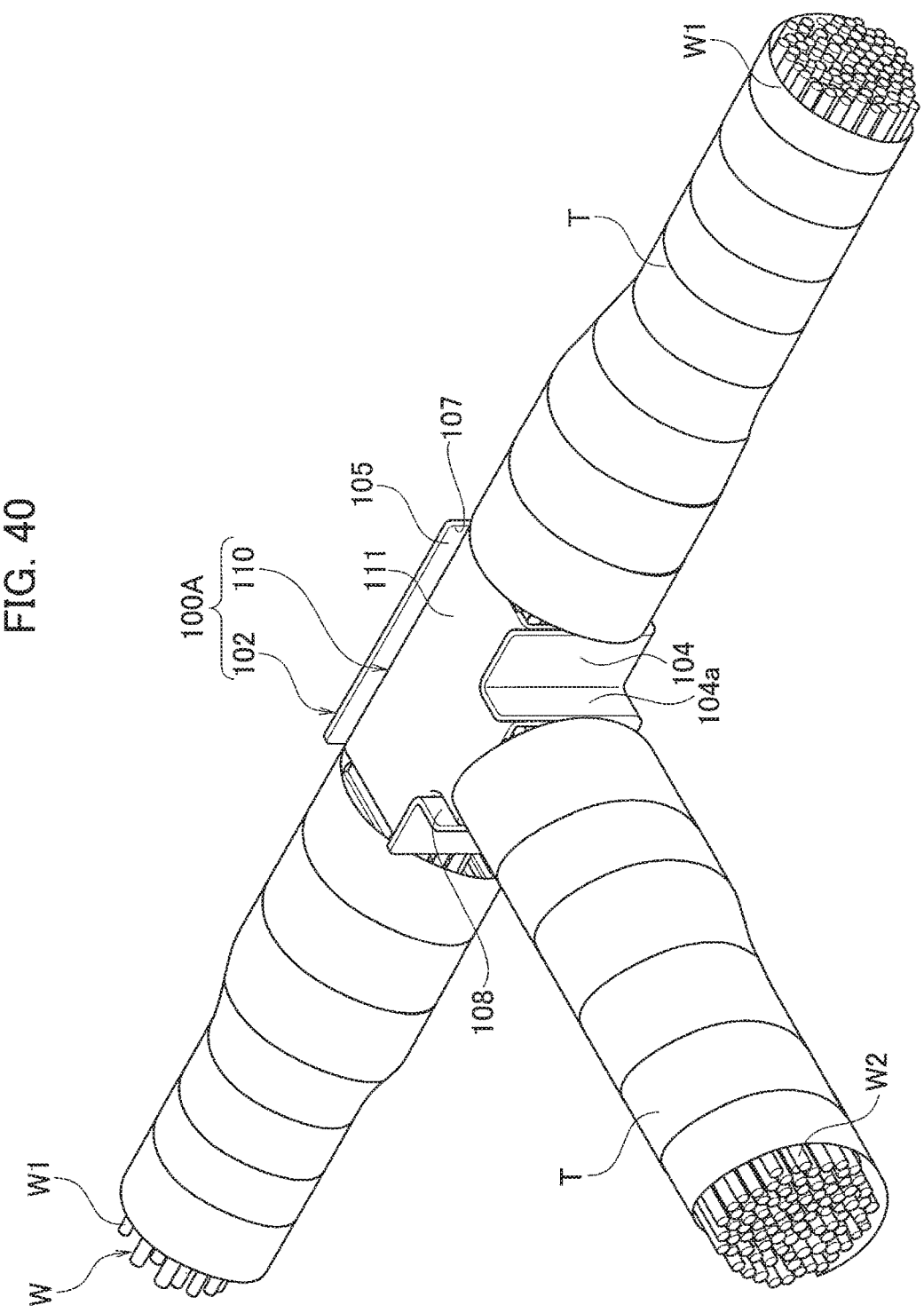
FIG. 40 illustrates the thirteenth embodiment of the invention and is a perspective view illustrating a state where a tape is wound around a trunk line and a branch line drawn out from the branch protector.

Next, the restraint tape T is wound around parts of the respective wire draw-out openings 107 and 108 of the branch protector 100A and the trunk lines W1 and the branch line W2 drawn out from the respective wire draw-out openings 107 and 108 as illustrated in FIG. 40.

Specifically, the restraint tape T is wound collectively around parts of the branch protector main body 102 and the cover 110 at root parts of the pair of upper and lower wire fixing protruding portions 109 and 113, wound collectively around the pair of upper and lower wire fixing protruding portions 109 and 113 and the trunk lines W1 and the pair of upper and lower wire fixing protruding portions 109 and 113 and the branch line W2 in a range where the pair of upper and lower wire fixing protruding portions 109 and 113 are arranged, and are wound around each outer circumference of the trunk lines W1 and the branch line W2 with no gap at parts where the trunk lines W1 and the branch line W2 are further drawn out from the distal ends of the pair of wire fixing protruding portions 109 and 113. The assembling work of the branch protector 100A is completed with winding the restraint tape T.

As described above, the branch protector 100A includes the branch protector main body 102 whose upper surface is opened and having the wire accommodating chamber 106 accommodating the wire branch portion WD and at least the three wire draw-out openings 107 and 108 from which the respective wires W are drawn out from the wire accommodating chamber 106, and the cover 110 that is placed on the wire branch portion WD accommodated in the wire accommodating chamber 106 from the opening on the upper surface of the wire accommodating chamber 106 and closes the upper surface of the wire accommodating chamber 106.

Accordingly, since the cover 110 is placed on the wire branch portion WD accommodated in the wire accommodating chamber 106, the wire branch portion WD can be accommodated regardless of a size of the wire branch portion WD, and moreover, a useless space is not formed in the wire accommodating chamber 106. As described above, it is possible to accommodate the wire branch portion WD regardless of the size of the wire branch portion WD, and moreover, it is possible to make the size compact as much as possible. In other words, since the wire accommodating chamber 106 has accommodation capacity corresponding to the size of the wire branch portion WD, it is possible to make the branch protector 100A compact in accordance with the size of the wire branch portion WD.

Figure 42:
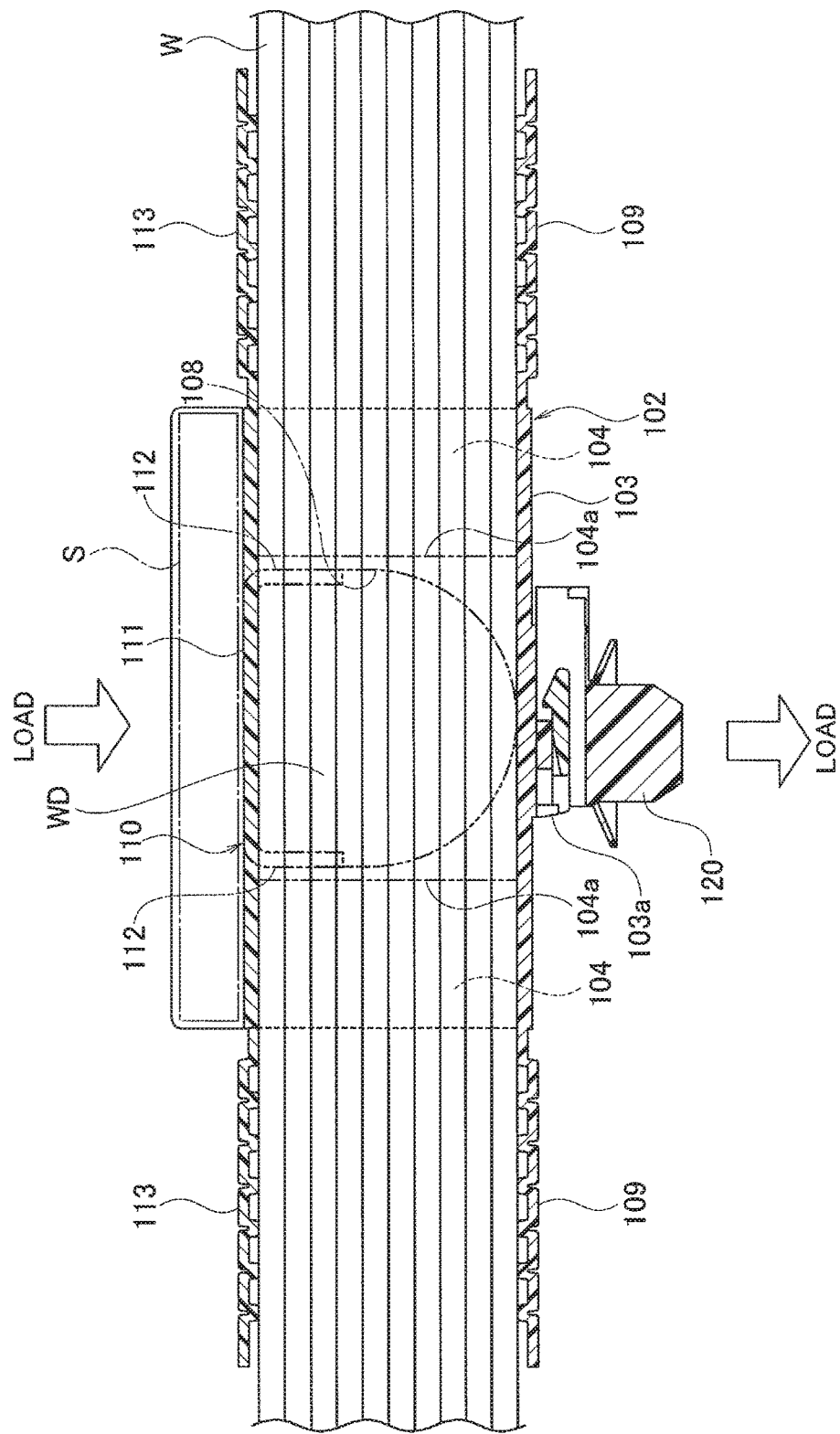
FIG. 42 illustrates the thirteenth embodiment of the invention and is a cross-sectional view of the main part of the branch protector.

For example, when the size of the wire branch portion WD (changing depending on a size of a wire diameter and the number of wires) is smaller than a maximum accommodation capacity of the branch protector 100A, an external space S is formed on the cover 110 mounted to the branch protector main body 102 as illustrated in FIG. 42. It is possible to make the branch protector 100A compact by the amount corresponding to the external space S. The external space S on the cover 110 can be used as an installation space of another component or the like.

Further, in a conventional example, there is a risk that a wire branch portion (not illustrated) moves (vibrates) inside a branch protector 100 so that the wire branch portion (not illustrated) is damaged as an extra space is formed in a wire accommodating chamber 101a when the wire branch portion (not illustrated) is smaller than the accommodated capacity of the wire accommodating chamber 101a. In this embodiment, however, the wire branch portion WD does not move (vibrate) inside the branch protector 100A so that the wire branch portion WD is not damaged.

Figure 41:
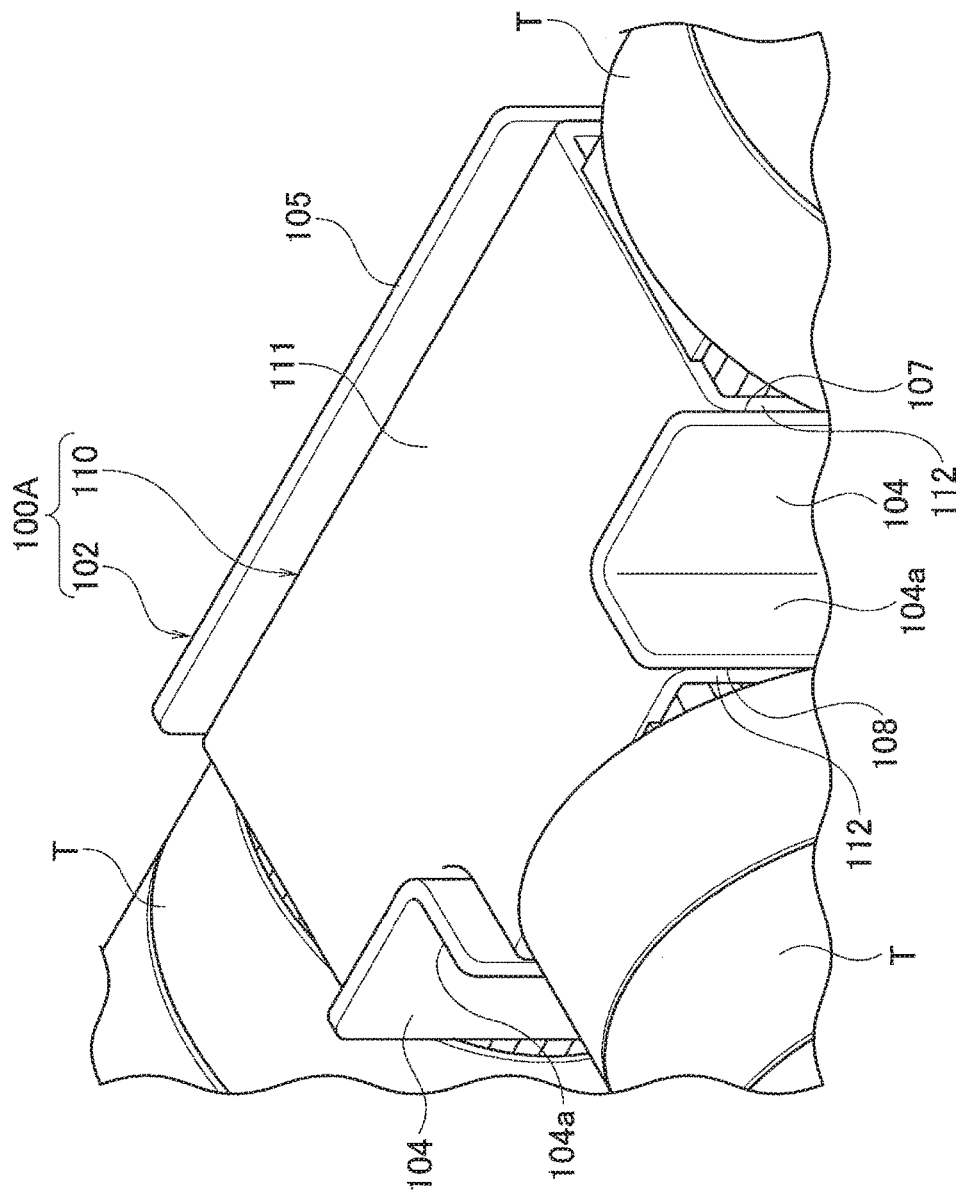
FIG. 41 illustrates the thirteenth embodiment of the invention and is a perspective view illustrating a fact that it is possible to visually confirm that the cover is properly fitted.

As the cover 110 is dropped (inserted) between the pair of side walls 104 and 105 of the branch protector main body 102, the cover 110 is set to a predetermined attachment position of the branch protector main body 102. Therefore, it is possible to visually confirm that the cover 110 is fitted between the pair of side walls 104 and 105 as illustrated in FIG. 41 after the cover 110 is dropped, and thus, the quality can be improved.

Meanwhile, when the outer circumference of the wire branch portion WD is protected only by the tape winding, there is a risk that a situation where dimensional accuracy is not obtained regarding a wire length to the adjacent wire branch portion (not illustrated) may occur as the wire W is tightened by the tape winding. However, the wire branch portion WD is protected by being accommodated inside the branch protector 1A in the thirteenth embodiment, and thus, the wire branch portion WD can be protected with the dimensional accuracy regarding the wire length to the adjacent wire branch portion (not illustrated).

The branch protector main body 102 and the cover 110 are provided with the wire fixing protruding portions 109 and 113 protruding from the wire draw-out openings 107 and 108 in the directions of routing the wire W, respectively. Therefore, the branch protector 100A and the wire W (the trunk line W1 and the branch line W2) can be firmly fixed by winding the restraint tape T around the wire fixing protruding portions 109 and 113 collectively together with the wire W (the trunk line W1 and the branch line W2).

Each of the wire fixing protruding portions 109 and 113 of the branch protector main body 102 and the cover 110 is formed in the bellows-shape. Therefore, the wire W (the trunk line W1 and the branch line W2) drawn out from the branch protector 100A can be easily bent and deformed in the up-down direction in the directions of routing of the wire W (the trunk line W1 and the branch line W2), and thus, the degree of freedom in the routing direction is high, and the routing workability is favorable.

The cover 110 is provided with the posture holding wall 112 that has substantially the same shape as the opening shape on the upper surface of the wire accommodating chamber 106 and adjacently opposes the inner surfaces of the side walls 104 and 105 of the wire accommodating chamber 106. Accordingly, a falling posture of the cover 110 is held by the posture holding wall 112 when the cover 110 is dropped (inserted) into the wire accommodating chamber 106 through the opening on the upper surface of the wire accommodating chamber 106, and thus, the cover 110 falls onto the wire branch portion WD of the wire accommodating chamber 106 without being inclined and is placed on the wire branch portion WD.

The posture holding wall 112 extends downward from the cover main body 111 in the vertical direction. Therefore, since the posture holding wall 112 does not protrude upward from the cover main body 111, it is possible to prevent inclination of the cover 110 at the time of falling while securing the external space S that can be formed on the cover 110 attached to the branch protector main body 102.

The branch protector main body 102 is provided with the clip 120. Therefore, the branch protector 100A can be easily fixed to the vehicle body using the clip 120.

As illustrated in FIG. 42, since a load from the cover 110 is easily transmitted to the clip 120 via the wire branch portion WD, it is easy to perform fixing work to the vehicle body.

Fourteenth Embodiment

Figure 44:
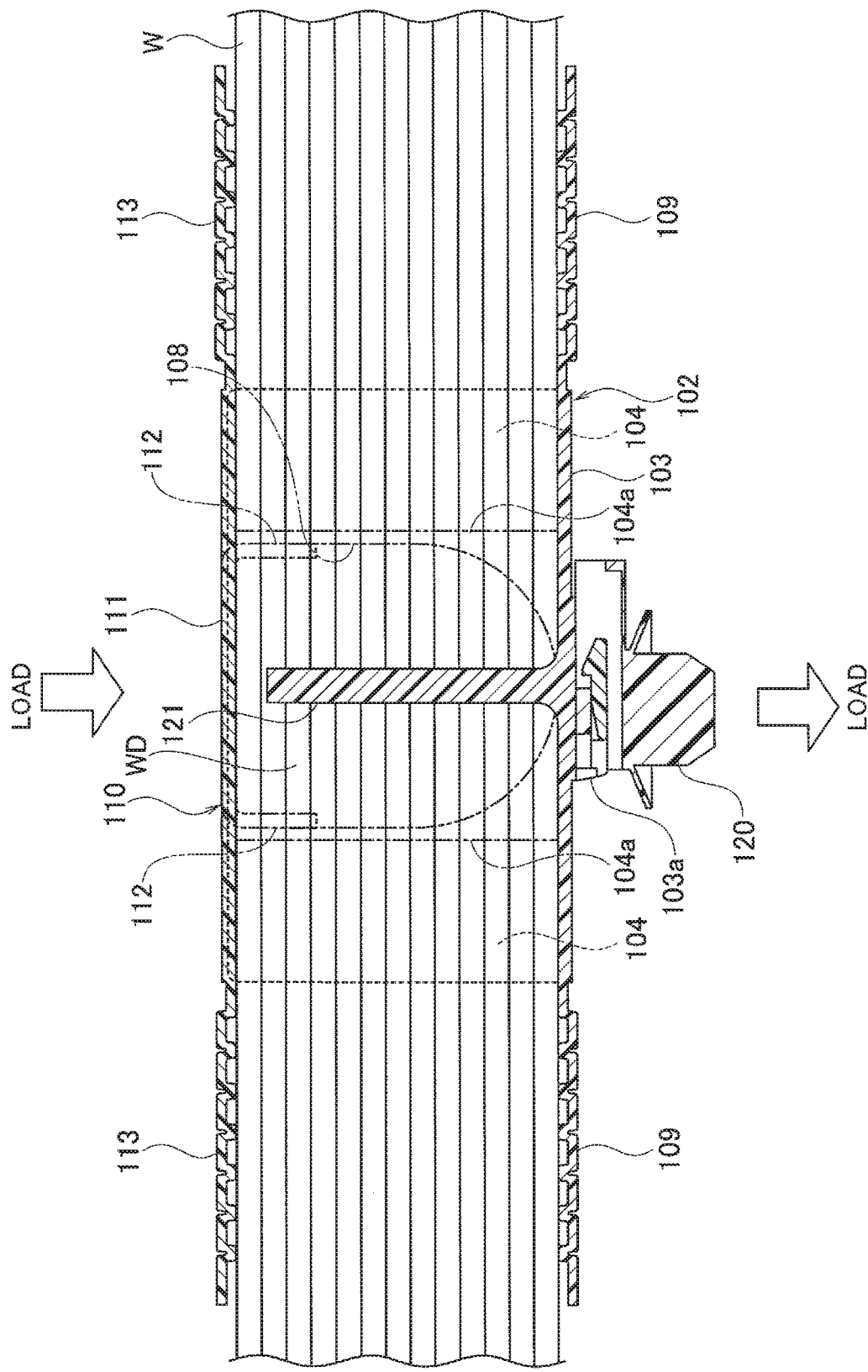
FIG. 44 illustrates the fourteenth embodiment of the invention and is a cross-sectional view of the main part of the branch protector.

FIGS. 43 and 44 illustrate a fourteenth embodiment of the invention. A branch protector 100B of the fourteenth embodiment is provided with a protruding portion 121 protruding inside the wire accommodating chamber 106 on the bottom wall 103 as compared with the thirteenth embodiment. The protruding portion 121 is provided at a position right above the clip 120. The protruding portion 121 is set to have substantially the same height as an assumed height of the wire branch portion WD. That is, the protruding portion 121 has a dimension to abut on a lower surface of the cover 110 mounted to the branch protector main body 102 or to reach near the lower surface of the cover 110. The protruding portion 121 has a cylindrical shape.

The protruding portion 121 is arranged in the state of skewering the wire branch portion WD in a state where the wire branch portion WD is accommodated in the wire accommodating chamber 106.

Since other configurations are the same as those of the thirteenth embodiment, the same constituent parts in the drawings will be denoted by the same reference numerals, and the description thereof will be omitted.

Even in the fourteenth embodiment, the cover 110 is placed on the wire branch portion WD accommodated in the wire accommodating chamber 106, and thus, the wire branch portion WD can be accommodated regardless of a size of the wire branch portion WD, and moreover, a useless space is not formed in the wire accommodating chamber 106, which is similar to the thirteenth embodiment. As described above, it is possible to accommodate the wire branch portion WD regardless of the size of the wire branch portion WD, and moreover, it is possible to make the size compact as much as possible.

The branch protector main body 102 is provided with the protruding portion 121 protruding from the bottom wall 103 inside the wire accommodating chamber 106. Therefore, a load from the cover 110 is more easily transmitted to the clip 120 via the protruding portion 121 than in the case of the thirteenth embodiment, and thus, a fixing operation to a vehicle body becomes easier. Since the protruding portion 121 is positioned right above the clip 120, the load from the cover 110 is more easily transmitted to the clip 120 via the protruding portion 121, so that the fixing operation to the vehicle body is further facilitated. In a case where the size of the wire branch portion WD is smaller than an assumed size, the protruding portion 121 is cut to be short so as not to interfere with the cover 110 and used.

The protruding portion 121 is arranged in the state of skewering the wire branch portion WD. Therefore, the protruding portion 121 also functions as a fixing portion between the wire branch portion WD and the branch protector main body 102, and also functions as a portion positioning the wire branch portion WD inside the wire accommodating chamber 106.

The protruding portion 121 has the cylindrical shape. Therefore, since the cylindrical shape has no edge, the wire W is not damaged by the edge.

Fifteenth Embodiment

Figure 46:
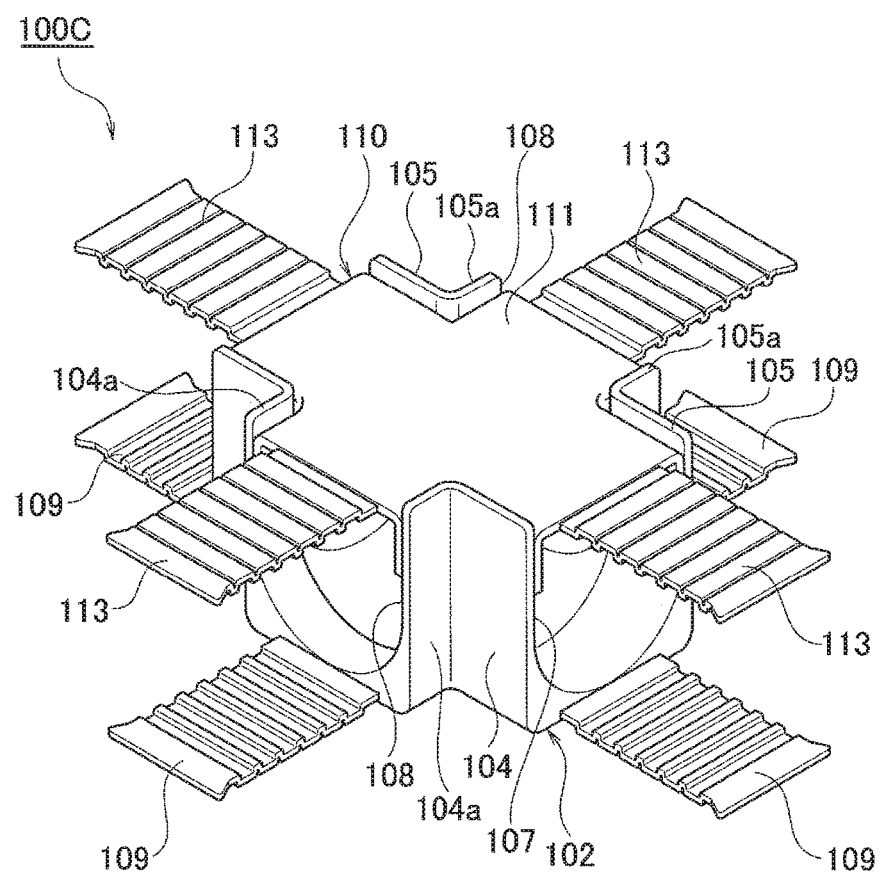
FIG. 46 illustrates the fifteenth embodiment of the invention and is a perspective view illustrating a state where a cover is arranged inside a branch protector main body.
Figure 47:
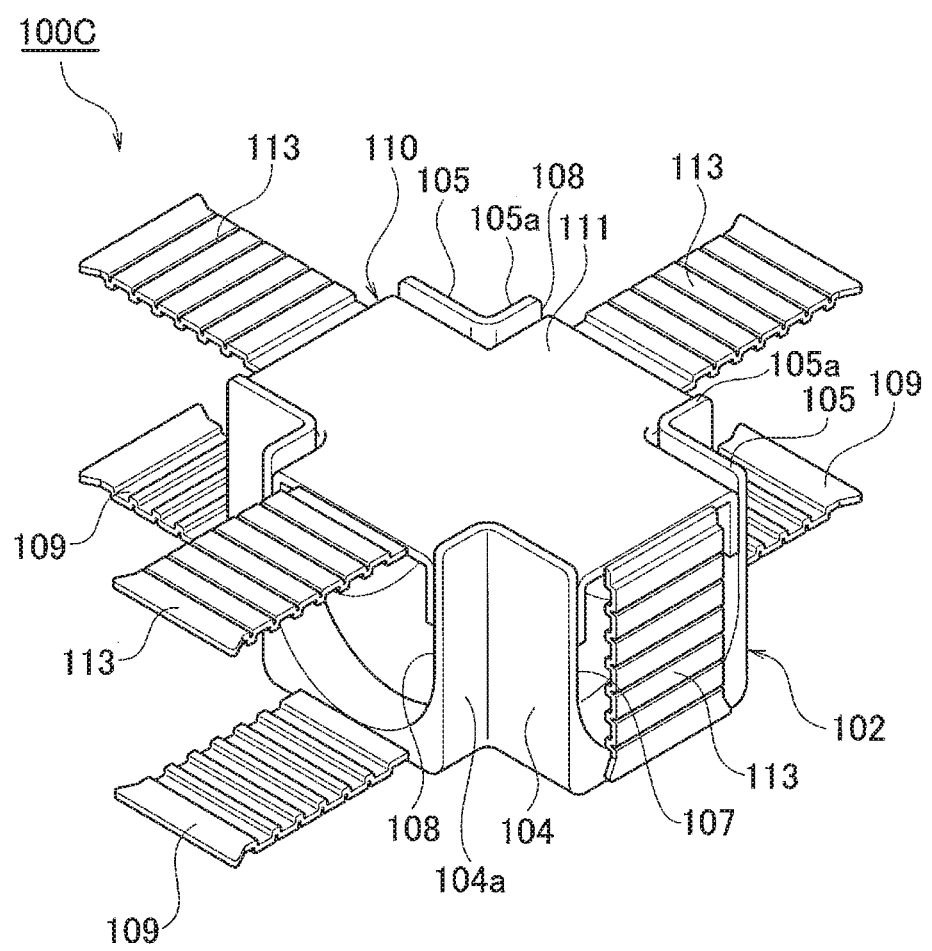
FIG. 47 illustrates the fifteenth embodiment of the invention and is a perspective view illustrating a case of being used for a branch portion where wires extend in three directions.

FIGS. 45 to 47 illustrate a fifteenth embodiment of the invention. A branch protector 100C of the fifteenth embodiment has four wire draw-out openings 107 and 108 as compared with that of the thirteenth embodiment. That is, a pair of side wall protruding portions 105a is also provided on the other side wall 105, and the wire draw-out opening 108 is provided at a distal end of the pair of side wall protruding portions 105a.

The branch protector 100C can protect a wire branch portion (not illustrated) from which four wires (two trunk lines and two branch lines in this embodiment) extend in different directions.

Since other configurations are the same as those of the thirteenth embodiment, the same constituent parts in the drawings will be denoted by the same reference numerals, and the description thereof will be omitted.

Even in the fifteenth embodiment, the cover 110 is placed on the wire branch portion (not illustrated) accommodated in the wire accommodating chamber 106, and thus, the wire branch portion (not illustrated) can be accommodated regardless of a size of the wire branch portion (not illustrated), and moreover, a useless space is not formed in the wire accommodating chamber 106, which is similar to the thirteenth embodiment. As described above, it is possible to accommodate the wire branch portion (not illustrated) regardless of the size of the wire branch portion (not illustrated), and moreover, it is possible to make the size compact as much as possible.

As illustrated in FIG. 47, the branch protector 100C of the fifteenth embodiment can be also used to protect a wire branch portion (not illustrated) from which three wires (two trunk lines W1 and one branch line W2) extend in different directions. In this case, since the one wire draw-out opening 108 is not used, this unused wire draw-out opening 108 is closed with the wire fixing protruding portions 109 and 113. For example, the wire fixing protruding portion 109 on the branch protector main body 102 is cut, and the wire fixing protruding portion 113 on the cover 110 is bent to close the wire draw-out opening 108, and the bent and deformed wire fixing protruding portion 113 is fixed to the branch protector main body 102 by the restraint tape T.

Sixteenth Embodiment

Figure 49:
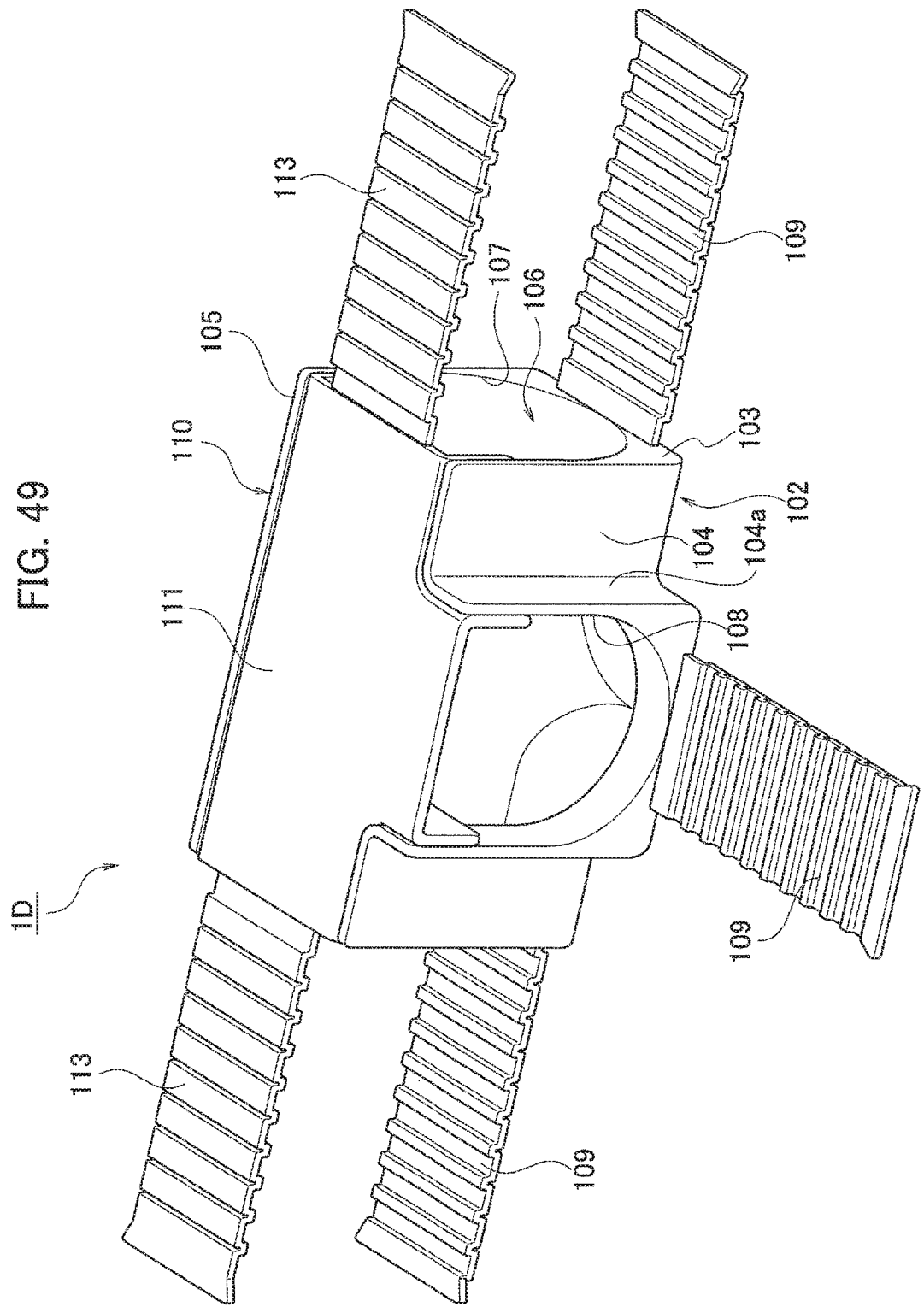
FIG. 49 illustrates the sixteenth embodiment of the invention and is a perspective view illustrating a state where a cover is arranged inside a branch protector main body.

FIGS. 48 and 49 illustrate a sixteenth embodiment of the invention. A branch protector 100D of the sixteenth embodiment is different from the thirteenth embodiment in terms of the following point. That is, the cover 110 is provided with the wire fixing protruding portion 113 protruding in a direction of routing a trunk line (not illustrated) from each of the wire draw-out openings 107 similarly to the thirteenth embodiment. However, the cover 110 is not provided with a wire fixing protruding portion protruding in a direction of routing a branch line (not illustrated) from the wire draw-out opening 108.

Since other configurations are the same as those of the thirteen embodiment, the same constituent parts in the drawings will be denoted by the same reference numerals, and the description thereof will be omitted.

A tape is wound around the branch line (not illustrated) drawn out from the branch protector 100D collectively with the wire fixing protruding portion 109 on the branch protector main body 102.

Even in the sixteenth embodiment, the cover 110 is placed on the wire branch portion (not illustrated) accommodated in the wire accommodating chamber 106, and thus, the wire branch portion (not illustrated) can be accommodated regardless of a size of the wire branch portion (not illustrated), and moreover, a useless space is not formed in the wire accommodating chamber 106, which is similar to the thirteenth embodiment. As described above, it is possible to accommodate the wire branch portion (not illustrated)

regardless of the size of the wire branch portion (not illustrated), and moreover, it is possible to make the size compact as much as possible.

Since the wire fixing protruding portion 109 for the branch line is provided only on the branch protector main body 102, it is easy to wind the tape when a total diameter of the branch line W2 is extremely smaller than a total diameter of the trunk line W1.

Seventeenth Embodiment

Figure 50:
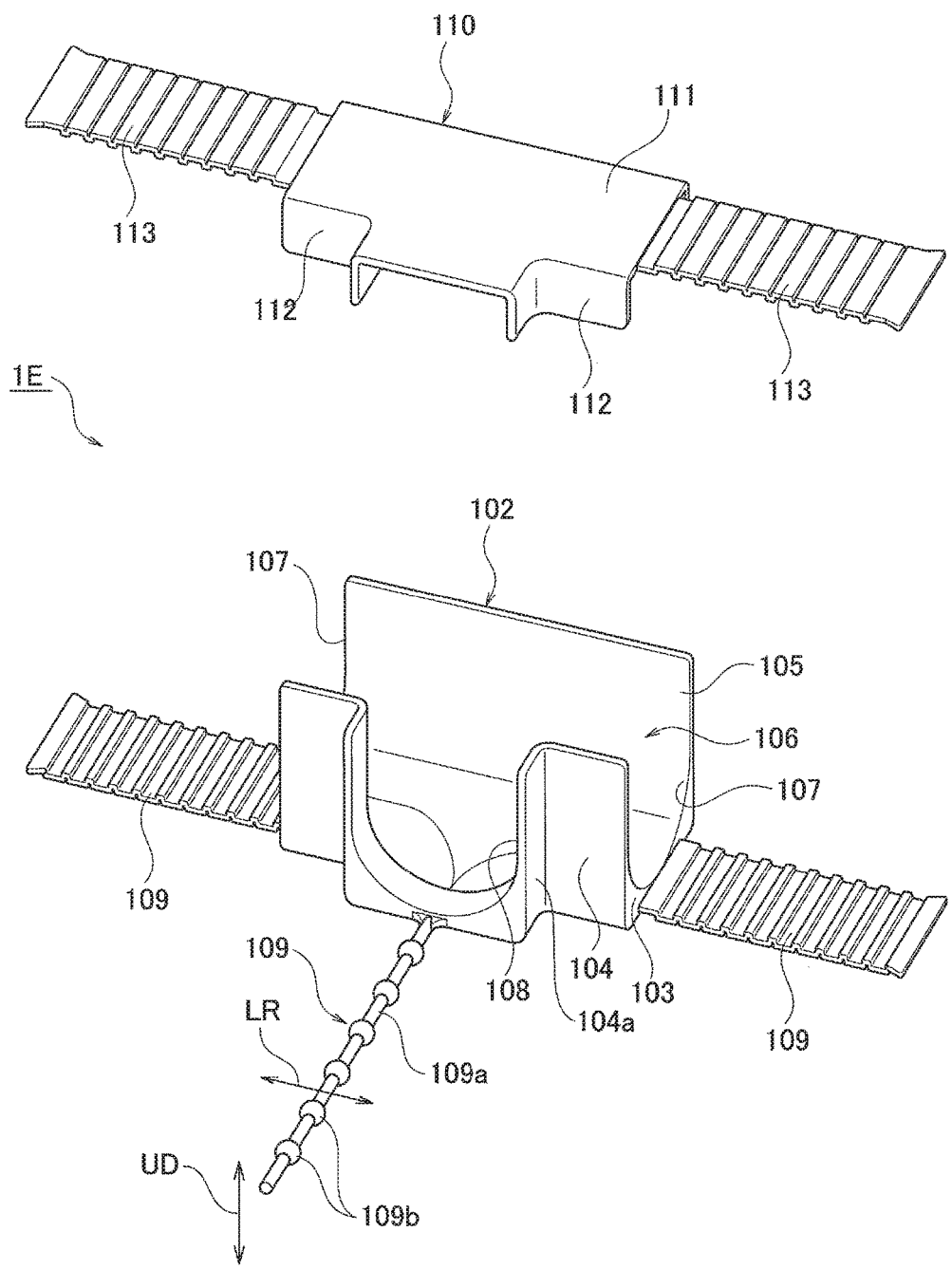
FIG. 50 illustrates a seventeenth embodiment of the invention and is an exploded perspective view of a branch protector.
Figure 51:
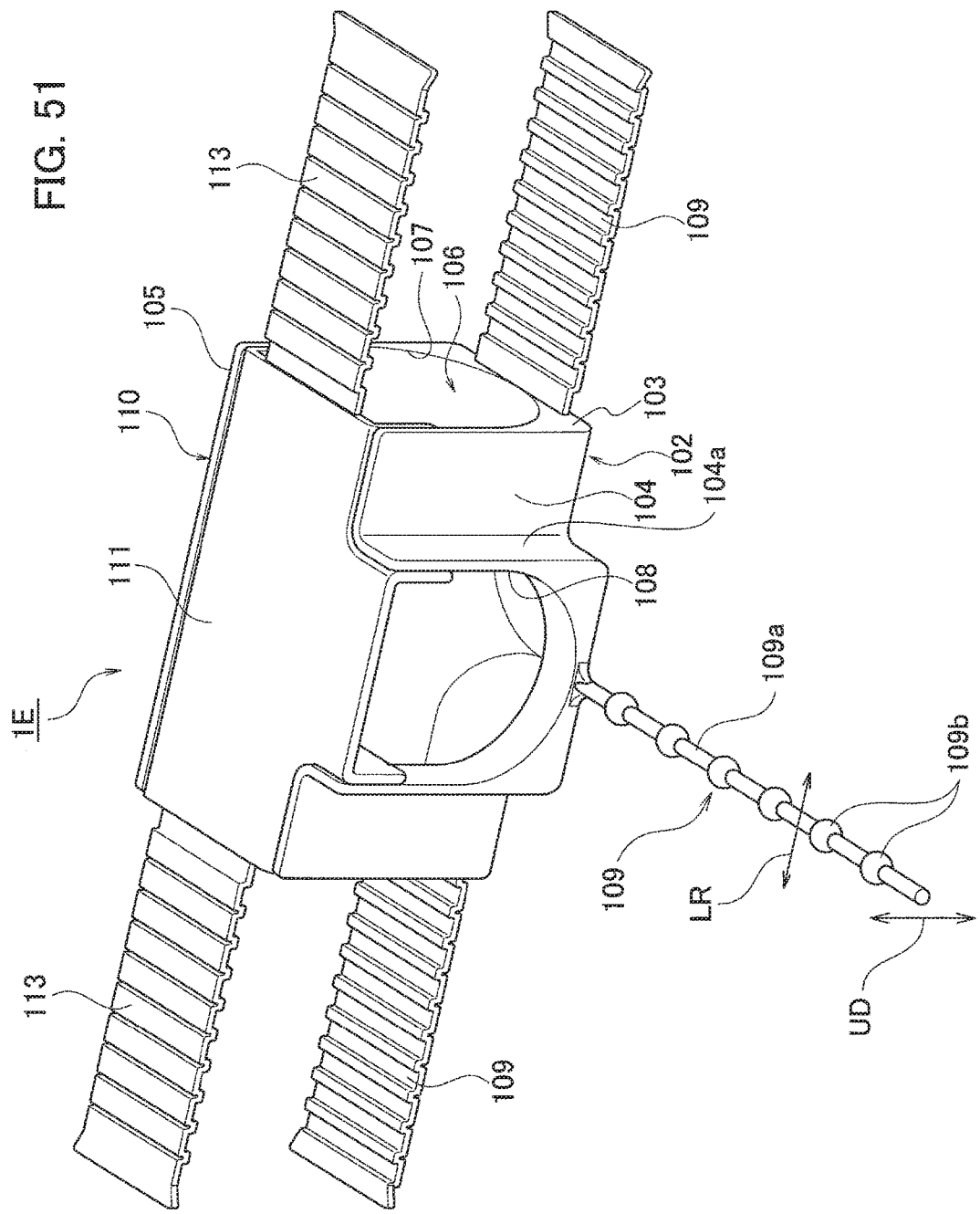
FIG. 51 illustrates the seventeenth embodiment of the invention and is a perspective view illustrating a state where a cover is arranged inside a branch protector main body.

FIGS. 50 and 51 illustrate a seventeenth embodiment of the invention. A branch protector 100E of the seventeenth embodiment is different from the thirteenth embodiment in terms of the following point. That is, the wire fixing protruding portion 113 protruding in a direction of routing the trunk line W1 (illustrated in FIG. 85) from each of the wire draw-out openings 107 on the cover 110 is provided similarly to the thirteenth embodiment. However, there is no wire fixing protruding portion protruding in a direction of routing the branch line W2 (illustrated in FIG. 85) from the wire draw-out opening 108 on the cover 110 similarly to the sixteenth embodiment.

In addition, the wire fixing protruding portion 109 protruding in a direction of routing the branch line W2 (illustrated in FIG. 85) from the wire draw-out opening 108 on the branch protector main body 102 does not have a bellows-shape but is a flexible rod 109a. Spherical protrusions 109b are provided to protrude from the flexible rod 109a with intervals Since other configurations are the same as those of the thirteenth embodiment, the same constituent parts in the drawings will be denoted by the same reference numerals, and the description thereof will be omitted.

A tape is wound around the branch line W2 (illustrated in FIG. 85) drawn out from the branch protector 100E collectively with the wire fixing protruding portion 109 on the branch protector main body 102.

Even in the seventeenth embodiment, the cover 110 is placed on the wire branch portion (not illustrated) accommodated in the wire accommodating chamber 106, and thus, the wire branch portion (not illustrated) can be accommodated regardless of a size of the wire branch portion (not illustrated), and moreover, a useless space is not formed in the wire accommodating chamber 106, which is similar to the thirteenth embodiment. As described above, it is possible to accommodate the wire branch portion (not illustrated) regardless of the size of the wire branch portion (not illustrated), and moreover, it is possible to make the size compact as much as possible.

Since the wire fixing protruding portion 109 for the branch line is provided only on the branch protector main body 102, it is easy to wind the tape when a total diameter of the branch line W2 is extremely smaller than a total diameter of the trunk line W1.

The wire fixing protruding portion 109 for the branch line is the flexible rod 109a, and thus, can be easily bent and deformed not only in the up-down direction UD but also in a left-right direction LR. Therefore, it is possible to three-dimensionally change the direction of routing the branch line W2 (illustrated in FIG. 85) drawn out from the wire draw-out opening 108, and further, the assembling workability is more favorable and the degree of freedom in routing is also higher as compared with the thirteenth to sixteenth embodiments.

The wire fixing protruding portion 109 for the branch line has the spherical protrusions 109b at intervals. Therefore, the restraint tape T (illustrated in FIG. 86) is wound so as to eat into the spherical protrusion 109b, and thus, the branch line W2 (illustrated in FIG. 85) and the branch protector 100E can be firmly fixed.

(Manufacturing Method Using Jig Pin)

Next, an assembling procedure (a manufacturing method) of the branch protector 1A and the like of each of the embodiments using jig pins 51 will be described.

Figure 52A:
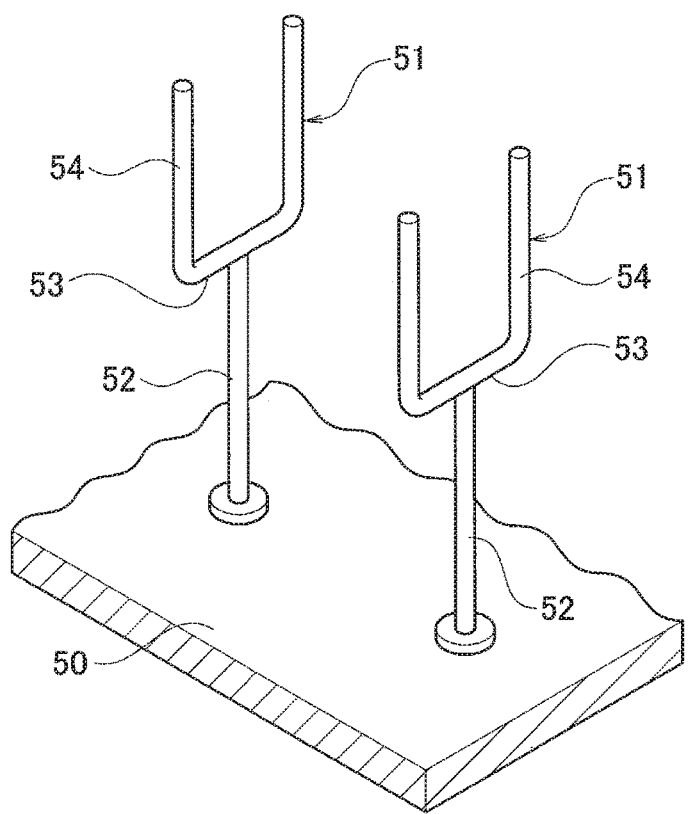
FIG. 52A is a perspective view of a jig base and a jig pin.

As illustrated in FIG. 52A, the two jig pins 51 are erected on a jig base 50 with an interval therebetween. Each of the jig pins 51 includes a vertical portion 52 whose proximal end is supported by the jig base 50, a horizontal holding portion 53 horizontally extending from a distal end of the vertical portion 52, and two vertical holding portions 54 erected from each end of the horizontal holding portion 53. The horizontal holding portions 53 and the vertical holding portions 54 of the two jig pins 51 are oriented in the same directions, respectively.

Assembling of First Embodiment

Figure 52B:
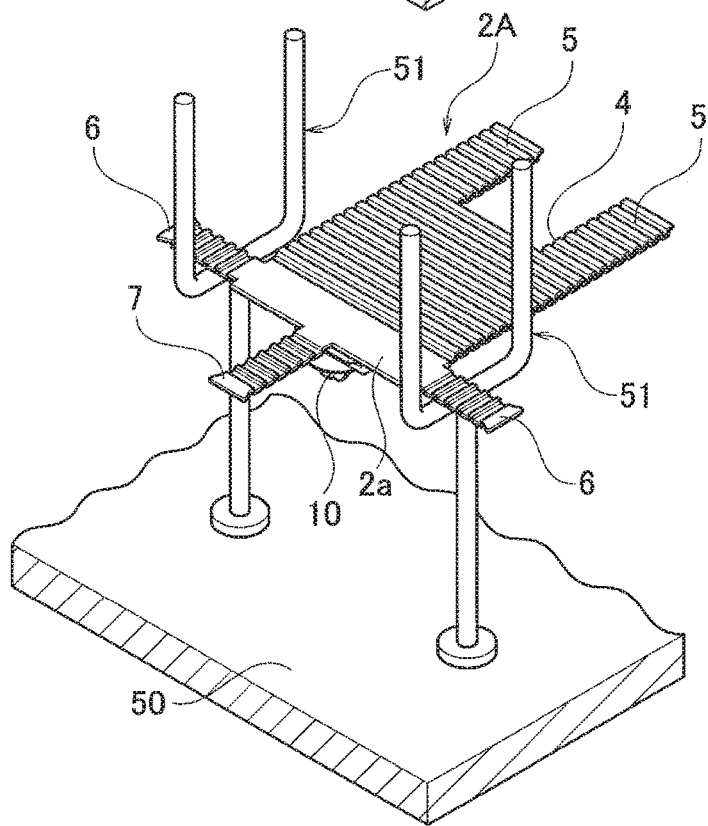
FIG. 52B is a perspective view for describing assembling using the jig pin regarding the branch protector of the first embodiment.

First, as illustrated in FIG. 52B, the protector sheet 2A in the developed state is placed on the two jig pins 51, and the protector sheet 2A is supported in a floating state from the jig base 50 (a component setting step).

Figure 53:
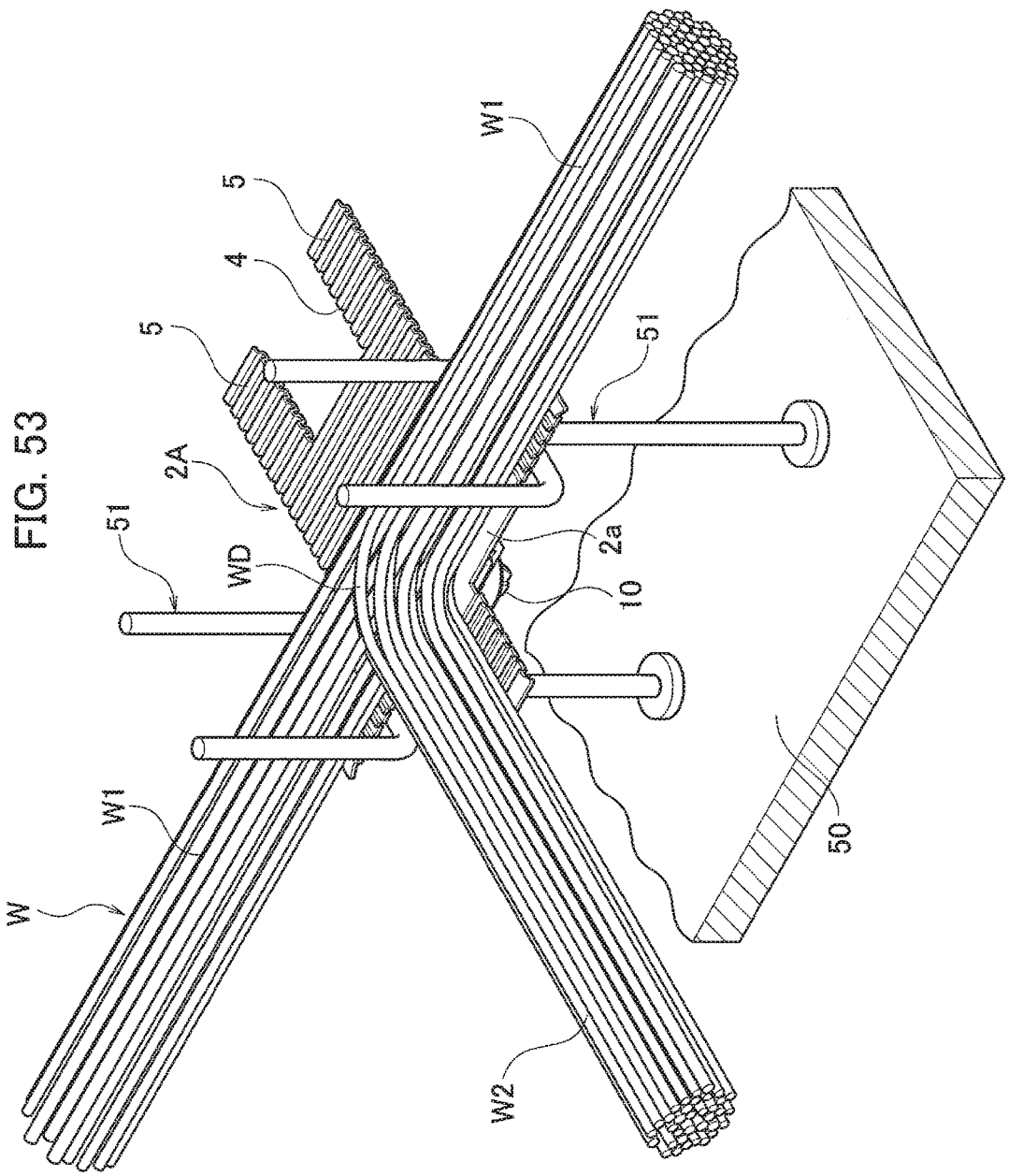
FIG. 53 is a perspective view for describing assembling using the jig pin regarding the branch protector of the first embodiment.
Figure 54:
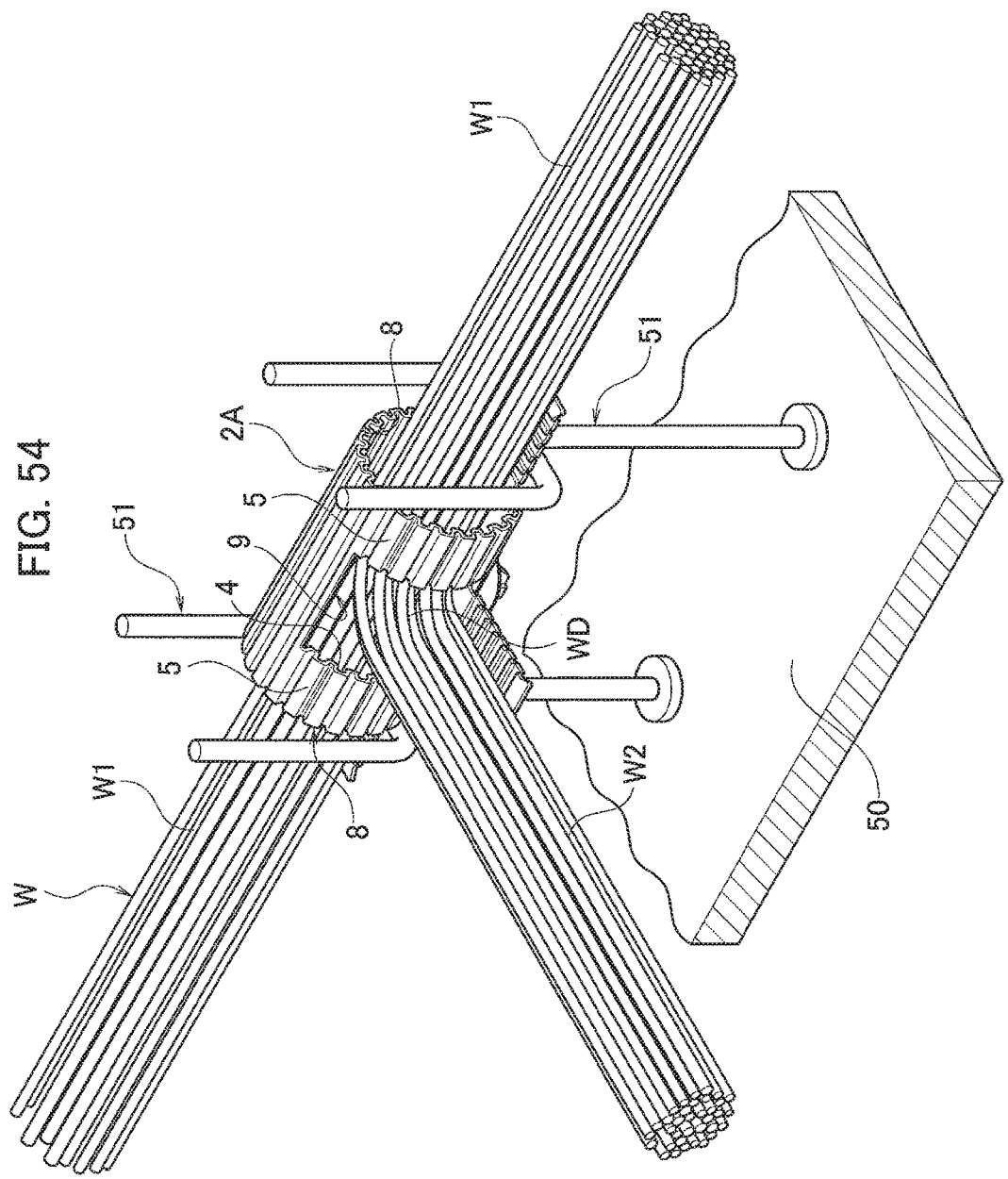
FIG. 54 is a perspective view for describing assembling using the jig pin regarding the branch protector of the first embodiment.
Figure 55:
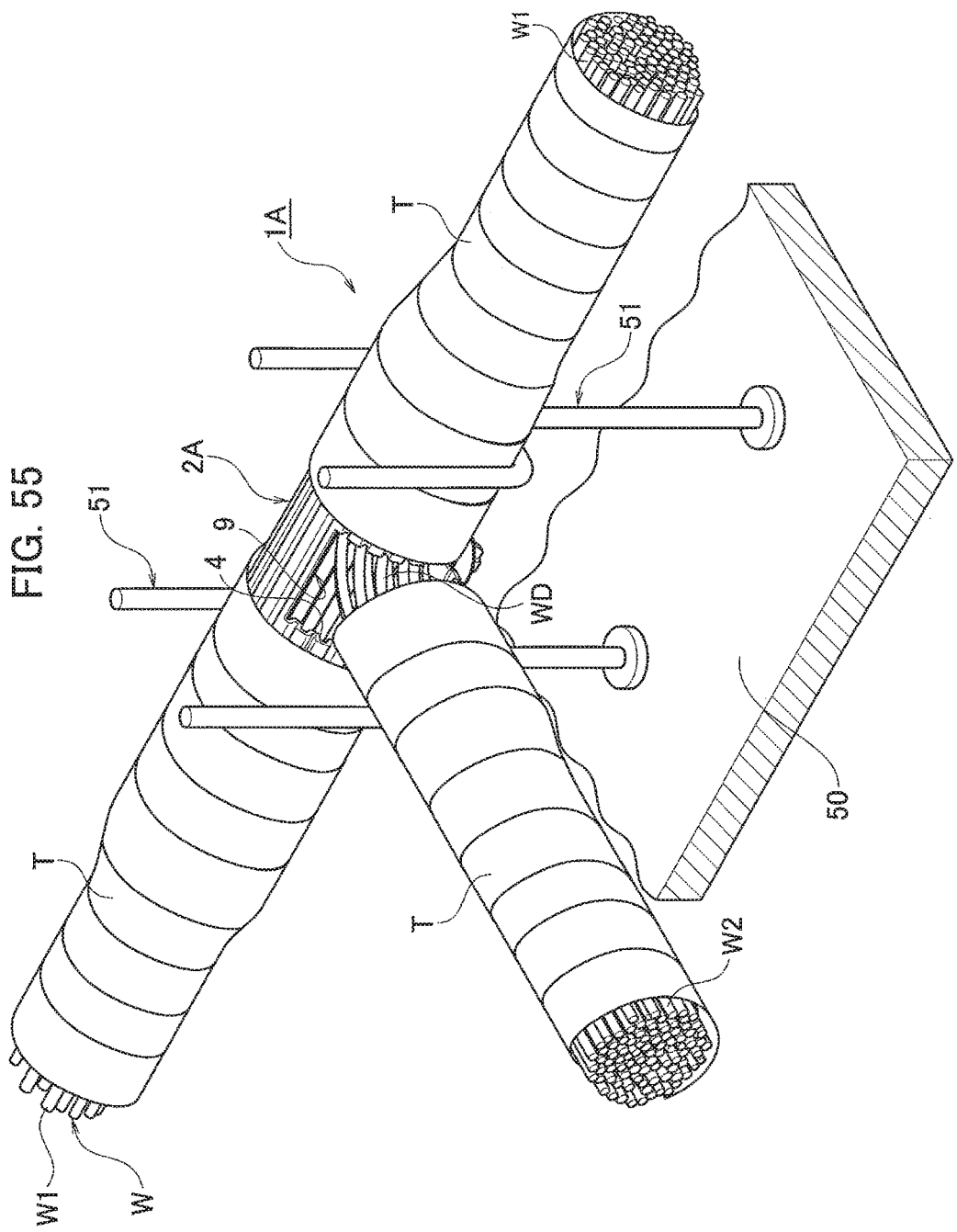
FIG. 55 is a perspective view for describing assembling using the jig pin regarding the branch protector of the first embodiment.

Next, the wire branch portion WD is placed on the protector sheet 2A as illustrated in FIG. 53. Next, the protector sheet 2A is wound around the outer circumference of the wire branch portion WD as illustrated in FIG. 54. Next, as illustrated in FIG. 55, the restraint tape T is wound around draw-out points of the trunk line W1 and the branch line W2 while holding the winding state of the protector sheet 2A (an assembling step). Accordingly, the assembling of the branch protector 1A of the first embodiment is completed.

Incidentally, when a part of the jig pin 51 has trouble in the assembling work, a position of the protector sheet 2A or the like on the jig pin 51 is appropriately shifted. This is also similarly applied to the following assembling work.

Assembling of Eighth Embodiment

Figure 56:
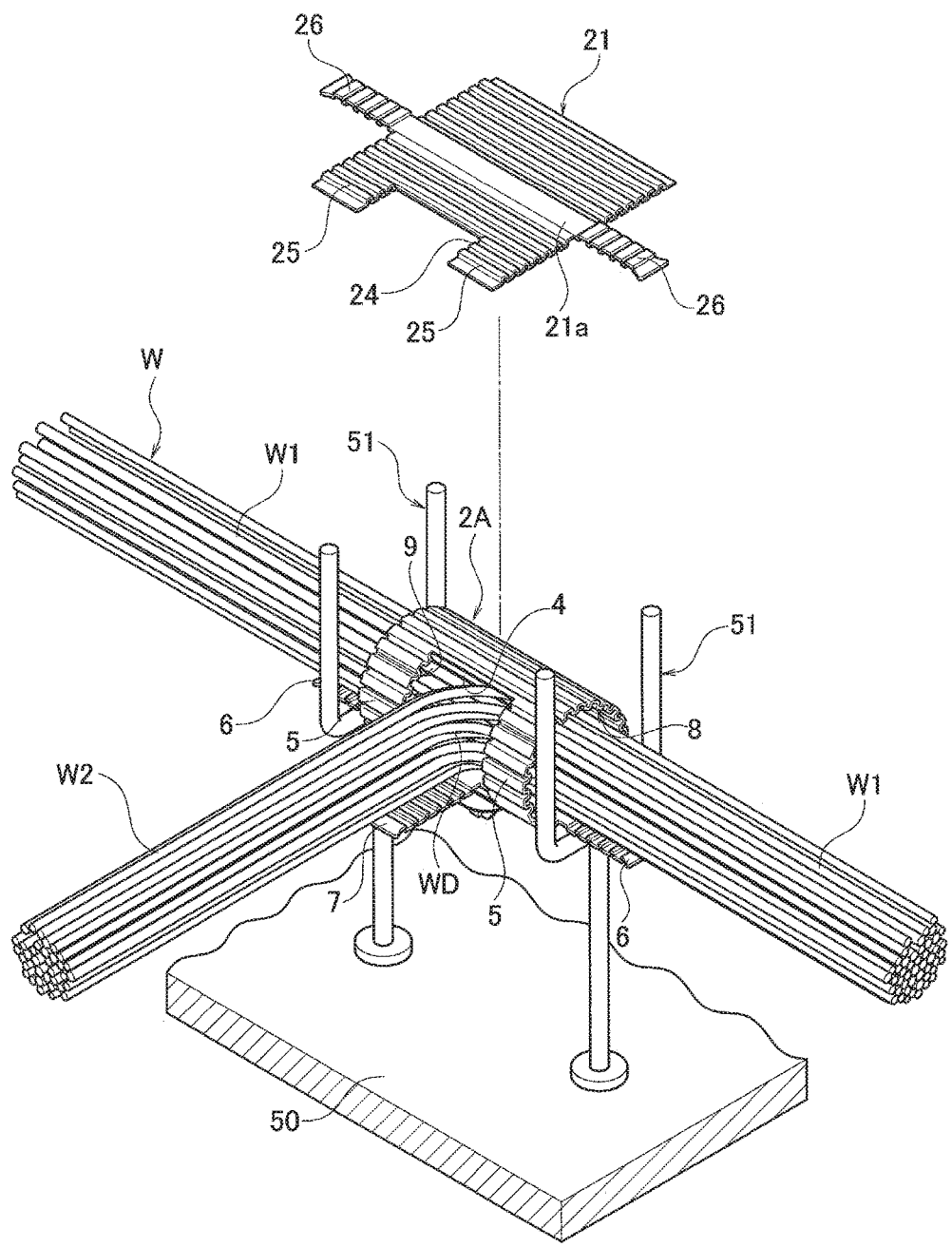
FIG. 56 is a perspective view for describing assembling using the jig pin regarding the branch protector of the eighth embodiment.
Figure 57:
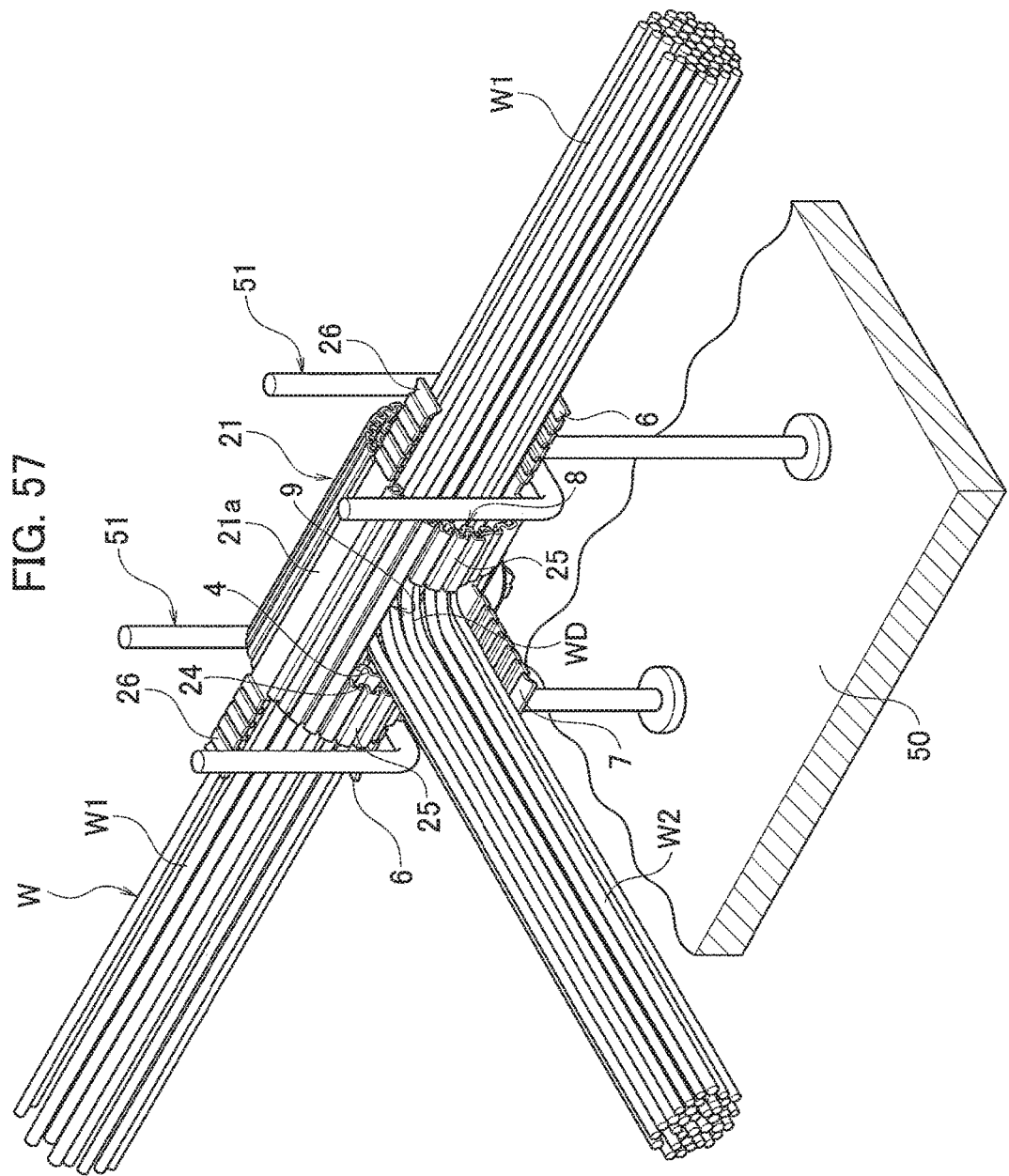
FIG. 57 is a perspective view for describing assembling using the jig pin regarding the branch protector of the eighth embodiment.
Figure 58:
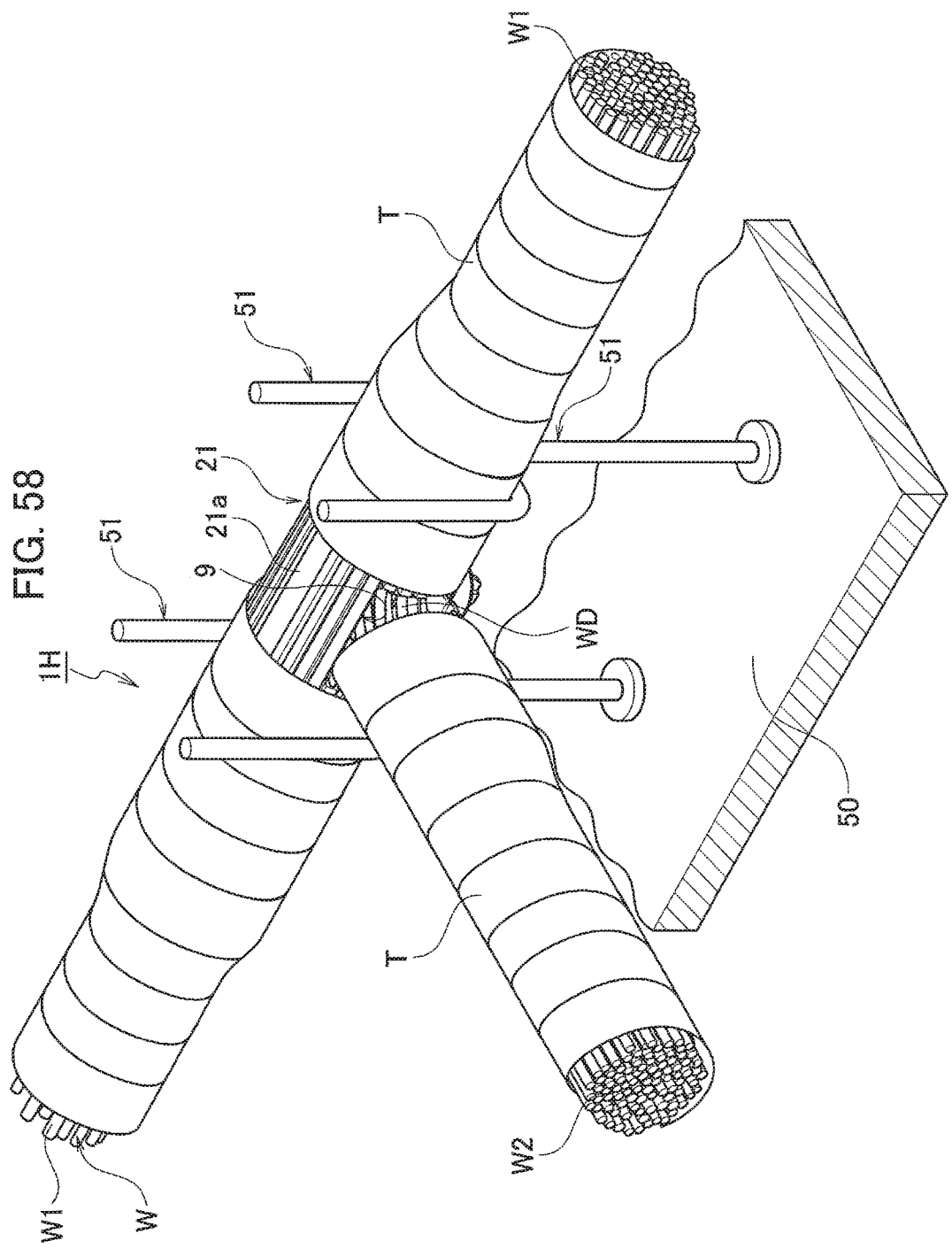
FIG. 58 is a perspective view for describing assembling using the jig pin regarding the branch protector of the eighth embodiment.

Assembling is performed in the same manner as the first embodiment up to a state in FIG. 56. Thereafter, as illustrated in FIG. 56, the reinforcing protector sheet 21 is placed to cover the protector sheet 2A from above. Next, as illustrated in FIG. 57, the reinforcing protector sheet 21 is wound around the protector sheet 2A to overlap each other. Next, as illustrated in FIG. 58, the restraint tape T is wound around draw-out points of the trunk line W1 and the branch line W2 while holding the winding states of the protector sheet 2A and the reinforcing protector sheet 21. Accordingly, the assembling of the branch protector 1H of the eighth embodiment is completed.

Assembling of Tenth Embodiment

Figure 59:
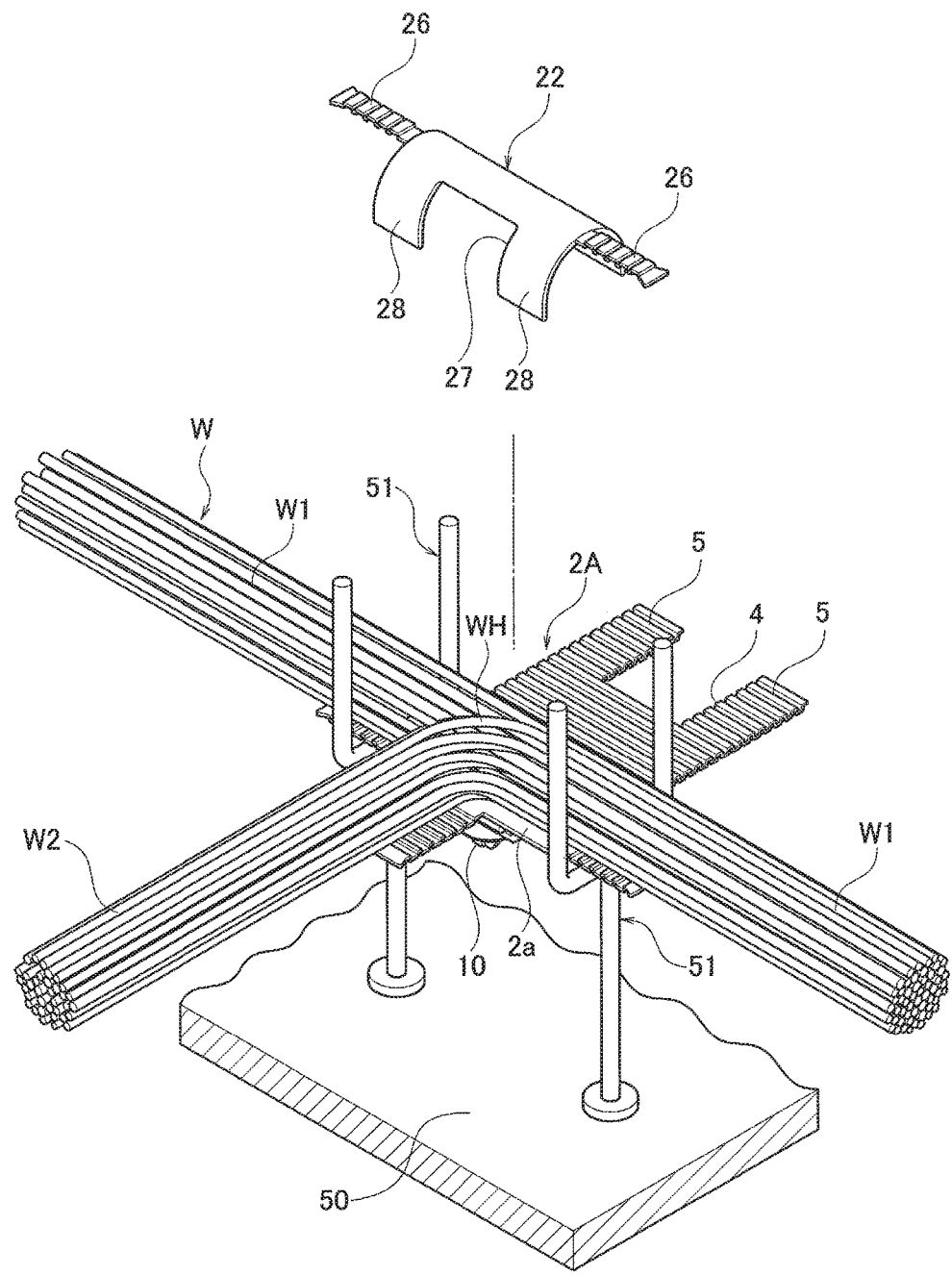
FIG. 59 is a perspective view for describing assembling using the jig pin regarding the branch protector of the tenth embodiment.
Figure 60:
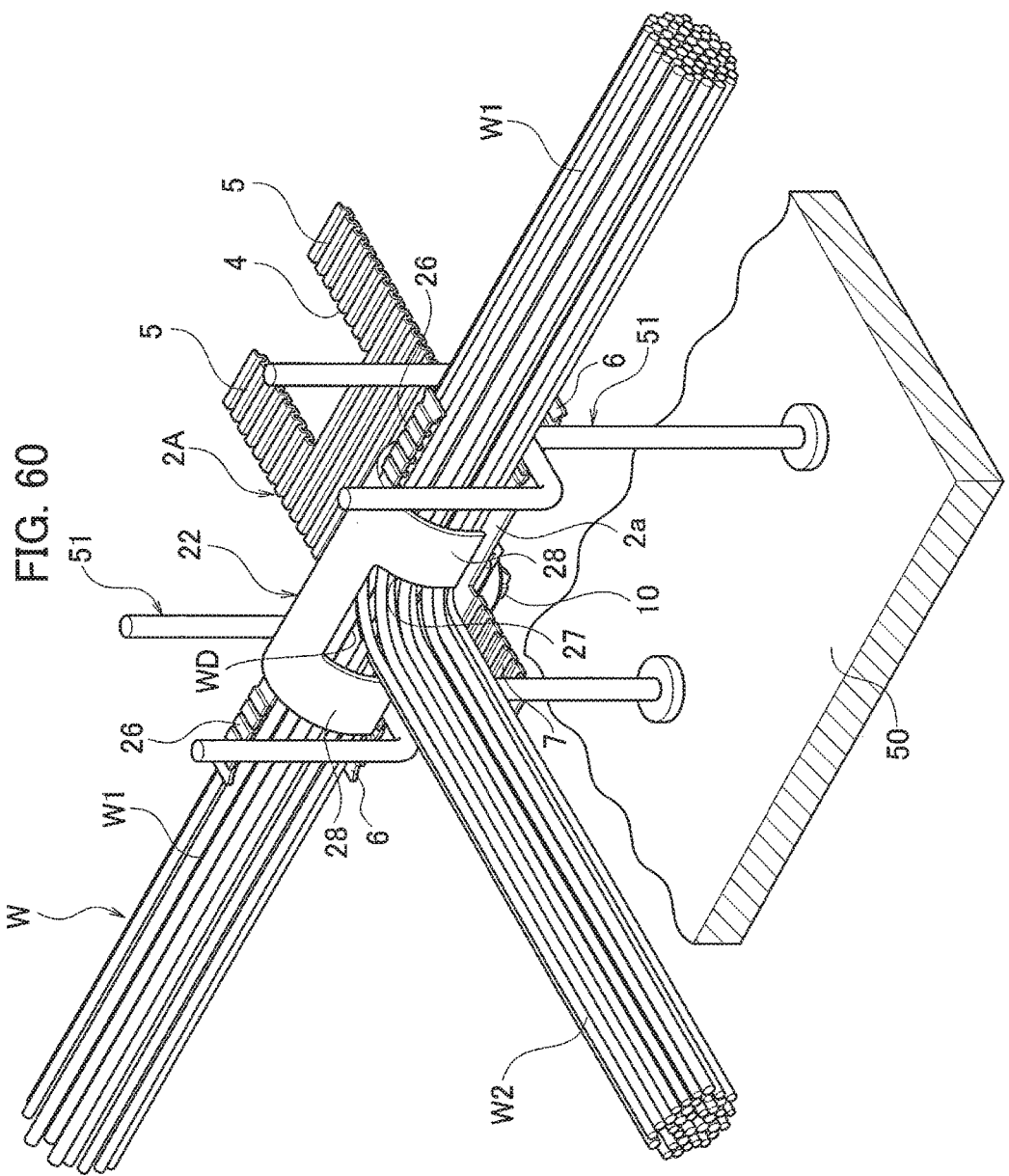
FIG. 60 is a perspective view for describing assembling using the jig pin regarding the branch protector of the tenth embodiment.
Figure 61:
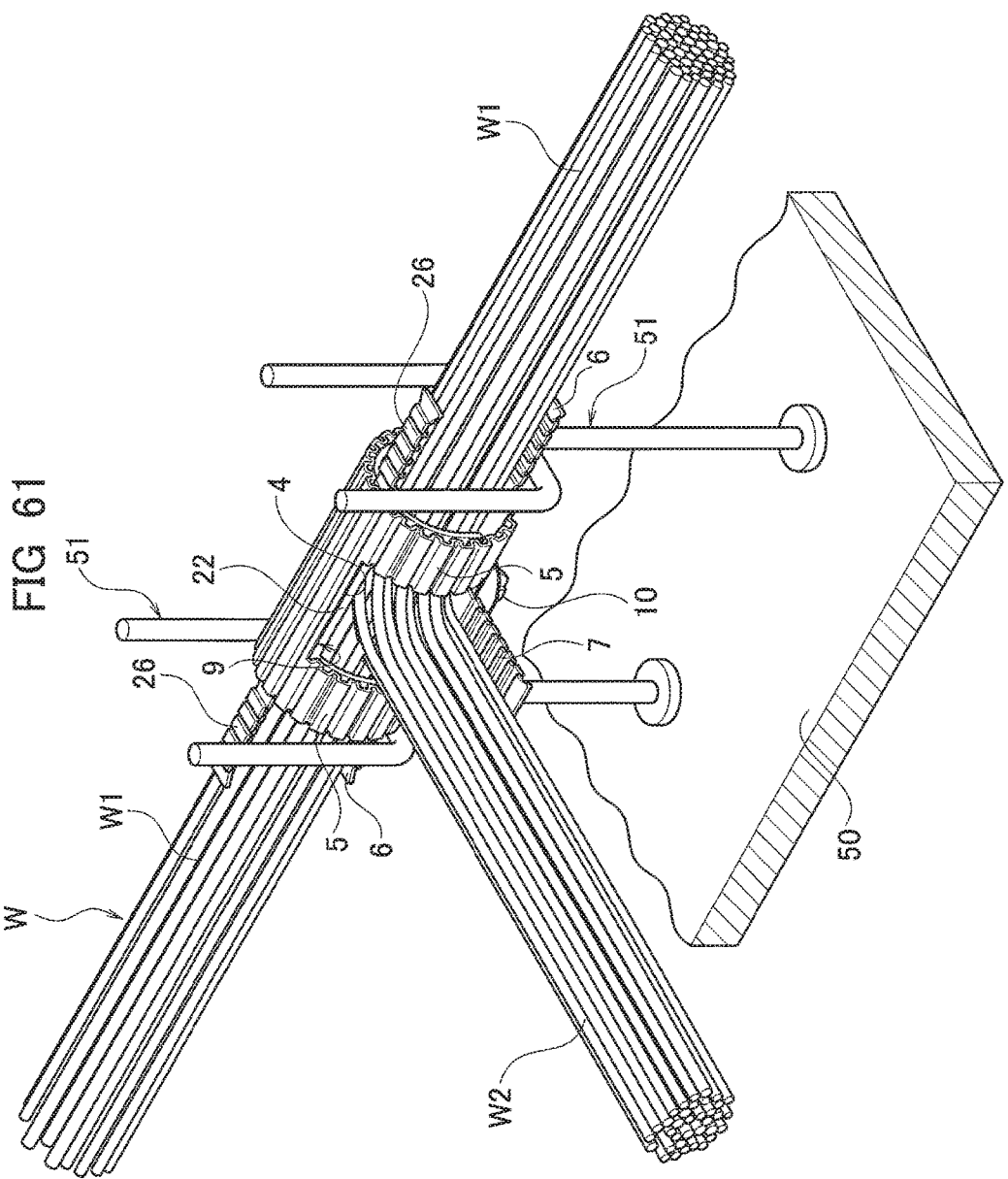
FIG. 61 is a perspective view for describing assembling using the jig pin regarding the branch protector of the tenth embodiment.
Figure 62:
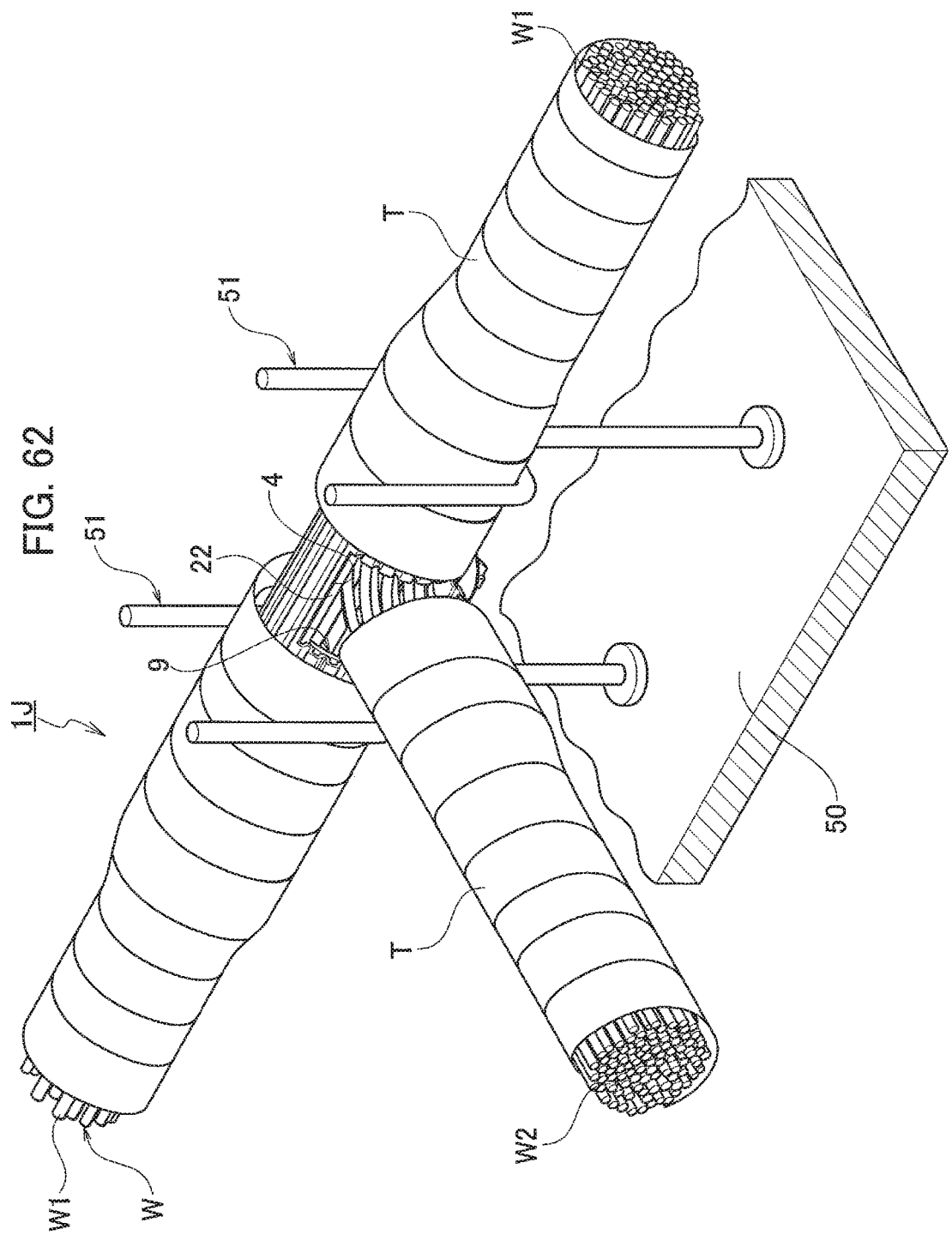
FIG. 62 is a perspective view for describing assembling using the jig pin regarding the branch protector of the tenth embodiment.

Assembling is performed in the same manner as the first embodiment up to a state in FIG. 53. Thereafter, as illustrated in FIGS. 59 and 60, the reinforcing protector plate 22 is placed to cover the wire branch portion WD from above. Next, the protector sheet 2A is wound above the reinforcing protector plate 22 to overlap each other as illustrated in FIG. 61. Next, as illustrated in FIG. 62, the restraint tape T is wound around draw-out points of the trunk line W1 and the branch line W2 while holding the winding state of the protector sheet 2A. Accordingly, the assembling of the branch protector 1 of the tenth embodiment is completed.

Assembling of Second Embodiment

Figure 63:
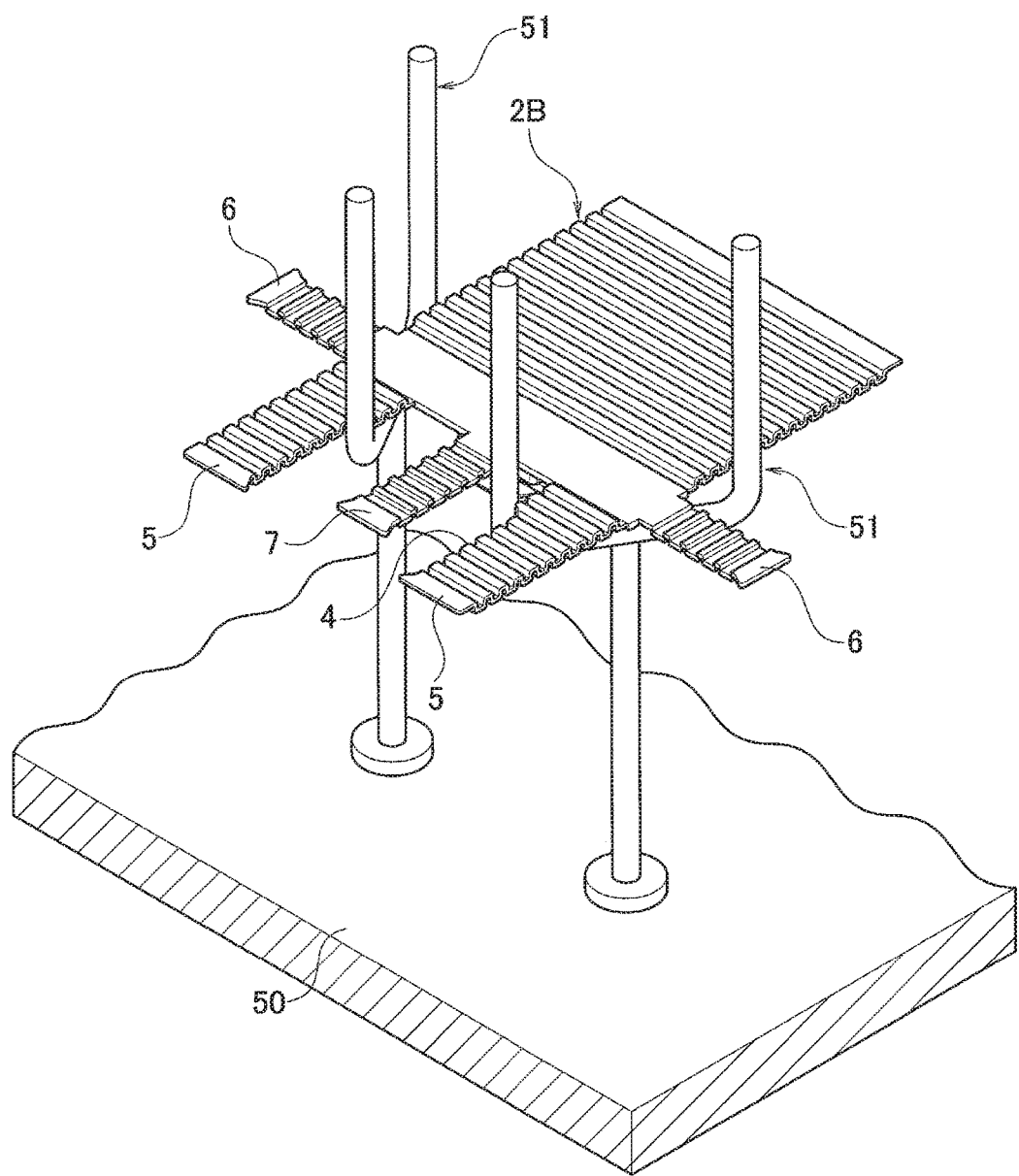
FIG. 63 is a perspective view for describing assembling using the jig pin regarding the branch protector of the ninth embodiment.

First, as illustrated in FIG. 63, the protector sheet 2B in the developed state is placed on the two jig pins 51, and the protector sheet 2B is supported in a floating state from the jig base 50 (a component setting step).

Figure 64:
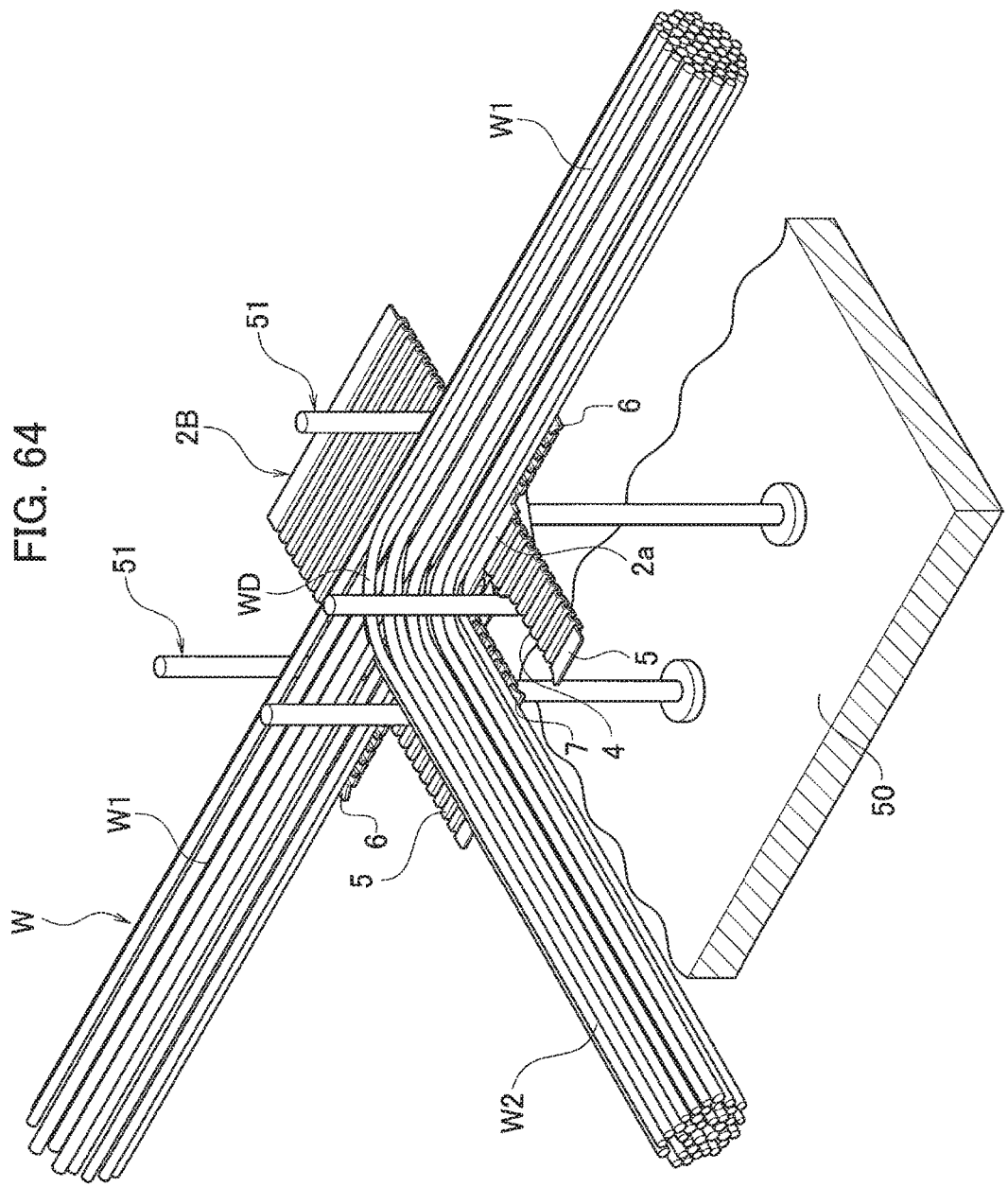
FIG. 64 is a perspective view for describing assembling using jig pins of the branch protector of the ninth embodiment.
Figure 65:
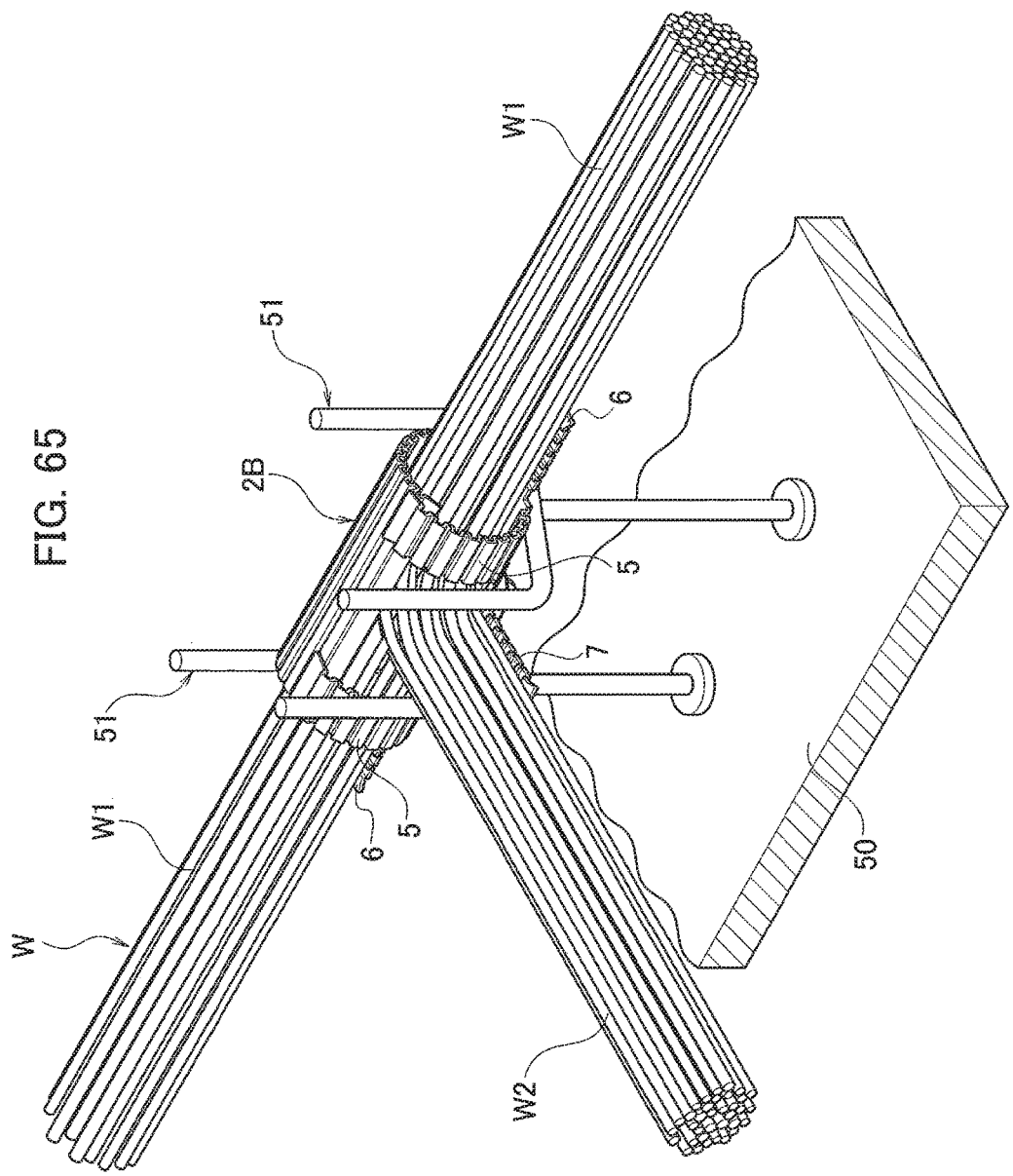
FIG. 65 is a perspective view for describing assembling using jig pins of the branch protector of the ninth embodiment.
Figure 66:
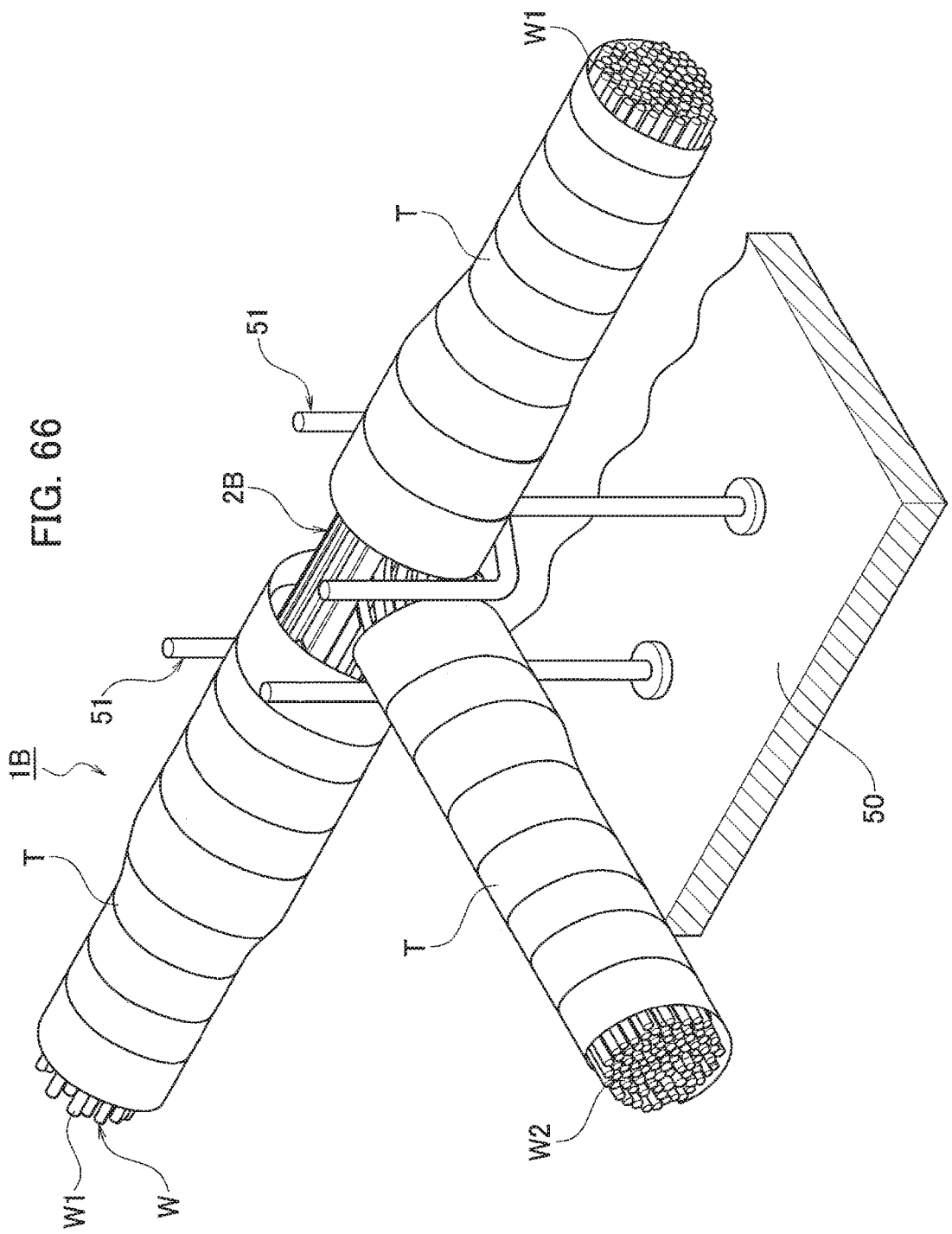
FIG. 66 is a perspective view for describing assembling using jig pins of the branch protector of the ninth embodiment.

Next, the wire branch portion WD is placed on the protector sheet 2B as illustrated in FIG. 64. Next, the protector sheet 2B is wound around the outer circumference of the wire branch portion WD as illustrated in FIG. 65. Next, as illustrated in FIG. 66, the restraint tape T is wound around draw-out points of the trunk line W1 and the branch line W2 while holding the winding state of the protector sheet 2B (an assembling step). Accordingly, the assembling of the branch protector 1B of the second embodiment is completed.

Assembling of Ninth Embodiment

Figure 67:
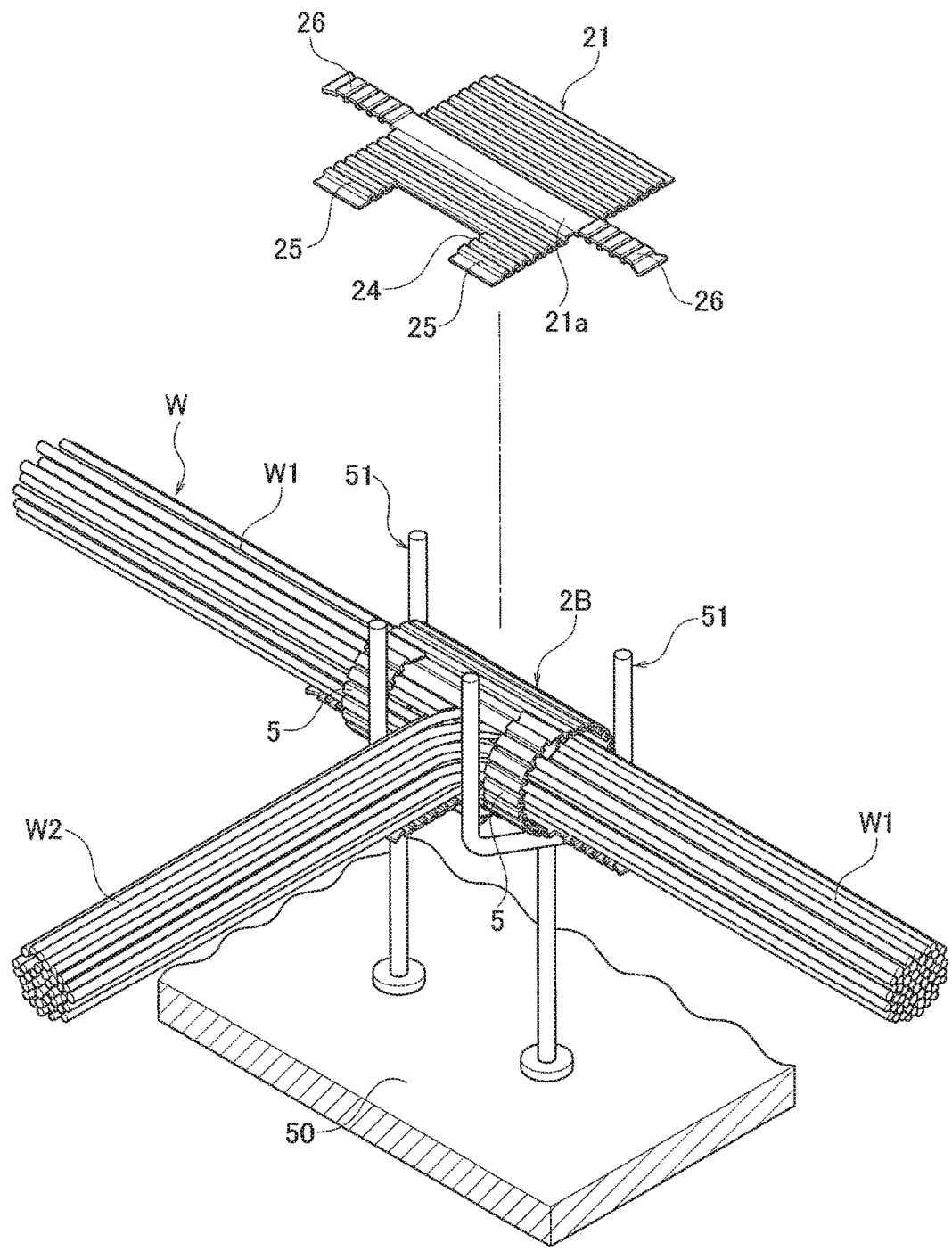
FIG. 67 is a perspective view for describing assembling using jig pins of the branch protector of the ninth embodiment.
Figure 68:
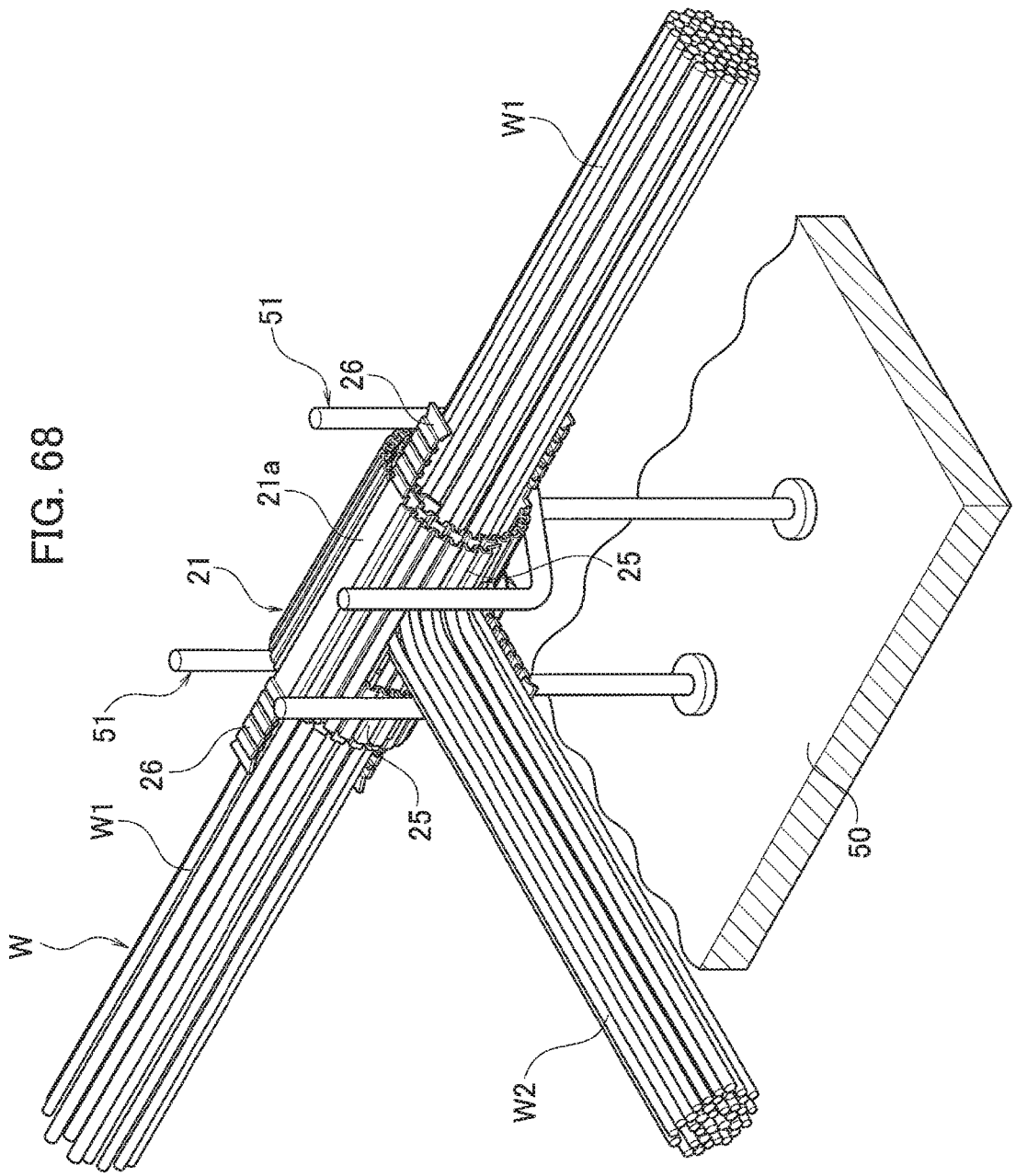
FIG. 68 is a perspective view for describing assembling using jig pins of the branch protector of the ninth embodiment.
Figure 69:
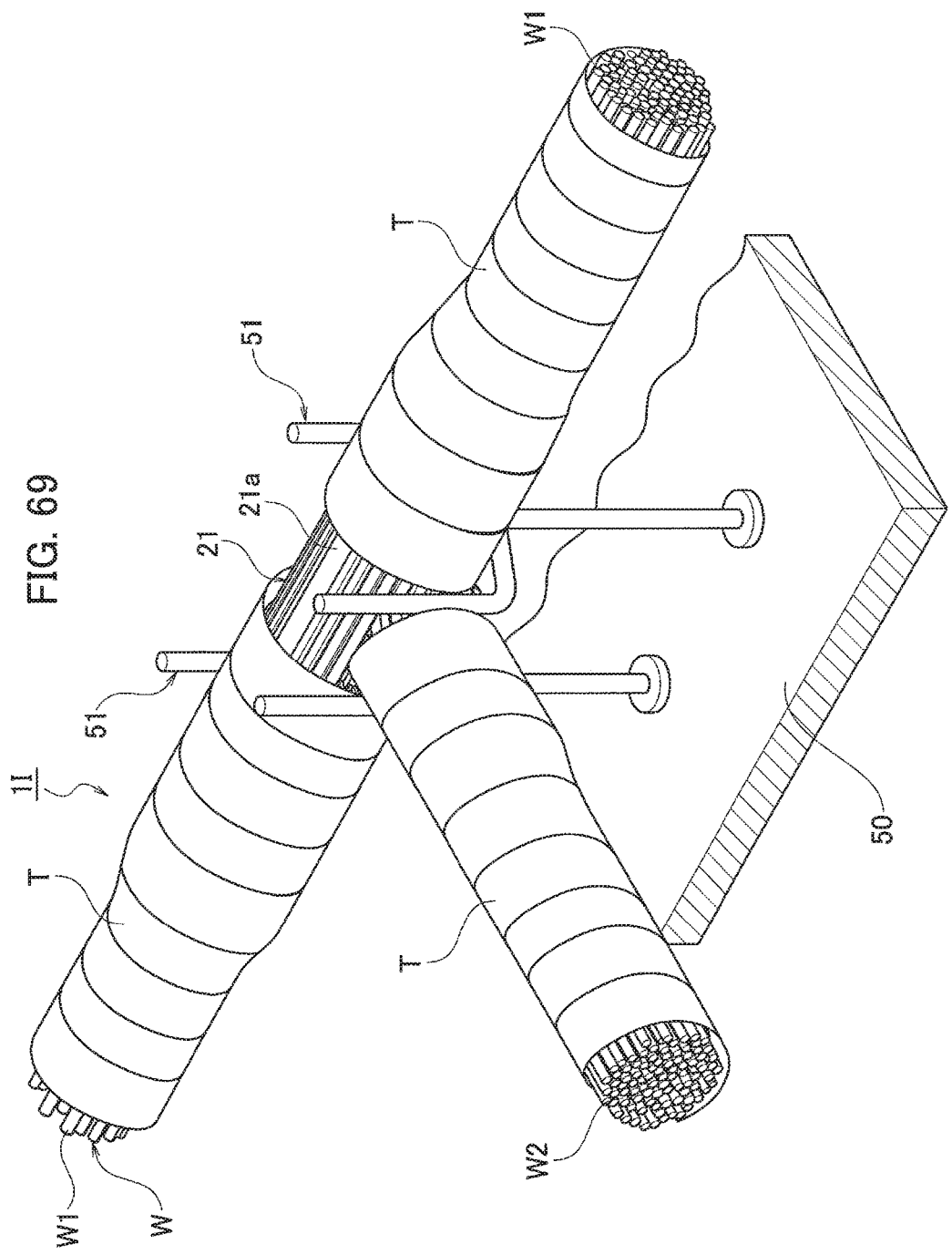
FIG. 69 is a perspective view for describing assembling using jig pins of the branch protector of the ninth embodiment.

Assembling is performed in the same manner as the second embodiment up to a state in FIG. 65. Thereafter, as illustrated in FIG. 67, the reinforcing protector sheet 21 is placed on the protector sheet 2B to cover the protector sheet 2B. Next, as illustrated in FIG. 68, the reinforcing protector sheet 21 is wound from above the protector sheet 2B to overlap each other. Next, as illustrated in FIG. 69, the restraint tape T is wound around draw-out points of the trunk line W1 and the branch line W2 while holding the winding states of the protector sheet 2B and the reinforcing protector sheet 21. Accordingly, the assembling of a branch protector 1I of the ninth embodiment is completed.

Assembling of Eleventh Embodiment

Figure 70:
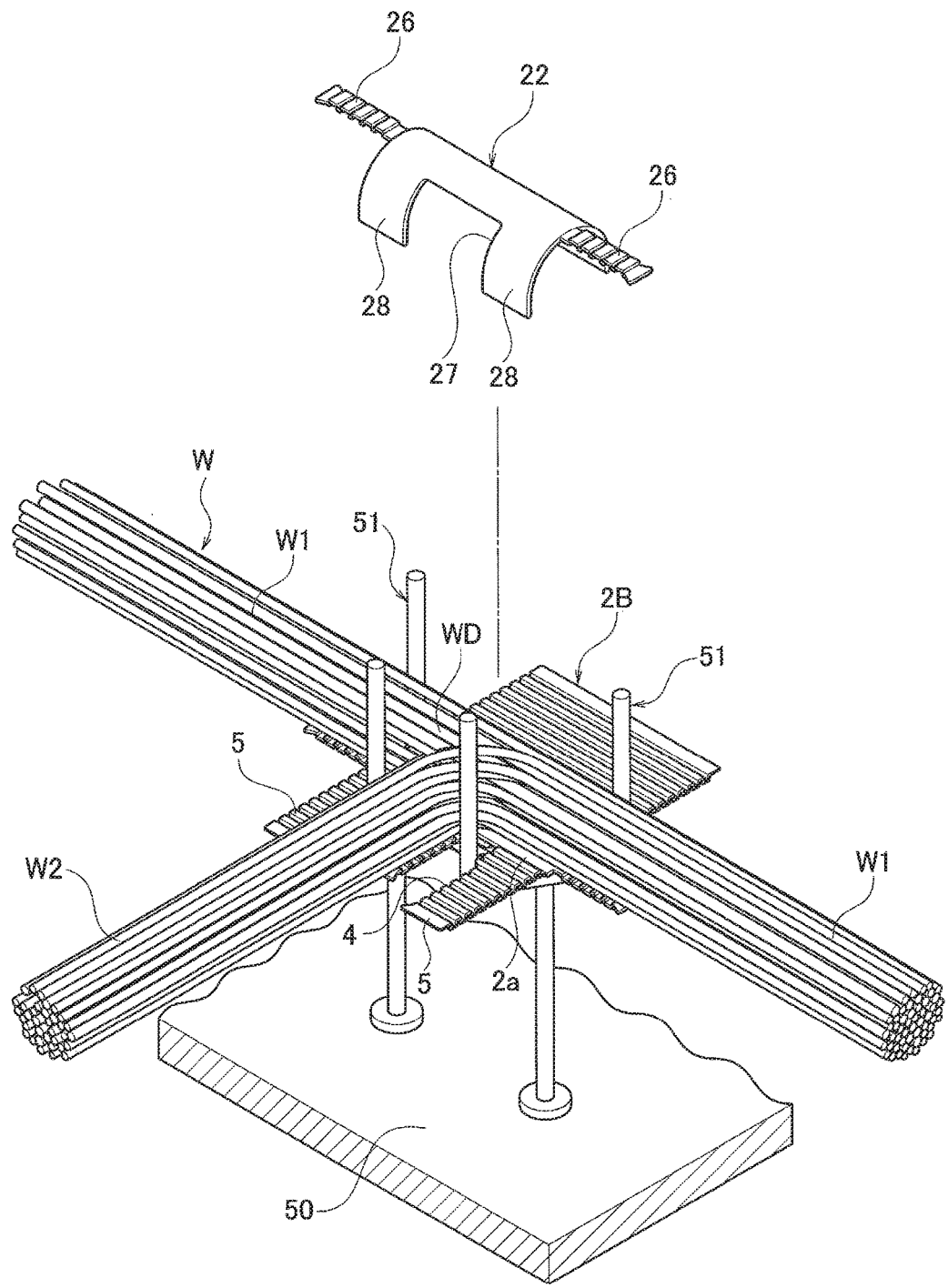
FIG. 70 is a perspective view for describing assembling using jig pins of the branch protector of the eleventh embodiment.
Figure 71:
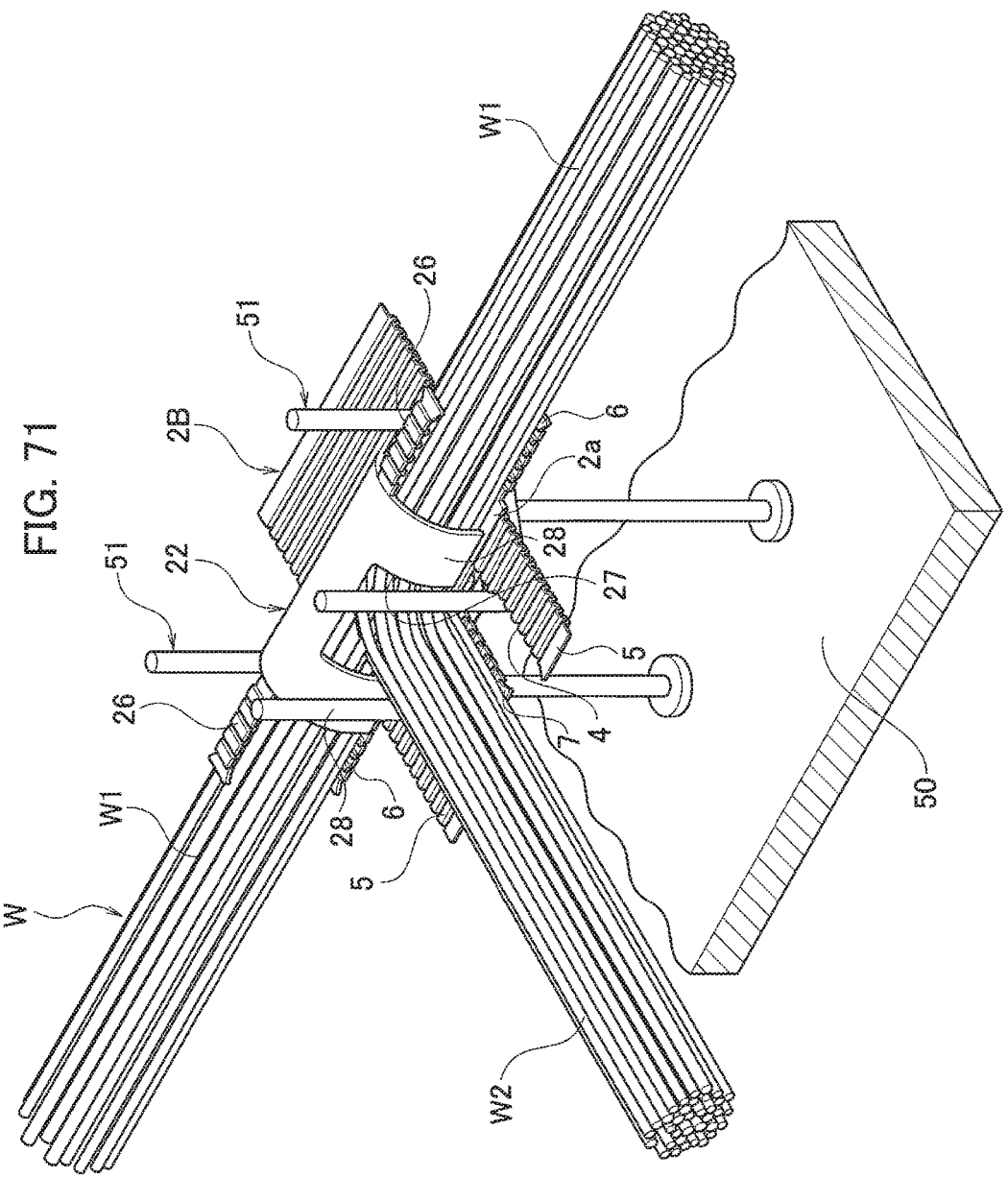
FIG. 71 is a perspective view for describing assembling using jig pins of the branch protector of the eleventh embodiment.
Figure 72:
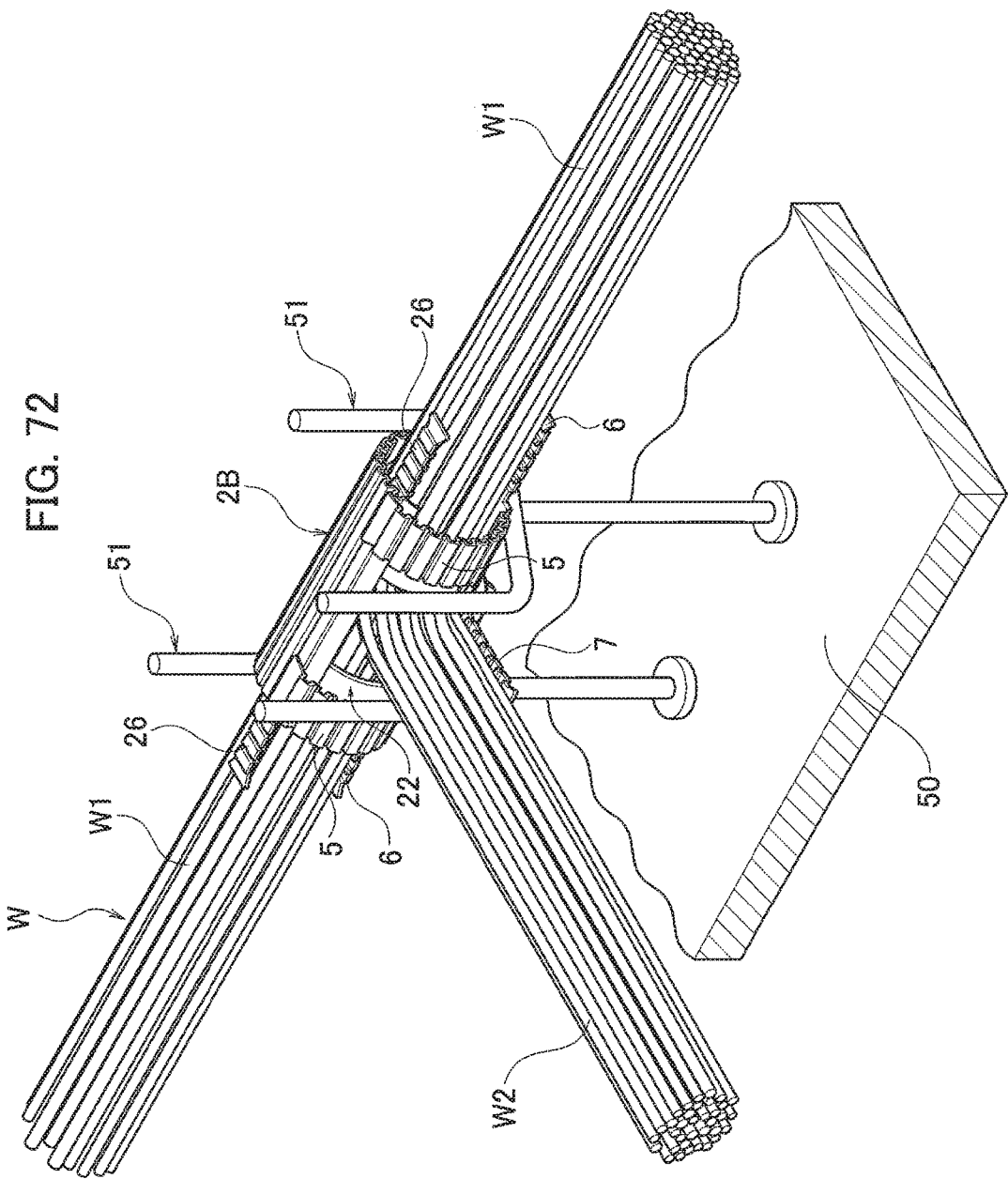
FIG. 72 is a perspective view for describing assembling using jig pins of the branch protector of the eleventh embodiment.
Figure 73:
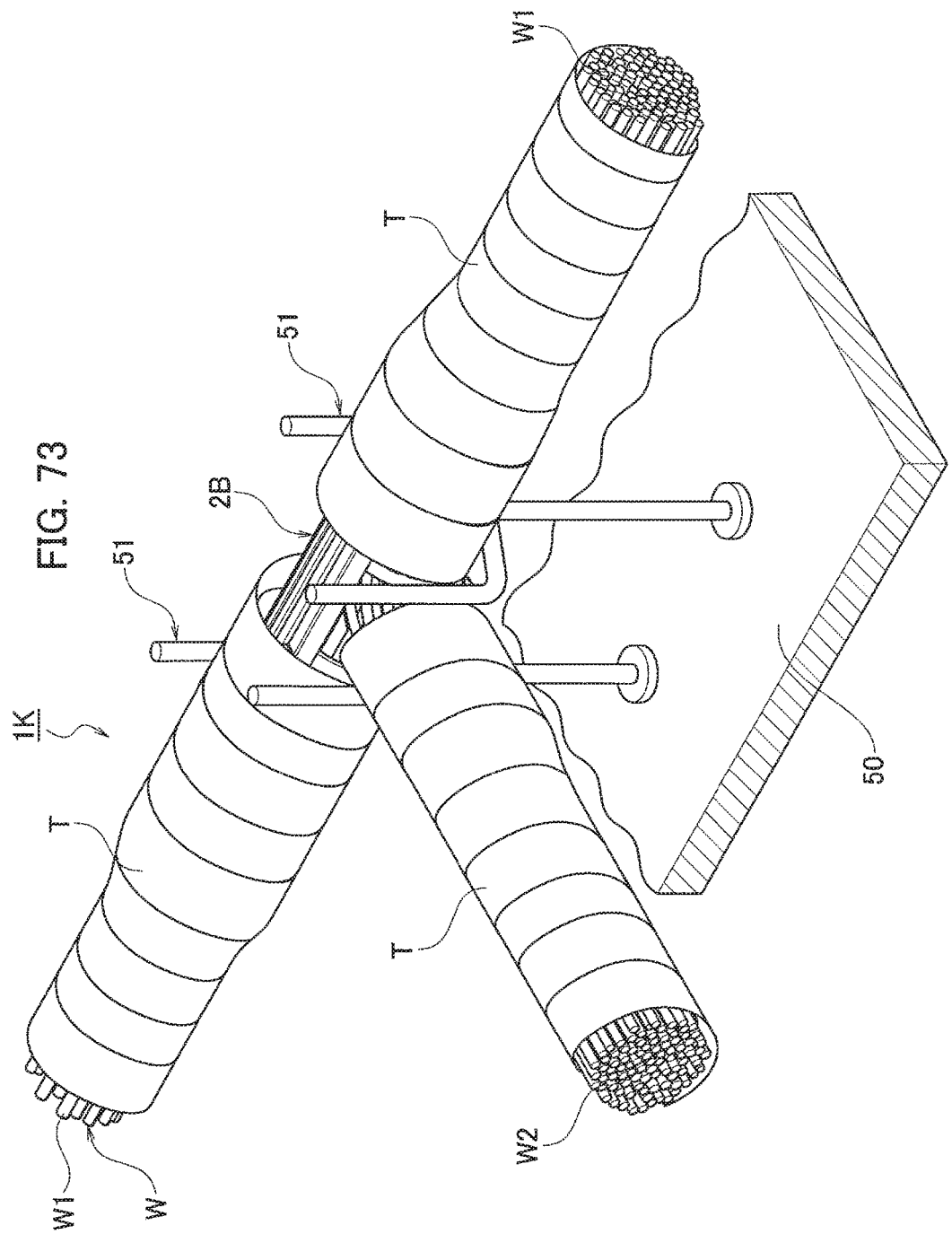
FIG. 73 is a perspective view for describing assembling using jig pins of the branch protector of the eleventh embodiment.

Assembling is performed in the same manner as the second embodiment up to a state in FIG. 64. Thereafter, as illustrated in FIGS. 70 and 71, the reinforcing protector plate 22 is placed to cover the wire branch portion WD from above. Next, the protector sheet 2B is wound from above the reinforcing protector plate 22 as illustrated in FIG. 72. Next, as illustrated in FIG. 73, the restraint tape T is wound around draw-out points of the trunk line W1 and the branch line W2 while holding the winding state of the protector sheet 2B. Accordingly, the assembling of a branch protector 1K of the eleventh embodiment is completed.

Assembling of Twelfth Embodiment

Figure 74:
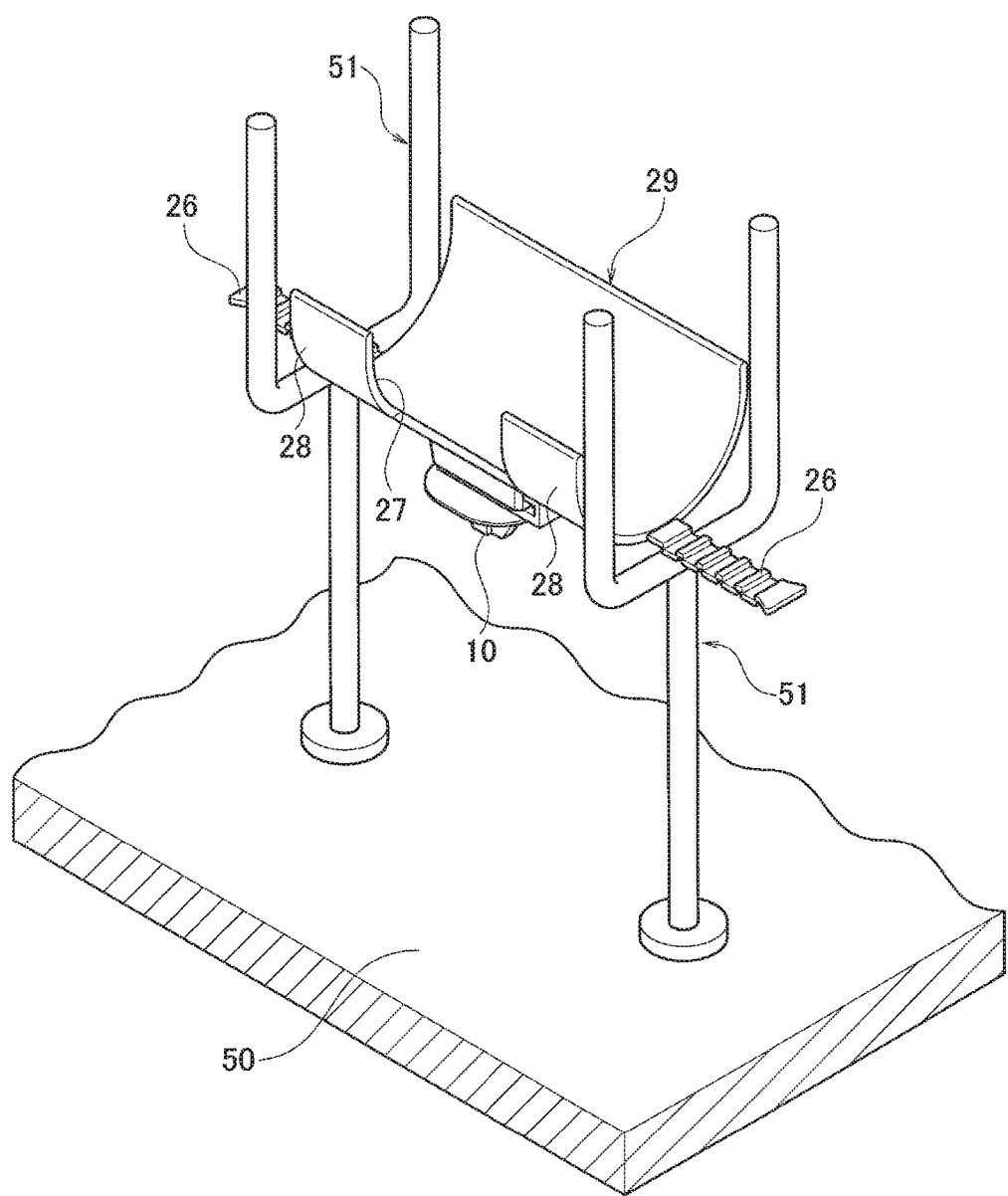
FIG. 74 is a perspective view for describing assembling using jig pins of the branch protector of the twelfth embodiment.

First, as illustrated in FIG. 74, the reinforcing protector plate 29 is placed on the two jig pins 51, and the reinforcing protector plate 29 is supported in the floating state from the jig base 50 (a component setting step).

Figure 75:
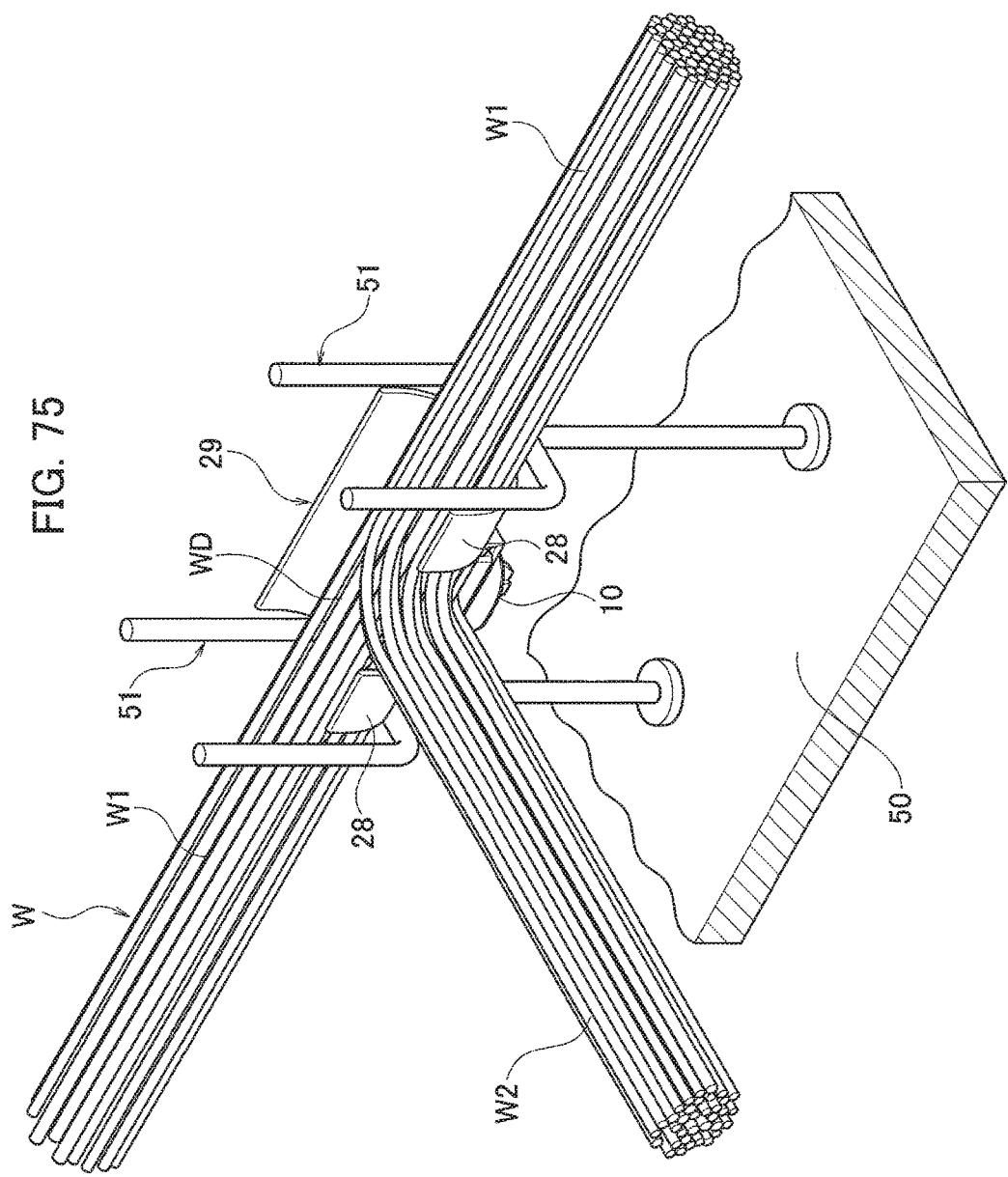
FIG. 75 is a perspective view for describing assembling using jig pins of the branch protector of the twelfth embodiment.
Figure 76:
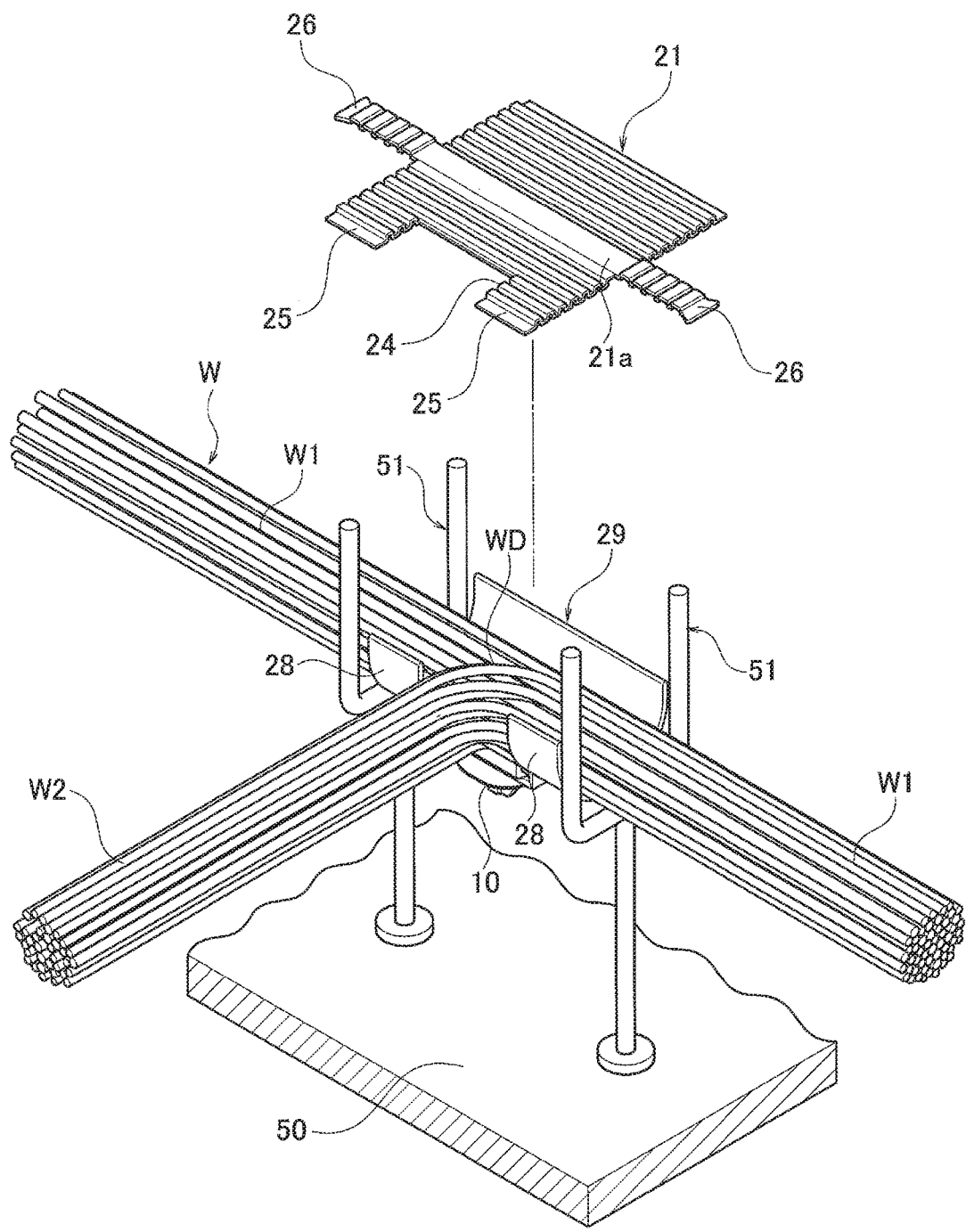
FIG. 76 is a perspective view for describing assembling using jig pins of the branch protector of the twelfth embodiment.
Figure 77:
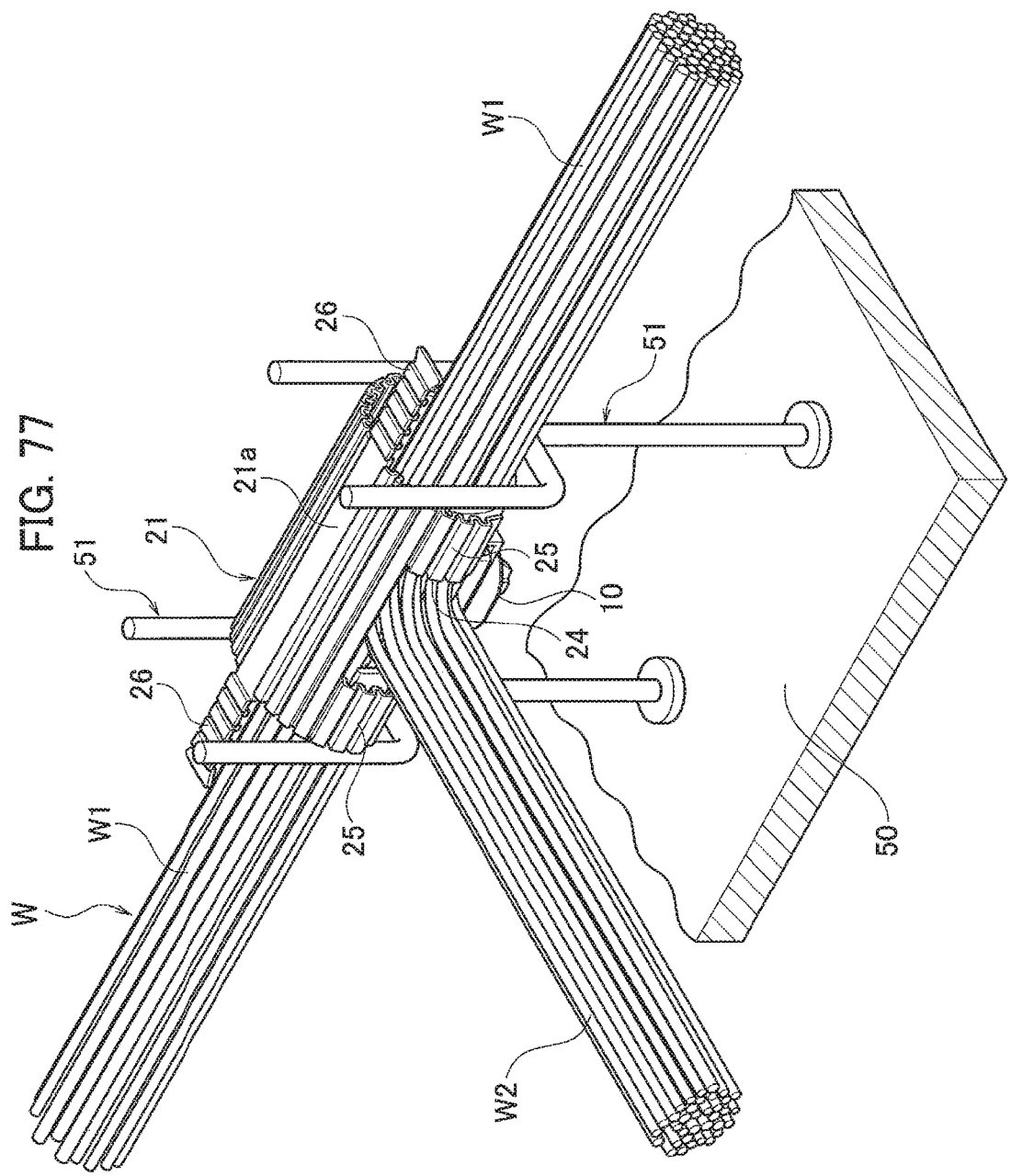
FIG. 77 is a perspective view for describing assembling using jig pins of the branch protector of the twelfth embodiment.
Figure 78:
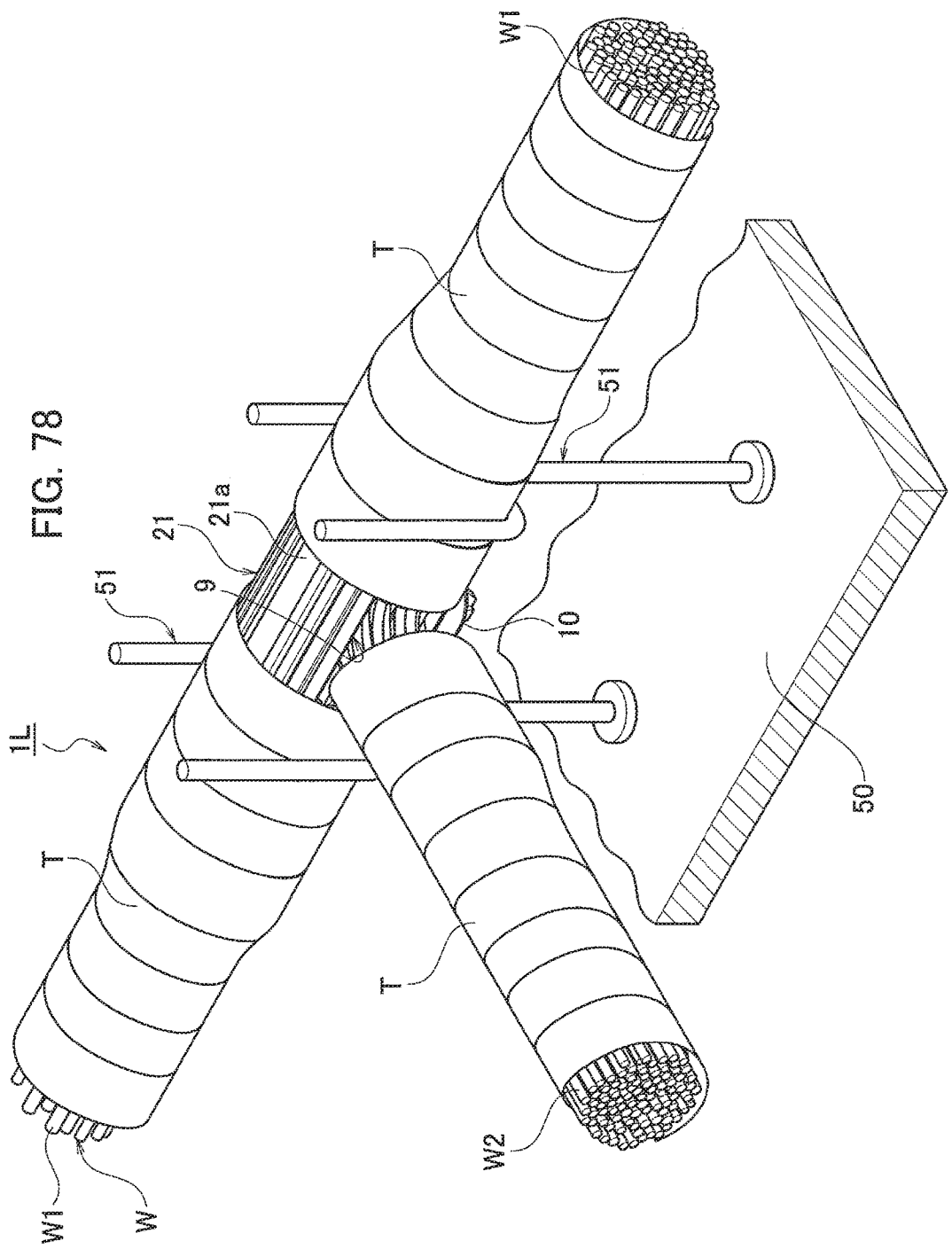
FIG. 78 is a perspective view for describing assembling using jig pins of the branch protector of the twelfth embodiment.

Next, the wire branch portion WD is placed on the reinforcing protector plate 29 as illustrated in FIG. 75. Next, the protector sheet 21 is placed to cover the wire branch portion WD from above as illustrated in FIG. 76. Next, the protector sheet 21 is wound from above the reinforcing protector plate 29 as illustrated in FIG. 77. Next, as illustrated in FIG. 78, the restraint tape T is wound around draw-out points of the trunk line W1 and the branch line W2 while holding the winding state of the protector sheet 21 (an assembling step). Accordingly, the assembling of a branch protector 1L of the twelfth embodiment is completed.

Assembling of Third to Seventh Embodiments: Not Illustrated

Regarding the branch protectors of the third to seventh embodiments, assembling may be performed in each assembling procedure of the branch protectors 1A and 1B of the first and second embodiments using each of the protector sheets 2C to 2G.

Assembling of Thirteenth Embodiment

Figure 79:
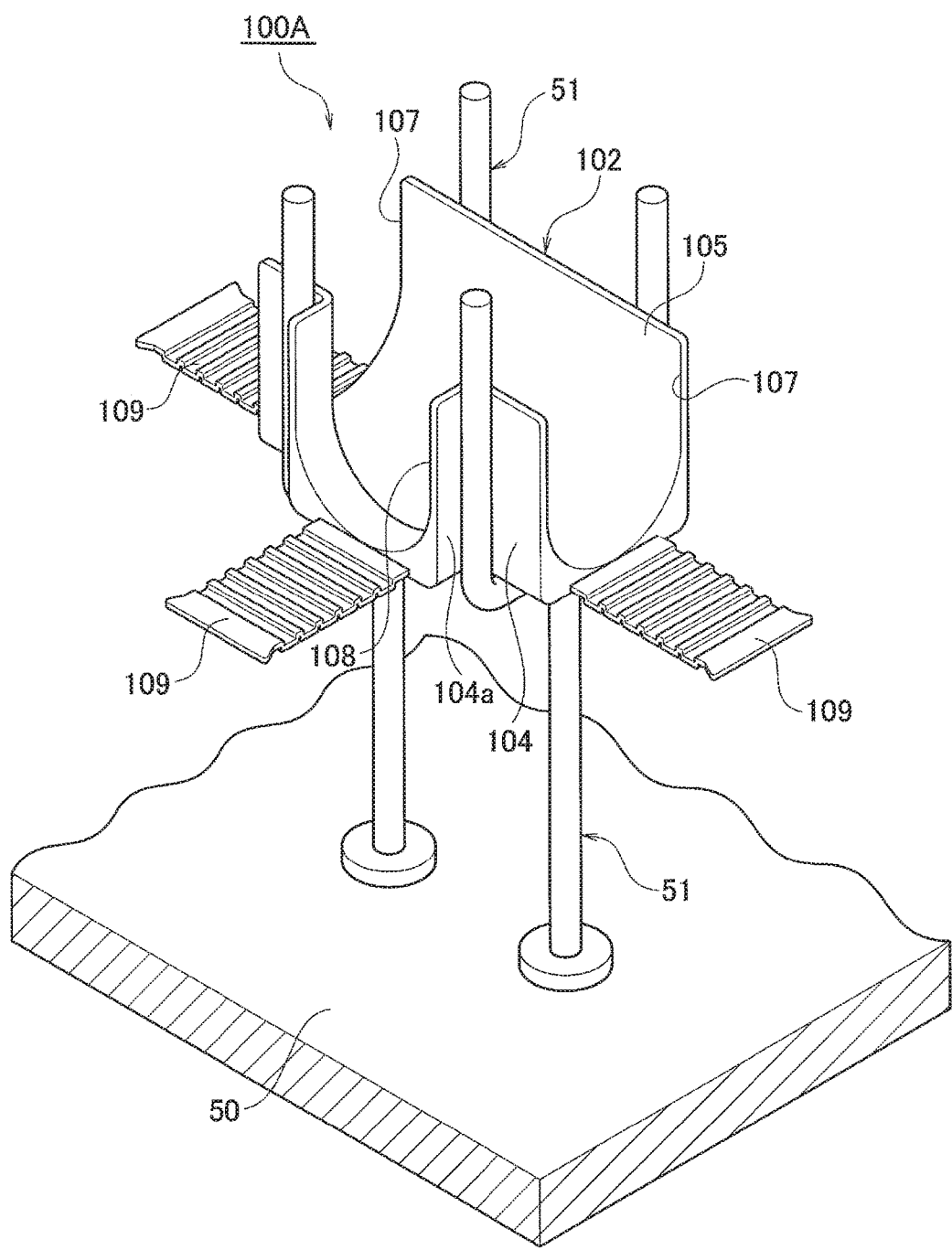
FIG. 79 is a perspective view for describing assembling using jig pins of the branch protector of the thirteenth embodiment.

First, as illustrated in FIG. 79, the branch protector main body 102 is placed on the two jig pins 51, and the branch protector main body 102 is supported in the floating state from the jig base 50 (a component setting step).

Figure 80:
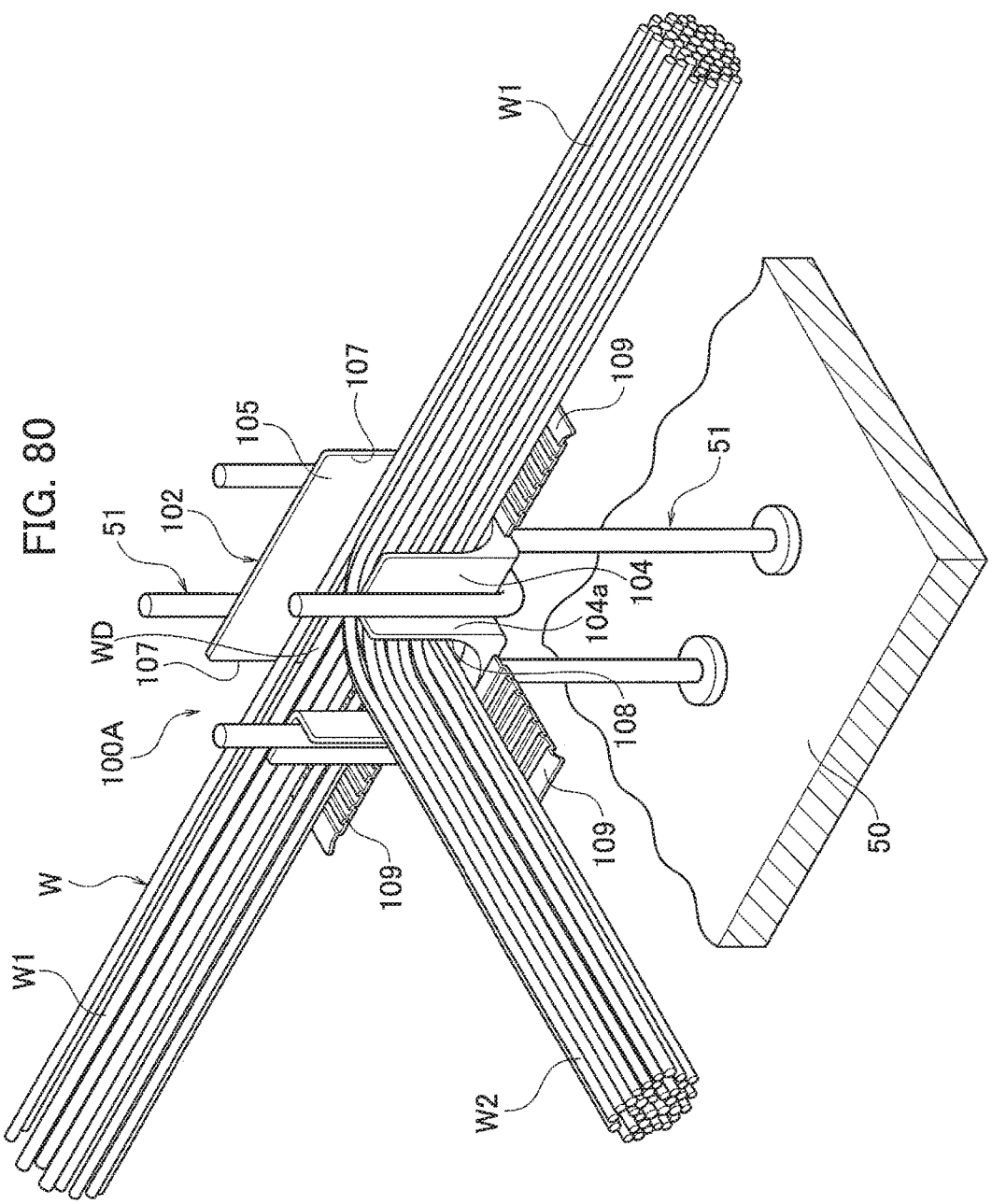
FIG. 80 is a perspective view for describing assembling using jig pins of the branch protector of the thirteenth embodiment.

Next, as illustrated in FIG. 80, the wire branch portion WD is accommodated in the wire accommodating chamber 106 of the branch protector main body 102. The trunk lines W1 of the wire W are drawn out from the wire draw-out openings 107 at both the ends of the pair of side walls 104 and 105, respectively. The branch line W2 of the wire W is drawn out from the wire draw-out opening 108 at the central portion of the one side wall 104.

Figure 81:
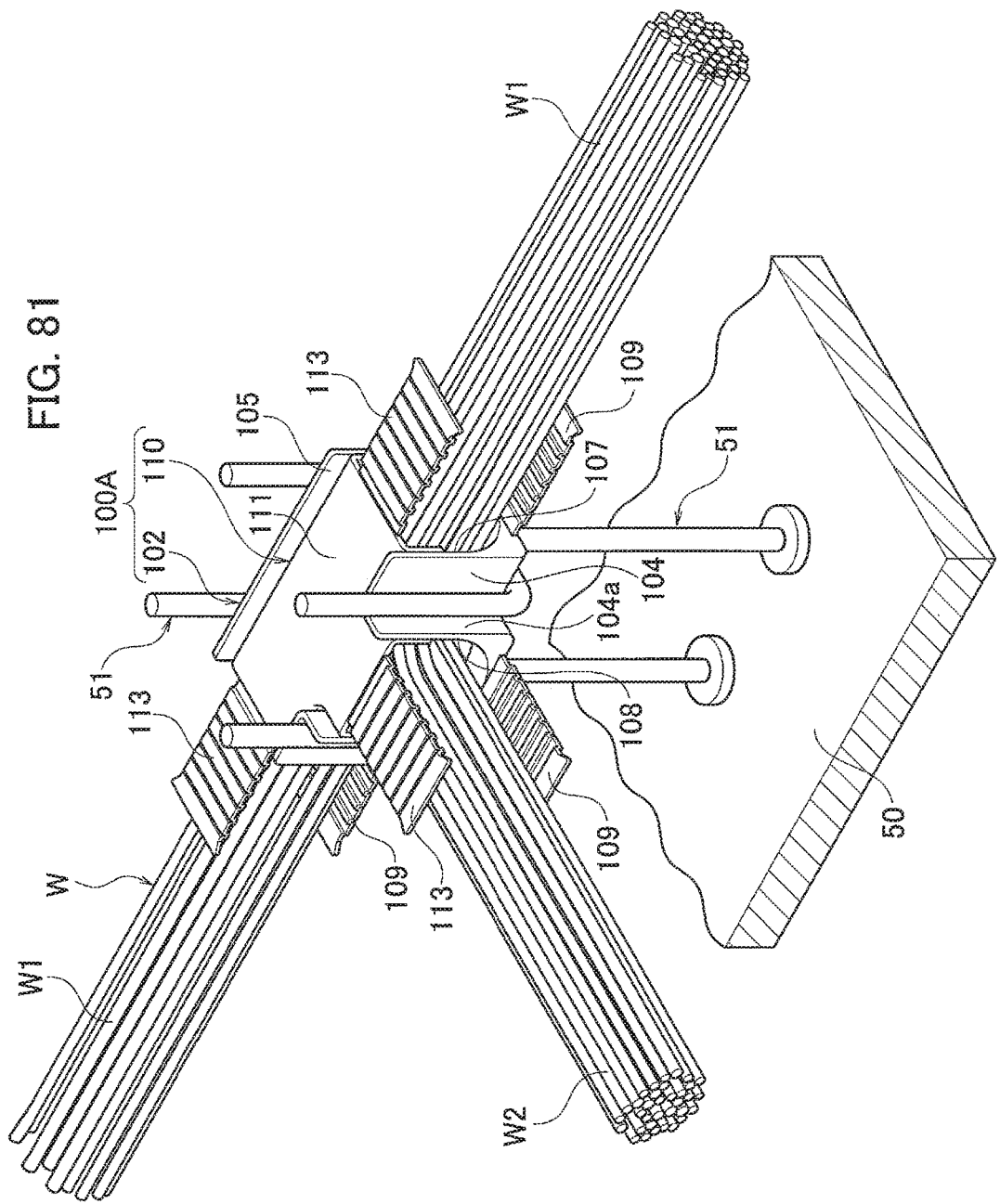
FIG. 81 is a perspective view for describing assembling using jig pins of the branch protector of the thirteenth embodiment.

Next, as illustrated in FIG. 81, the cover 110 is arranged above the wire accommodating chamber 106, and the cover 110 is dropped to be inserted into the wire accommodating chamber 106.

Figure 82:
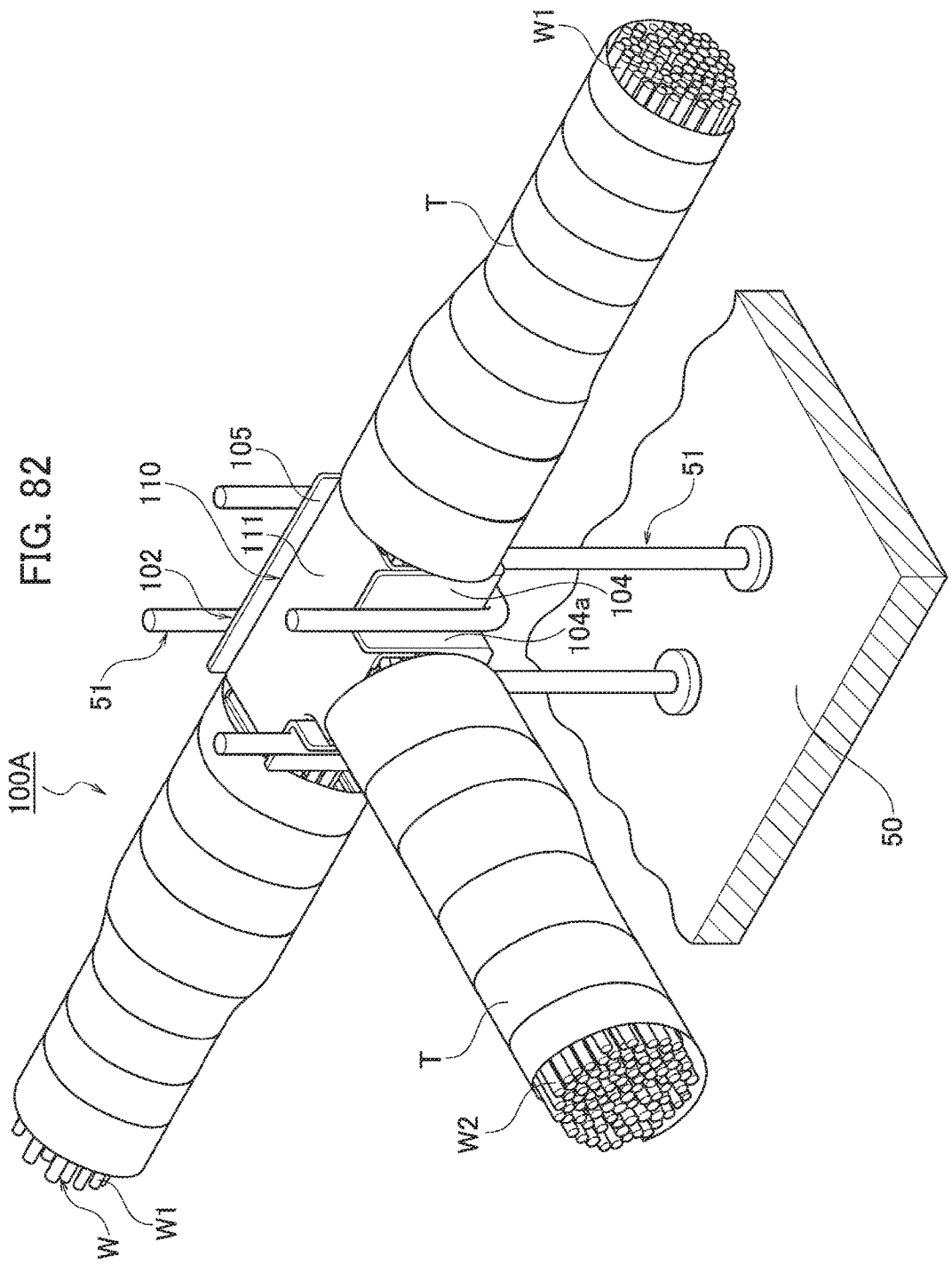
FIG. 82 is a perspective view for describing assembling using jig pins of the branch protector of the thirteenth embodiment.

Next, as illustrated in FIG. 82, the restraint tape T is wound around the portions of the wire draw-out openings 107 and 108 of the branch protector 100A and the trunk line W1 and the branch line W2 drawn out from the respective wire draw-out openings 107 and 108 (an assembling step). Thus, the assembling of the branch protector 100C of the thirteenth embodiment is completed.

Assembling of Fourteenth and Fifteenth Embodiments: Not Illustrated

Regarding the branch protectors 100B and 100C of the fourteenth and fifteenth embodiments, the branch protector main body 102 and the cover 110 of each of the branch protectors 100B and 100C may be used to perform assembling in accordance with the assembling procedure of the branch protector 100A of the thirteenth embodiment.

Assembling of Sixteenth Embodiment

The branch protector 100D of the sixteenth embodiment may be assembled in accordance with the assembling procedure of the branch protector 100A of the thirteenth embodiment.

Figure 83:
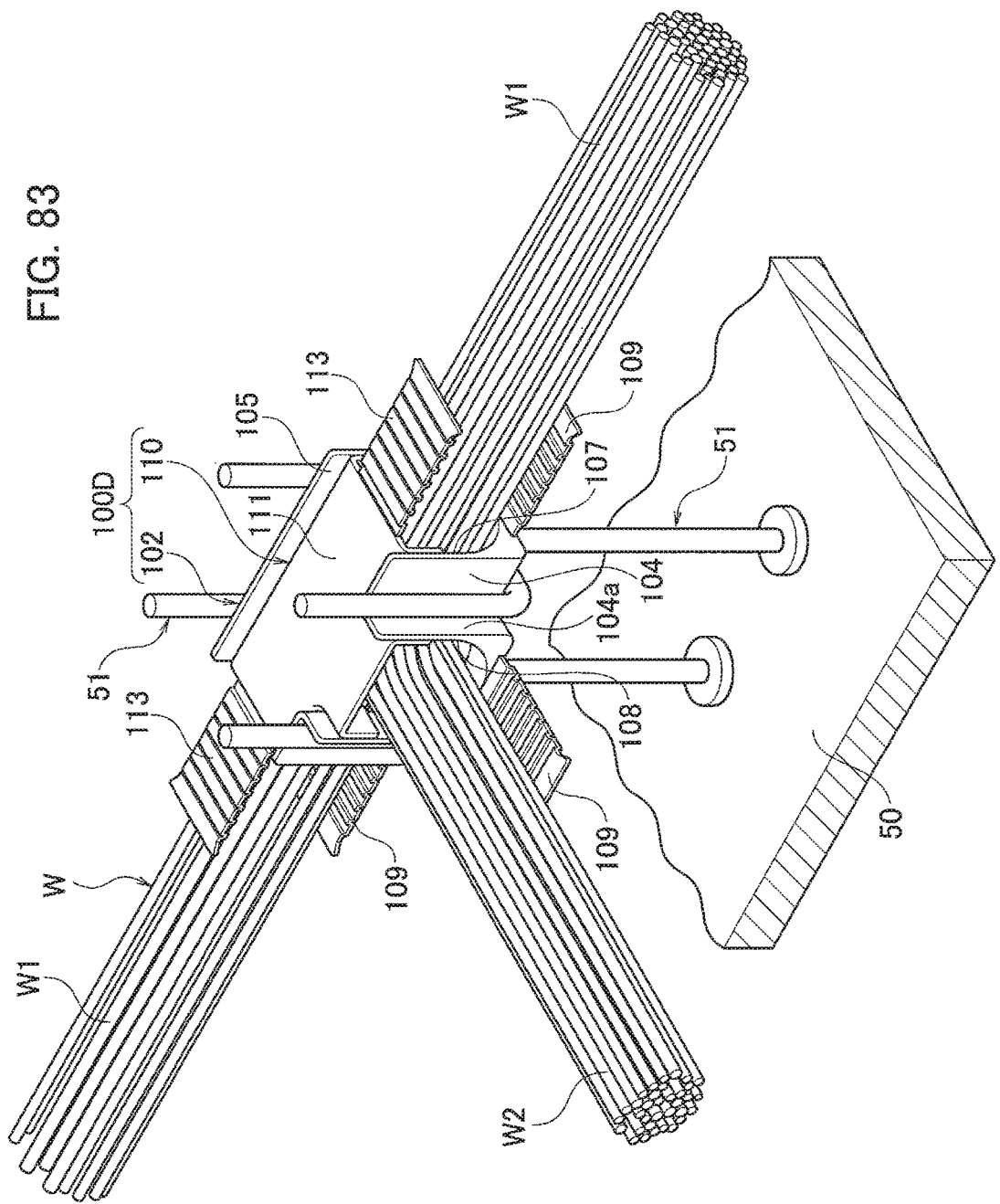
FIG. 83 is a perspective view for describing assembling using jig pins of the branch protector of the sixteenth embodiment.

However, as illustrated in FIG. 83, the cover 110 is not provided with a wire fixing protruding portion protruding in a direction of routing a branch line (not illustrated) from the wire draw-out opening 108. Therefore, a tape is wound around the branch line (not illustrated) drawn out from the branch protector 100D only with the wire fixing protruding portion 109 on the branch protector main body 102. Thus, the assembling of the branch protector 100D of the sixteenth embodiment is completed.

Assembling of Seventeenth Embodiment

The branch protector 100E of the seventeenth embodiment may be assembled in accordance with the assembling procedure of the branch protector 100A of the thirteenth embodiment.

More specifically, the branch protector main body 102 is placed on the two jig pins 51, and the branch protector main body 102 is supported in the floating state from the jig base 50 (a component setting step).

Figure 84:
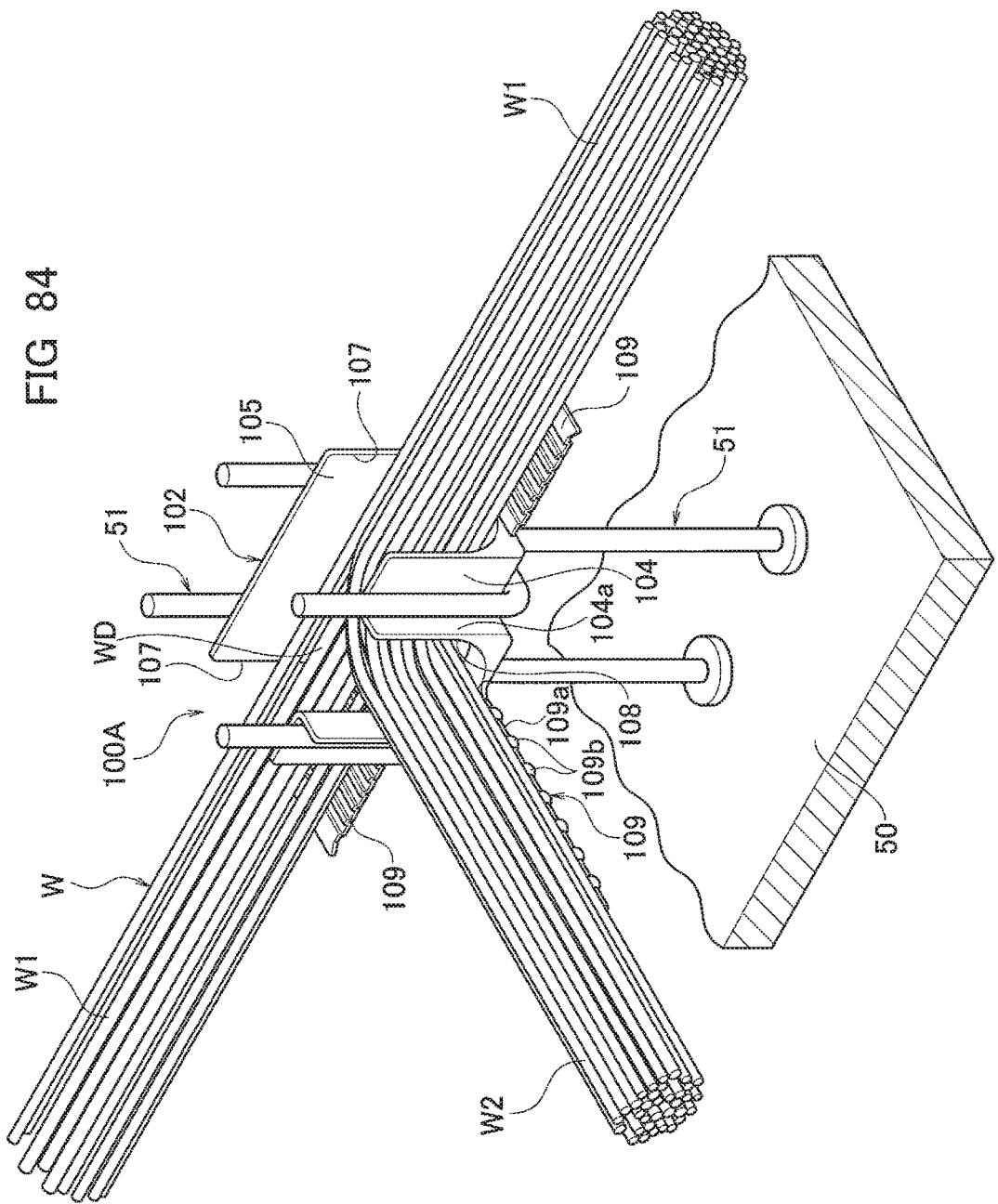
FIG. 84 is a perspective view for describing assembling using jig pins of the branch protector of the seventeenth embodiment.

Next, as illustrated in FIG. 84, the wire branch portion WD is accommodated in the wire accommodating chamber 106 of the branch protector main body 102. The trunk lines W1 of the wire W are drawn out from the wire draw-out openings 107 at both the ends of the pair of side walls 104 and 105, respectively. The branch line W2 of the wire W is drawn out from the wire draw-out opening 108 at the central portion of the one side wall 104.

Figure 85:
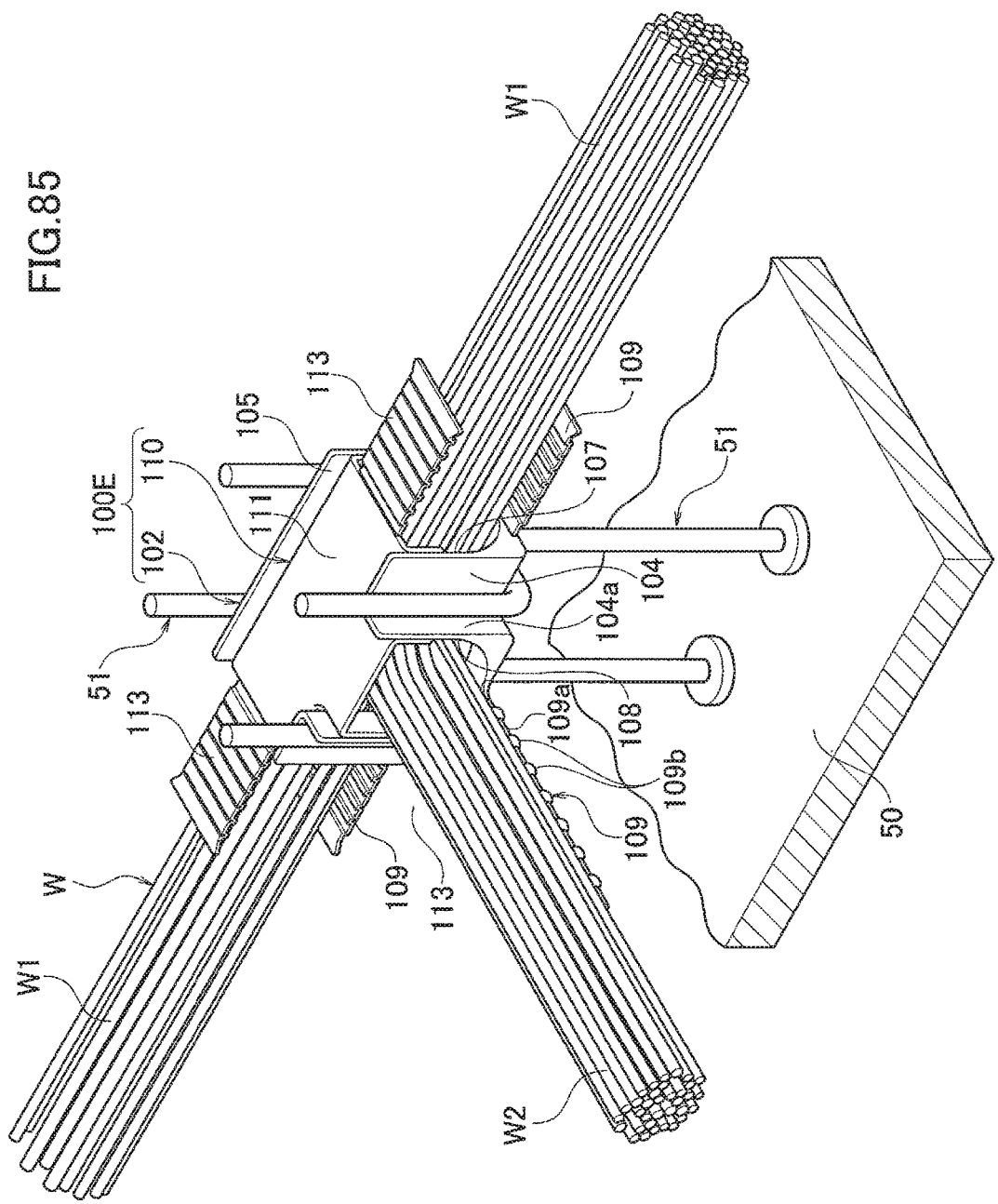
FIG. 85 is a perspective view for describing assembling using jig pins of the branch protector of the seventeenth embodiment.

Next, as illustrated in FIG. 85, the cover 110 is arranged above the wire accommodating chamber 106, and the cover 110 is dropped to be inserted into the wire accommodating chamber 106.

Figure 86:
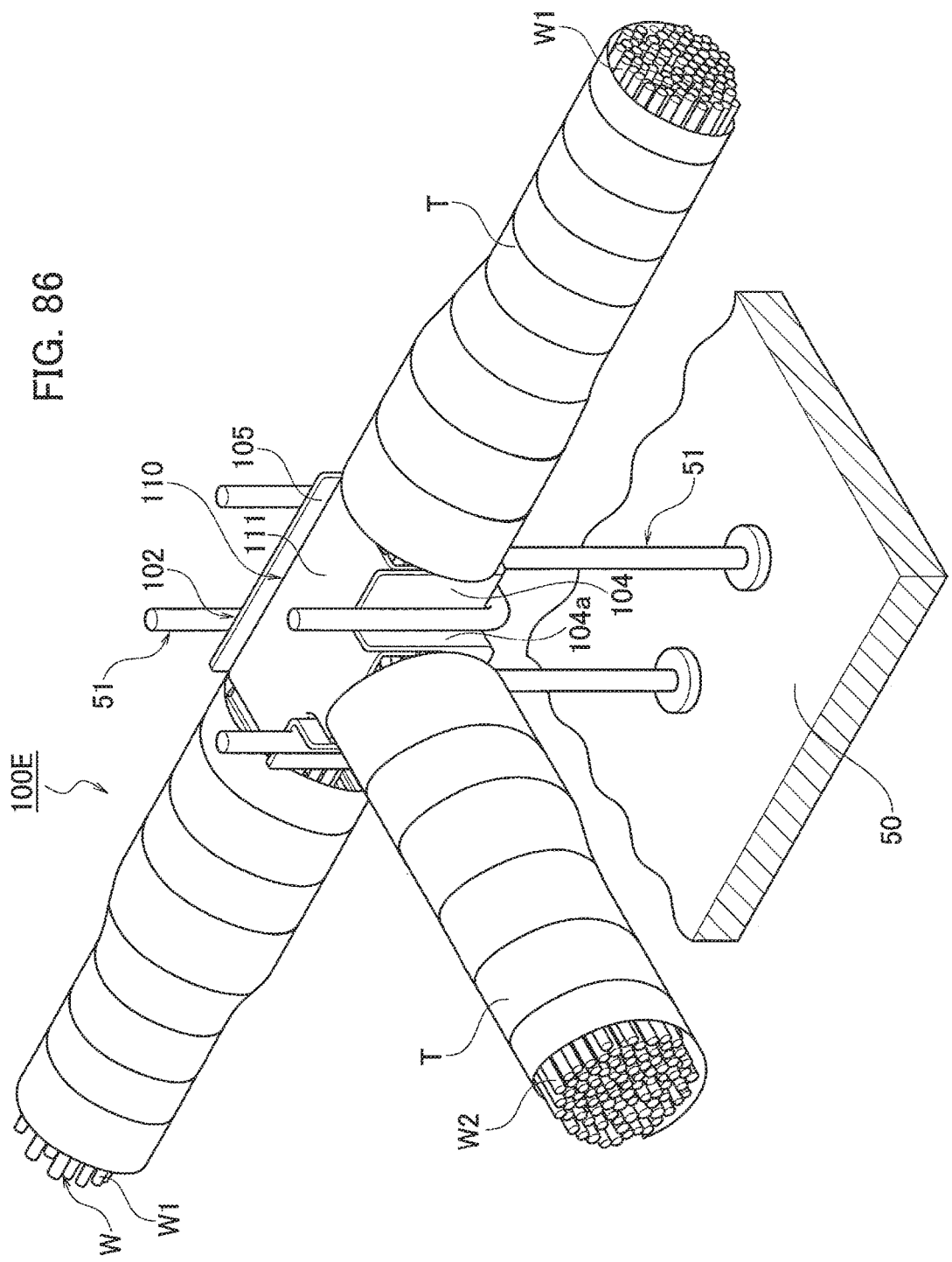
FIG. 86 is a perspective view for describing assembling using jig pins of the branch protector of the seventeenth embodiment.

Next, as illustrated in FIG. 86, the restraint tape T is wound around the portions of the wire draw-out openings 107 and 108 of the branch protector 100E and the trunk line W1 and the branch line W2 drawn out from the respective wire draw-out openings 107 and 108 (an assembling step). The branch line W2 drawn out from the branch protector 100E is wound collectively around the flexible rod 109a attached with the spherical protrusion 109b Thus, the assembling of the branch protector 100E of the seventeenth embodiment is completed.

Next, the assembling procedure (manufacturing method) of the branch protector 1A, 1B, 1H to 1L, and 100A to 100E of the respective embodiments using the jig pin 51 has been described above.

In this assembling procedure (manufacturing method), the protector sheets 2A and 2B, the reinforcing protector plate 29, and the branch protector main body 102, which are the main components of the branch protectors 1A to 1L (there are missing numbers), are supported by the jig pins 51 in the floating state from the jig base 50, and the space below the protector sheets 2A and 2B, the reinforcing protector plate 29, and the branch protector main body 102 can also be used as an assembling work space. Therefore, the tape winding of the restraint tape T can be easily performed in each of the above-described embodiments, and the assembling workability is favorable. Incidentally, it is possible to easily perform the assembling work other than the tape winding of the restraint tape T.

(Modification of Protector Sheet)

Figure 87:
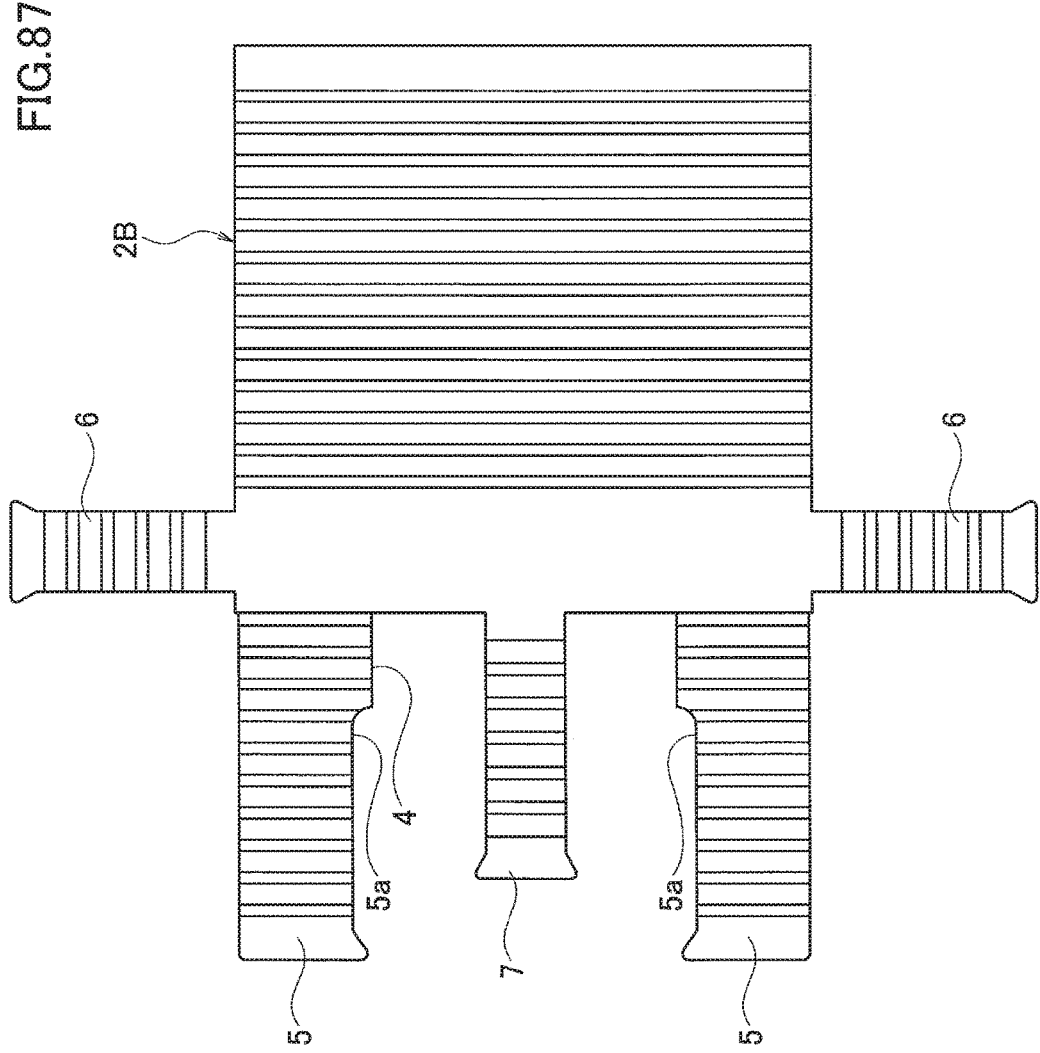
FIG. 87 is a developed view of a first modification of a protector sheet 2B.

FIG. 87 illustrates a first modification of the protector sheet 2B. In the first modification of the protector sheet 2B, a cut-out portion 5a is formed in each of the pair of strip-shaped sheet portions 5. When positioning with the jig pin 51 is performed at each of the cut-out portions 5a, the protector sheet 2B can be reliably supported by the jig pins 51 in the floating state from the jig base 50.

Figure 88:
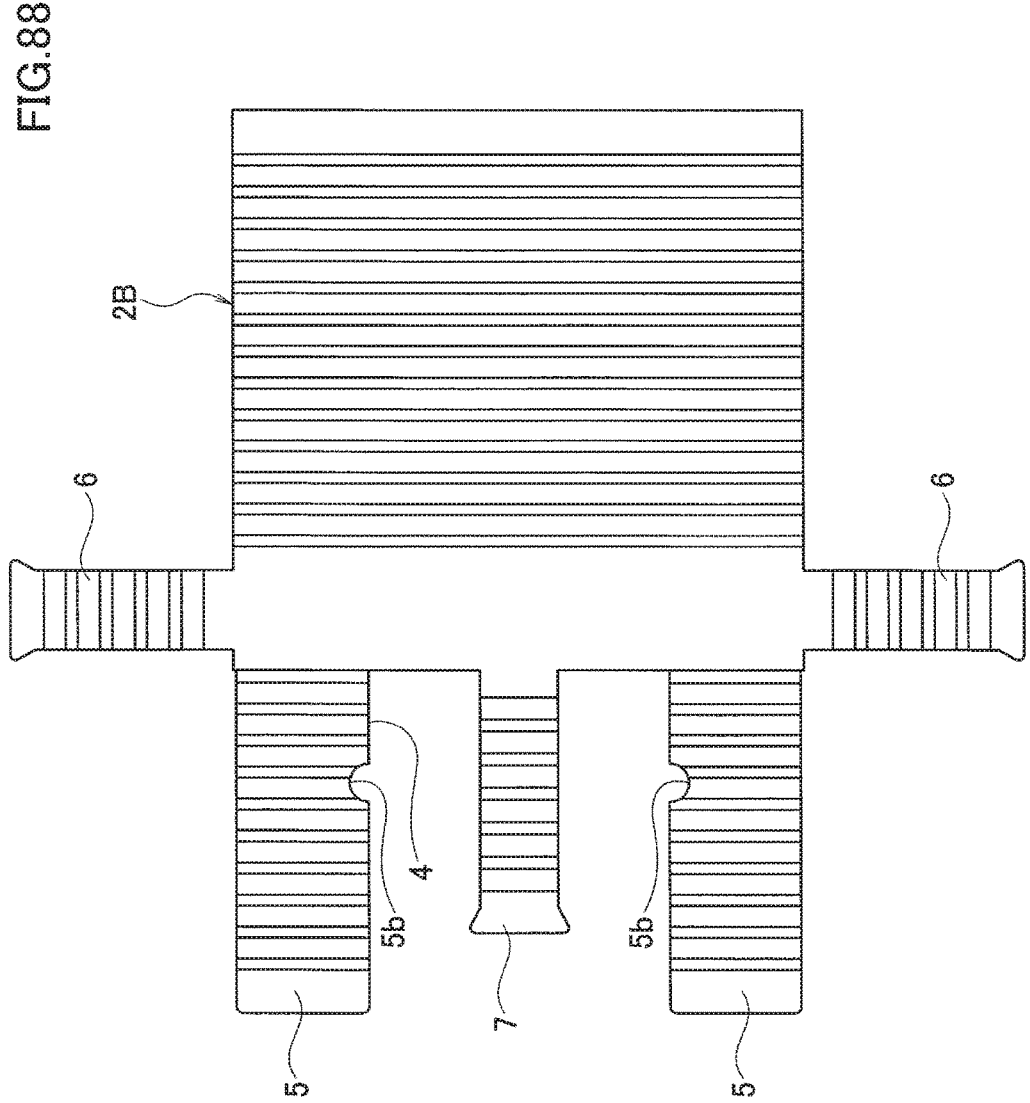
FIG. 88 is a developed view of the first modification of the protector sheet 2B.
Figure 89:
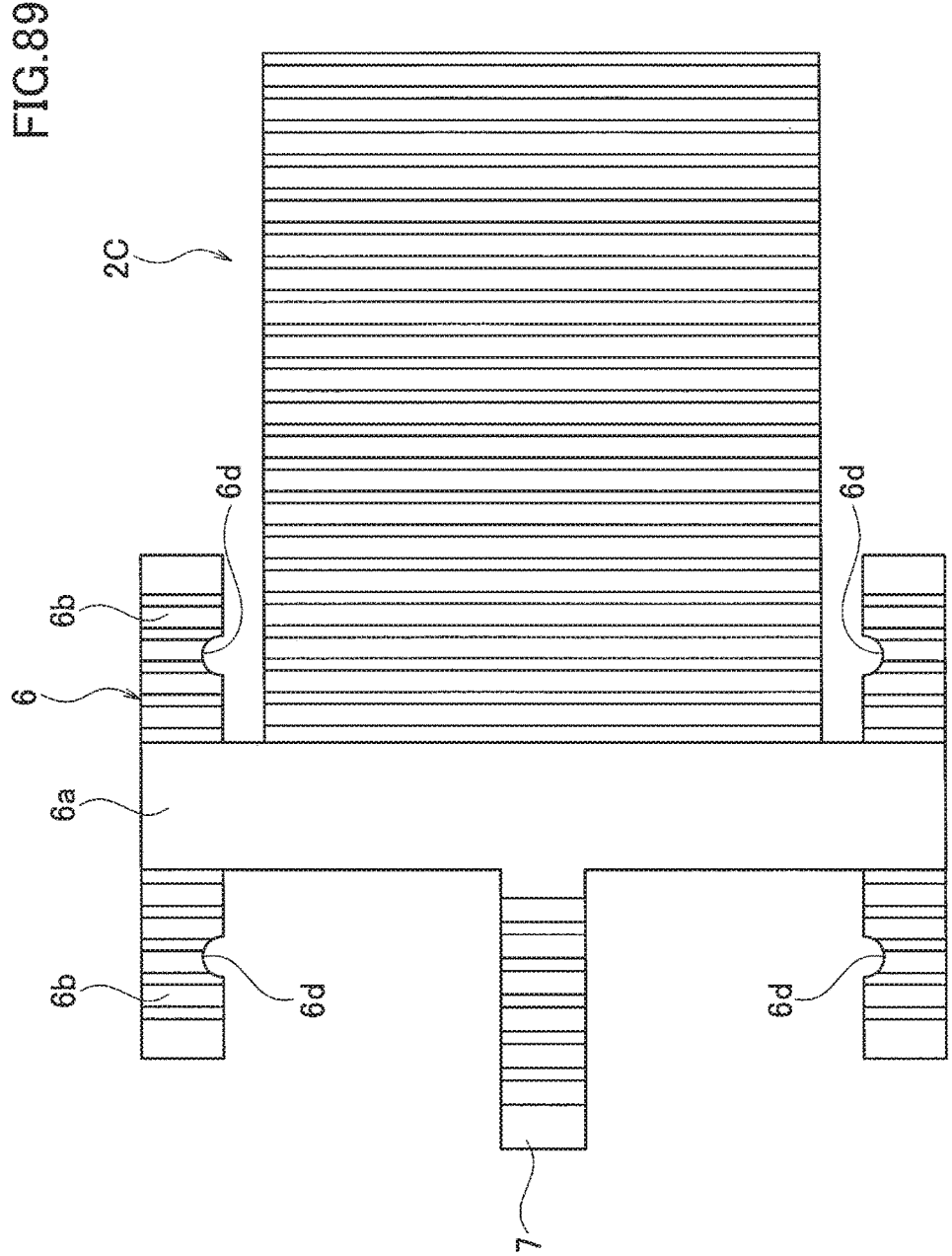
FIG. 89 is a developed view of a first modification of a protector sheet 2C.

FIG. 88 illustrates a second modification of the protector sheet 2B. In the second modification of the protector sheet 2B, a groove 5b is formed in each of the pair of strip-shaped sheet portions 5. When positioning with the jig pin 51 is performed at each of the grooves 5b, the protector sheet 2B can be reliably supported by the jig pins 51 in the floating state from the jig base 50.

FIG. 85 illustrates a first modification of the protector sheet 2C. In the first modification of the protector sheet 2C, a groove 6d is formed in each of the pair of tape winding protruding portions 6, and the cut-out portion 5a is formed in each of the wire strip-shaped sheet portions 5. When positioning with the jig pin 51 is performed at each of the cut-out portions 5a, the protector sheet 2B can be reliably supported by the jig pins 51 in the floating state from the jig base 50.

Incidentally, the number of the jig pins 51 used in the manufacturing method of each of the embodiments is two, but may be one or three or more. Further, the form of the jig pin 51 is also bifurcated, but it may be trifurcated or higher. The form of the jig pin 51 is appropriately changed in accordance with the form of the main component.

Modification of First to Twelfth Embodiments

Although the restraint tape T is wound directly around the outer circumference of the wire W in the first to twelfth embodiments, the restraint tape T is wound above a corrugated tube when the corrugated tube is attached to the wire W.

Although the one trunk line (wire bundle) W1 and the one branch line (wire bundle) W2 are drawn out from the trunk line draw-out opening 8 and the branch line draw-out opening 9, respectively, in the first to twelfth embodiments, a plurality of trunk lines (wire bundles) W1 and a plurality of branch lines (wire bundles) W2 may be drawn out therefrom. Here, the one trunk line (wire bundle) W1 and the one branch line (wire bundle) W2 are those routed along the same routing path.

The component placement portions 2a of the protector sheets 2A to 2E are formed as the flat plate portion in the first to twelfth embodiments, but may be formed in the bellows-shape.

Although the single cut-out portion 4 is provided in the first to twelfth embodiments, a plurality of cut-out portions 4 may be provided. The branch line (wire bundle) W2 may be drawn out from each of the cut-out portions 4, 24, and 27.

In the first to fifth embodiments and the eighth to twelfth embodiments, the tape winding protruding portion 7 for the branch line may be formed in the flexible rod 7a having the spherical protrusions 7b with the interval therebetween similarly to the fifth and sixth embodiments.

Modification of Thirteenth to Seventeenth Embodiments

Although the restraint tape T is wound directly around the outer circumference of the wire W in the thirteenth to seventeenth embodiments, the restraint tape T is wound above a corrugated tube when the corrugated tube is attached to the wire W.

In the thirteenth to fifteenth embodiments, both the branch protector main body 102 and the cover 110 are provided with the wire fixing protruding portions 109 and 113 protruding from the wire draw-out openings 107 and 108 in the routing direction of the wire W. Any one of the branch protector main body 102 and the cover 110 (the sixteenth and seventeenth embodiments correspond to specific examples of this modification) may be provided with the wire fixing protruding portions 109 and 113 protruding from the wire draw-out openings 107 and 108 in the routing direction of the wire W. In this case, it is necessary to provide a means for fixing between the branch protector main body 102 and the cover 110 in some cases.

Although the branch protectors 100A to 100C and the wires W (the trunk line W1 and the branch line W2) are fixed by winding the restraint tape T collectively around the wire fixing protruding portions 109 and 113 together with the wires W (the trunk line W1 and the branch line W2) in the thirteenth to seventeenth embodiments, the branch protectors 100A to 100C and the wires W (the trunk line W1 and the branch line W2) may be fixed by collectively fastening the wire fixing protruding portions 109 and 113 together with the wires W (the trunk line W1 and the branch line W2) using a binding band.

The wire draw-out openings 107 and 108 are provided on the side walls 104 and 105, respectively, in the thirteenth to fifteenth embodiments, but may be provided on the bottom wall 103 or may be provided across the side walls 104 and 105 and the bottom wall 103.

The single wire (wire bundle) W is drawn out from the wire draw-out openings 107 and 108 in the thirteenth to fifteenth embodiments, but a plurality of wires (wire bundle) may be drawn out. For example, although the single branch line (wire bundle) W2 is drawn out from the wire draw-out opening 108, a plurality of branch lines (wire bundle) W2 may be drawn out. Here, the single wire (wire bundle) W means one routed along the same routing path.

What is claimed is:

1. A method of manufacturing a branch protector comprising:
    a component setting step of supporting a main component in a floating state from a jig base on a jig pin erected on the jig base; and
    an assembling step of assembling a wire branch portion to the main component, wherein
    the main component includes a first opening and a second opening, during the assembling step, such that a trunk line of the wire branch portion extends out of the main component through the first opening and a branch line of the wire branch portion extends out of the main component through the second opening,
    the main component further includes a tape winding protruding portion that extends outward from the first opening or the second opening during the assembling step,
    in the assembling step, a restraint tape is wound collectively around the tape winding protruding portion of the main component and the wire branch portion, such that the restraint tape is in direct contact with the tape winding protruding portion and wires of the wire branch portion,
    the main component is a flexible protector sheet,
    in the component setting step, the protector sheet in a developed state is supported by the jig pin, and
    in the assembling step, the wire branch portion is placed on the protector sheet, the protector sheet is wound around an outer circumference of the wire branch portion, and the restraint tape is wound collectively around the tape winding protruding portion of the protector sheet from which the trunk line of the wire branch portion is drawn out and the trunk line, such that the restraint tape is in direct contact with the tape winding protruding portion and wires of the trunk line.

2. A method of manufacturing a branch protector comprising:
    a component setting step of supporting a main component in a floating state from a jig base on a jig pin erected on the jig base; and
    an assembling step of assembling a wire branch portion to the main component, wherein
    the main component includes a first opening and a second opening, during the assembling step, such that a trunk line of the wire branch portion extends out of the main component through the first opening and a branch line of the wire branch portion extends out of the main component through the second opening,
    the main component further includes a tape winding protruding portion that extends outward from the first opening or the second opening during the assembling step,
    in the assembling step, a restraint tape is wound collectively around the tape winding protruding portion of the main component and the wire branch portion, such that the restraint tape is in direct contact with the tape winding protruding portion and wires of the wire branch portion,
    the main component is a flexible protector sheet,
    the tape winding protruding portion of the flexible protector sheet extends outward from the first opening, through which the trunk line of the wire branch portion extends, during the assembling step,
    in the component setting step, the protector sheet in a developed state is supported by the jig pin, and
    in the assembling step, the wire branch portion is placed on the protector sheet, the protector sheet is wound around an outer circumference of the wire branch portion, a reinforcing protector member is further arranged on the outer circumference of the wire branch portion, and the restraint tape is wound collectively around the tape winding protruding portion of the protector sheet, a tape winding protruding portion of the reinforcing protector member, from which the trunk line of the wire branch portion is drawn out, and the trunk line, such that the restraint tape is in direct contact with the tape winding protruding portion of the protector sheet, the tape winding protruding portion of the reinforcing protector member, and the trunk line.

3. A method of manufacturing a branch protector comprising:
    a component setting step of supporting a main component in a floating state from a jig base on a jig in erected on the jig base; and
    an assembling step of assembling a wire branch portion to the main component, wherein
    the main component includes a first opening and a second opening, during the assembling step, such that a trunk line of the wire branch portion extends out of the main component through the first opening and a branch line of the wire branch portion extends out of the main component through the second opening,
    the main component further includes a tape winding protruding portion that extends outward from the first opening or the second opening during the assembling step,
    in the assembling step, a restraint tape is wound collectively around the tape winding protruding portion of the main component and the wire branch portion, such that the restraint tape is in direct contact with the tape winding protruding portion and wires of the wire branch portion,
    the main component is a reinforcing protector plate having rigidity to maintain a form of a circular arc shape,
    the tape winding protruding portion of the reinforcing protector plate extends outward from the first opening, through which the trunk line of the wire branch portion extends, during the assembling step,
    in the component setting step, the reinforcing protector plate is supported by the jig pin,
    in the assembling step, the wire branch portion is placed on the reinforcing protector plate, a protector sheet is wound around an outer circumference of the wire branch portion, and the restraint tape is wound collectively around the tape winding protruding portion of the reinforcing protector plate, a tape winding protruding portion of the protector sheet, from which the trunk line of the wire branch portion is drawn out, and the trunk line, such that the restraint tape is in direct contact with the tape winding protruding portion of the reinforcing protector plate, the tape winding protruding portion of the protector sheet, and the trunk line, and the tape winding protruding portion of the protector sheet extends outward from the first opening, through which the trunk line of the wire branch portion extends, during the assembling step.

4. The method of manufacturing a branch protector according to claim 1, wherein the tape winding protruding portion of the main component extends outward from the second opening, through which the branch line of the wire branch portion extends, during the assembling step, in the assembling step, the restraint tape is wound collectively around the tape winding protruding portion of the main component, from which the branch line of the wire branch portion is drawn out, and the branch line.

5. A method of manufacturing a branch protector comprising:

a component setting step of supporting a main component in a floating state from a jig base on a jig pin erected on the jig base; and an assembling step of assembling a wire branch portion to the main component, wherein the main component includes a first opening and a second opening, during the assembling step, such that a trunk line of the wire branch portion extends out of the main component through the first opening and a branch line of the wire branch portion extends out of the main component through the second opening, the main component further includes a tape winding protruding portion that extends outward from the first opening or the second opening during the assembling step, in the assembling step, a restraint tape is wound collectively around the tape winding protruding portion of the main component and the wire branch portion, such that the restraint tape is in direct contact with the tape winding protruding portion and wires of the wire branch portion, the main component is a branch protector main body having a wire accommodating chamber whose upper surface is opened, the tape winding protruding portion of the branch protector main body extends outward from the first opening, through which the trunk line of the wire branch portion extends, in the component setting step, the branch protector main body is supported by the jig pin, in the assembling step, the wire branch portion is accommodated in the wire accommodating chamber of the branch protector main body, a cover is arranged on the wire accommodating chamber from above the wire branch portion, and the restraint tape is wound collectively around a tape winding protruding portion of the branch protector main body and/or a tape winding protruding portion of the cover, from which a trunk line of the wire branch portion is drawn out, and the trunk line, and the tape winding protruding portion of the cover extends outward from the first opening, through which the trunk line of the wire branch portion extends, during the assembling step.

6. The method of manufacturing a branch protector according to claim 5, wherein the main component includes an additional tape winding protruding portion that that extends outward from the second opening, through which the branch line of the wire branch portion extends, in the assembling step, the restraint tape is wound around the additional tape winding protruding portion of the branch protector main body and/or an additional tape winding protruding portion of the cover from which a branch line of the wire branch portion is drawn out, and the branch line, and the additional tape winding protruding portion of the cover extends outward from the second opening, through which the branch line of the wire branch portion extends, during the assembling step.

7. A wire harness comprising a branch protector manufactured by the method of manufacturing a branch protector according to claim 1.

8. A method of manufacturing a branch protector comprising:

a component setting step of supporting a main component in a floating state from a jig base on a jig pin erected on the jig base; and an assembling step of assembling a wire branch portion to the main component, wherein the main component includes a first opening and a second opening, during the assembling step, such that a trunk line of the wire branch portion extends out of the main component through the first opening and a branch line of the wire branch portion extends out of the main component through the second opening, the main component further includes a tape winding protruding portion that extends outward from the first opening or the second opening during the assembling step, in the assembling step, a restraint tape is wound collectively around the tape winding protruding portion of the main component and the wire branch portion, such that the restraint tape is in direct contact with the tape winding protruding portion and wires of the wire branch portion, and the tape winding protruding portion has a sheet shape that, in the assembling step, contacts the wire branch portion on only a single side of the wire branch portion, in a radial direction of the wire branch portion.

9. The method of manufacturing a branch protector according to claim 8, wherein the tape winding protruding portion includes bellows.

10. A method of manufacturing a branch protector comprising:

a component setting step of supporting a main component in a floating state from a jig base on a jig pin erected on the jig base; and an assembling step of assembling a wire branch portion to the main component, wherein the main component includes a first opening and a second opening, during the assembling step, such that a trunk line of the wire branch portion extends out of the main component through the first opening and a branch line of the wire branch portion extends out of the main component through the second opening, the main component further includes a tape winding protruding portion that extends outward from the first opening or the second opening during the assembling step, in the assembling step, a restraint tape is wound collectively around the tape winding protruding portion of the main component and the wire branch portion, such that the restraint tape is in direct contact with the tape winding protruding portion and wires of the wire branch portion, and the tape winding protruding portion is a flexible rod that, in the assembling step, contacts the wire branch portion on only a single side of the wire branch portion, in a radial direction of the wire branch portion, in the assembling step.

11. The method of manufacturing a branch protector according to claim 10, wherein the tape winding protruding portion includes spherical protrusions.

* * * * *